June 2, 1959 N. ROCHESTER ET AL 2,889,535

RECOGNITION OF RECORDED INTELLIGENCE

Filed Oct. 20, 1955 35 Sheets-Sheet 1

INVENTORS
NATHANIEL ROCHESTER
JACOB R. JOHNSON
GENE M. AMDAHL
WALTER E. MUTTER

BY Murray Nanes
ATTORNEY

June 2, 1959 N. ROCHESTER ET AL 2,889,535

RECOGNITION OF RECORDED INTELLIGENCE

Filed Oct. 20, 1955 35 Sheets-Sheet 2

INVENTORS
NATHANIEL ROCHESTER
JACOB R. JOHNSON
GENE M. AMDAHL
WALTER E. MUTTER

BY Murray Nanes
ATTORNEY

June 2, 1959 N. ROCHESTER ET AL 2,889,535

RECOGNITION OF RECORDED INTELLIGENCE

Filed Oct. 20, 1955

35 Sheets-Sheet 3

RECOGNITION OF RECORDED INTELLIGENCE

Filed Oct. 20, 1955 35 Sheets-Sheet 4

June 2, 1959 N. ROCHESTER ET AL 2,889,535

RECOGNITION OF RECORDED INTELLIGENCE

Filed Oct. 20, 1955

35 Sheets-Sheet 6

June 2, 1959 N. ROCHESTER ET AL 2,889,535

RECOGNITION OF RECORDED INTELLIGENCE

Filed Oct. 20, 1955 35 Sheets-Sheet 7

June 2, 1959 N. ROCHESTER ET AL 2,889,535

RECOGNITION OF RECORDED INTELLIGENCE

Filed Oct. 20, 1955 35 Sheets-Sheet 9

June 2, 1959 N. ROCHESTER ET AL 2,889,535

RECOGNITION OF RECORDED INTELLIGENCE

Filed Oct. 20, 1955

35 Sheets-Sheet 10

RECOGNITION OF RECORDED INTELLIGENCE

Filed Oct. 20, 1955

35 Sheets-Sheet 11

INVENTORS
NATHANIEL ROCHESTER
JACOB R. JOHNSON
GENE M. AMDAHL
WALTER E. MUTTER
BY Murray Nanes
ATTORNEY June 2, 1959 N. ROCHESTER ET AL 2,889,535

RECOGNITION OF RECORDED INTELLIGENCE

Filed Oct. 20, 1955 35 Sheets-Sheet 12

INVENTORS
NATHANIEL ROCHESTER
JACOB R. JOHNSON
GENE M. AMDAHL
WALTER E. MUTTER
BY Murray Nanes
ATTORNEY June 2, 1959 N. ROCHESTER ET AL 2,889,535

RECOGNITION OF RECORDED INTELLIGENCE

Filed Oct. 20, 1955 35 Sheets-Sheet 16

June 2, 1959 N. ROCHESTER ET AL 2,889,535

RECOGNITION OF RECORDED INTELLIGENCE

Filed Oct. 20, 1955 35 Sheets-Sheet 17

June 2, 1959 N. ROCHESTER ET AL 2,889,535

RECOGNITION OF RECORDED INTELLIGENCE

Filed Oct. 20, 1955 35 Sheets-Sheet 20

June 2, 1959 N. ROCHESTER ET AL 2,889,535

RECOGNITION OF RECORDED INTELLIGENCE

Filed Oct. 20, 1955

35 Sheets-Sheet 22

June 2, 1959 N. ROCHESTER ET AL 2,889,535

RECOGNITION OF RECORDED INTELLIGENCE

Filed Oct. 20, 1955

35 Sheets-Sheet 23

INVENTORS
NATHANIEL ROCHESTER
JACOB R. JOHNSON
GENE M. AMDAHL
WALTER E. MUTTER
BY
Murray Nanes
ATTORNEY R
n CF-9
5 4

INVENTORS
NATHANIEL ROCHESTER
JACOB R. JOHNSON
GENE M. AMDAHL
WALTER E. MUTTER
BY Murray Nanes
ATTORNEY.

INVENTORS
NATHANIEL ROCHESTER
JACOB R. JOHNSON
GENE M. AMDAHL
WALTER E. MUTTER
BY Murray Nanes
ATTORNEY INVENTORS
NATHANIEL ROCHESTER
JACOB R. JOHNSON
GENE M. AMDAHL
WALTER E. MUTTER
BY Murray Nanes
ATTORNEY INVENTORS
NATHANIEL ROCHESTER
JACOB R. JOHNSON
GENE M. AMDAHL
WALTER E. MUTTER
BY Murray Nanes
ATTORNEY

RECOGNITION OF RECORDED INTELLIGENCE

Filed Oct. 20, 1955 35 Sheets-Sheet 30

INVENTORS
NATHANIEL ROCHESTER
JACOB R. JOHNSON
GENE M. AMDAHL
WALTER E. MUTTER
BY Murray Nanes
ATTORNEY

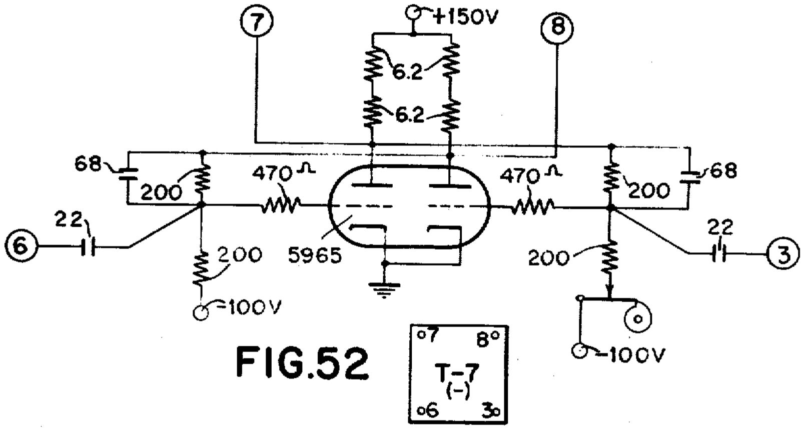
FIG. 52
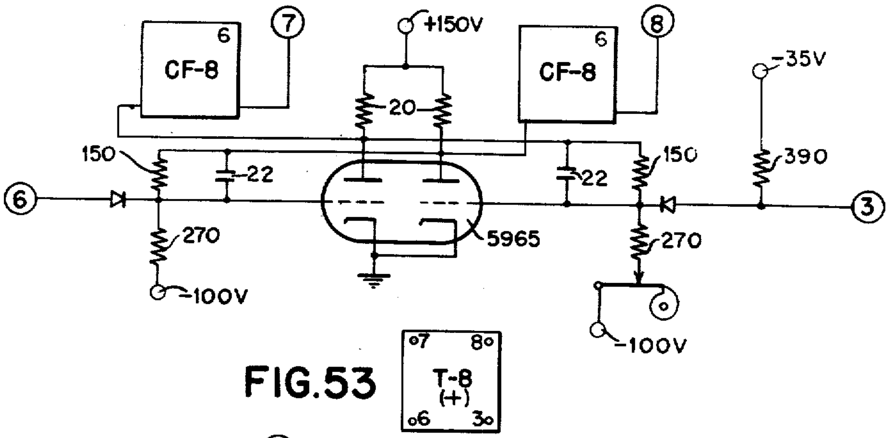
FIG. 53
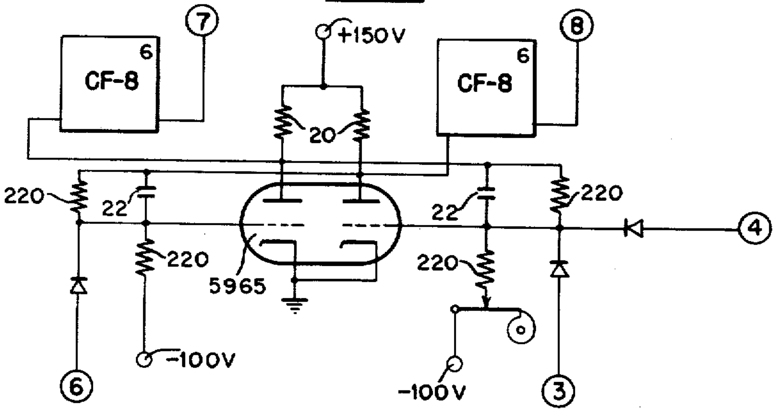
FIG. 54
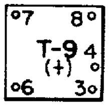
INVENTORS
NATHANIEL ROCHESTER
JACOB R. JOHNSON
GENE M. AMDAHL
WALTER E. MUTTER
BY Murray Nanes
ATTORNEY

| t-uSec | R | C |
|---|---|---|
| 2 | 130 | 20 |
| 5 | 330 | 20 |
| 10 | 680 | 20 |
| 30 K | 5.1 Meg | 0.02µf |
| 500 K | 4.4 Meg | 0.02µf |
| 1 Meg | 4.4 Meg | 0.1µf |

| t-uSec | R | C |
|---|---|---|
| 1 | 22 | 50 |

*INVENTORS*
NATHANIEL ROCHESTER
JACOB R. JOHNSON
GENE M. AMDAHL
WALTER E. MUTTER

*BY* Murray Nanes
ATTORNEY.

INVENTORS
NATHANIEL ROCHESTER
JACOB R. JOHNSON
GENE M. AMDAHL
WALTER E. MUTTER
BY
Murray Nanes
ATTORNEY

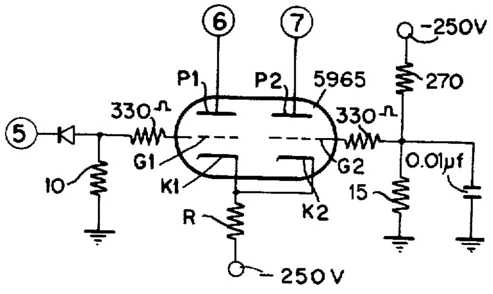
FIG. 71
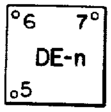
| | R-K ohms |
|---|---|
| DE-1 | 256 |
| DE-2 | 127.67 |
| DE-4 | 63.6 |
| DE-8 | 31.66 |
| DE-16 | 15.62 |
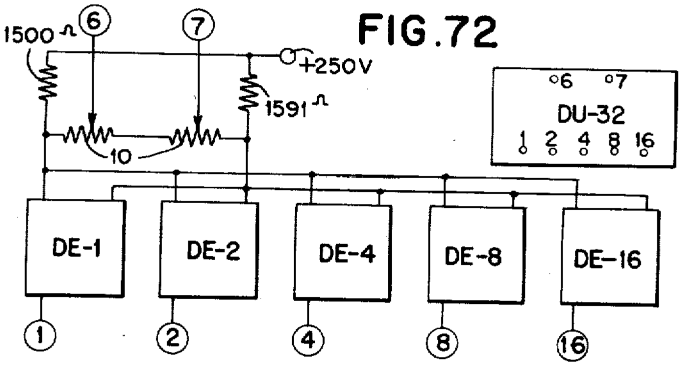
FIG. 72
FIG. 73
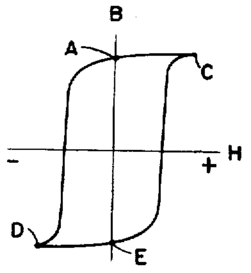
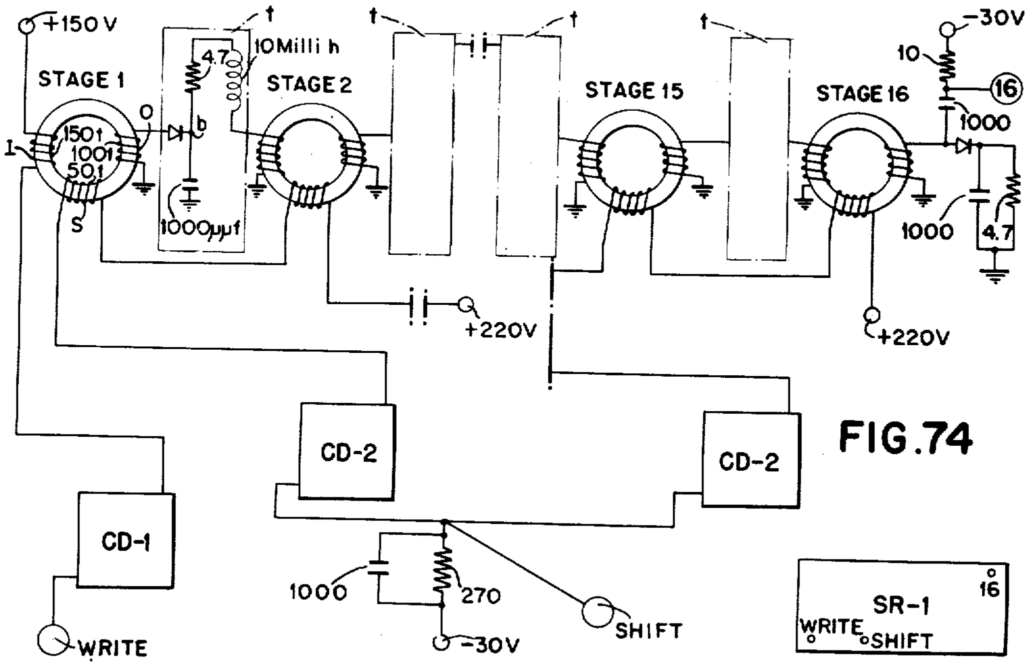
FIG. 74

United States Patent Office 2,889,535
Patented June 2, 1959

2,889,535

RECOGNITION OF RECORDED INTELLIGENCE

Nathaniel Rochester, Wappingers Falls, and Jacob R. Johnson, Gene M. Amdahl, and Walter E. Mutter, Poughkeepsie, N.Y., assignors to International Business Machines Corporation, New York, N.Y., a corporation of New York

Application October 20, 1955, Serial No. 541,592

34 Claims. (Cl. 340—149)

This invention relates to a mechanism for interpreting two dimensional intelligence patterns.

Previous attempts to accomplish the objectives of this invention have depended for their operation upon the use of schemes, all of which had inherent weaknesses. The most common of the previous methods related to recognition of printed characters and compared the characters read with a reference mask, or a series of masks; or counted the number of black lines at fixed horizontal levels of the character. In general, such prior devices have not been practical because of the possible varieties of size of the characters, the actual differences in shapes possible for the representation of each character, and the difficulty in trying to fix the position of the characters horizontally.

The instant invention avoids the former drawbacks and utilizes a novel analysis of recorded intelligence. The new mechanism studies the intelligence generally for its so-called white regions and more specifically for the lakes and inlets found in such intelligence.

An object of the invention is to provide means for identifying two dimensional intelligence patterns by analyzing the white regions thereof.

Another object of the present invention is to provide a method for identifying characters by the analyzing of their white regions.

Another object of the invention is to provide mechanism for identifying characters by analyzing the presence of lakes and inlets.

Still another object of the invention is to provide means for storing the results of a scan of a character to be identified.

A further object of the invention is to provide a marking register for storing the results of the scan.

A still further object of the invention is to provide a marking register for storing the past history of a level of the scan.

Another object of the invention is to provide means for detecting the different basic shapes present in characters.

Still another object of the invention is to provide means for detecting an end of character indication.

A further object of the invention is to provide means for signalling an end of character when there is an absence of black in a vertical scan.

A still further object of the invention is to provide a means for detecting the cross-over of a plurality of black lines in a character.

Another object of the invention is to provide a means for detecting left inlets upon detection of a triple cross-over indication.

Still another object of the invention is to provide means for detecting right inlets upon an end of character indication.

A further object of the invention is to provide mechanisms for distinguishing between triple cross-over characters and non triple cross-over characters.

A still further object of the invention is to provide mechanisms for detecting lakes in characters.

Another object of the invention is to provide mechanisms for detecting a long vertical black line in a character.

Still another object of the invention is to provide mechanisms for detecting an inlet in a non triple cross-over character.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a schematic flow diagram of a character recognition system.

Fig. 2 is a diagram showing the manner in which Figs. 3A to 3I are to be arranged to constitute a complete view.

Figures 1, 2:
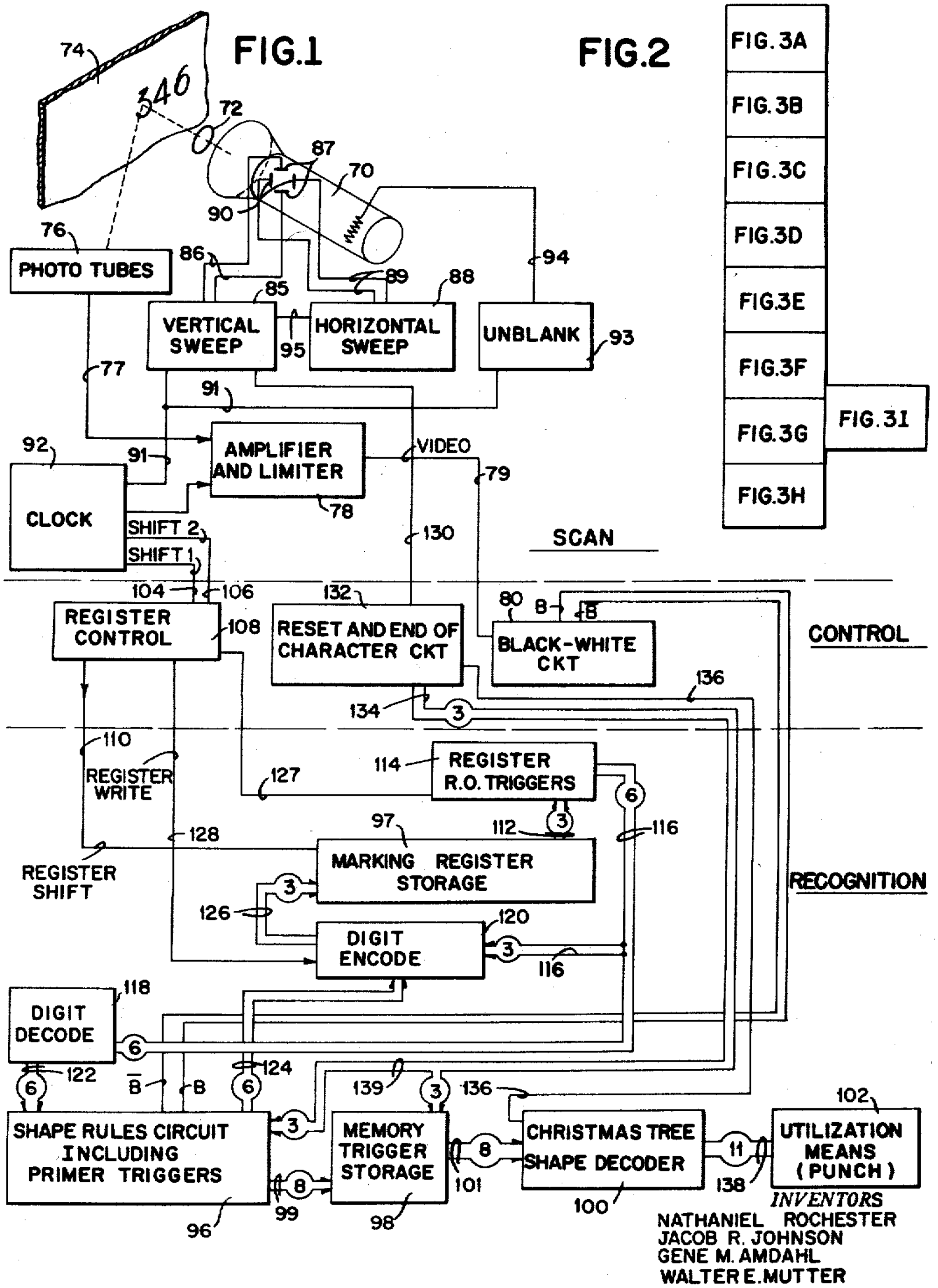

Figs. 3A to 3I, when arranged in the order indicated in Fig. 2, comprises a wiring diagram of the electrical circuits of the character recognition system embodying the preferred form of the invention.

Figures 4, 5:
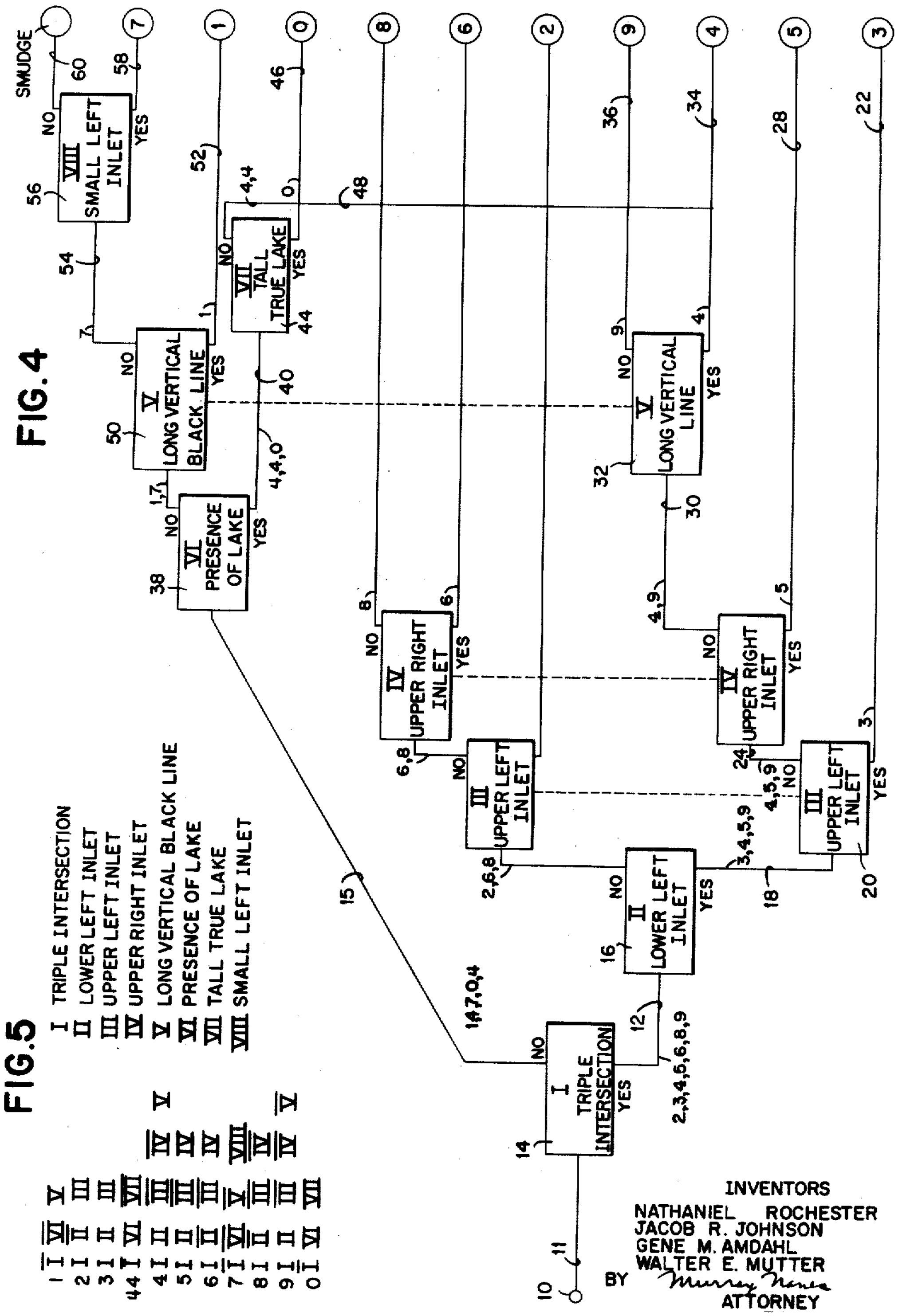

Fig. 4 is a schematic flow diagram of a Christmas tree shape decoder.

Fig. 5 is a chart indicating the numerical characters recognized by the different combinations of shape relay status.

Figure 6:
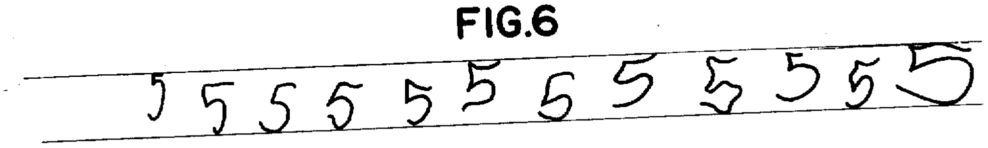

Fig. 6 is a diagram indicating the distortions of form which may exist in a recognizable character "5."

Figure 7:
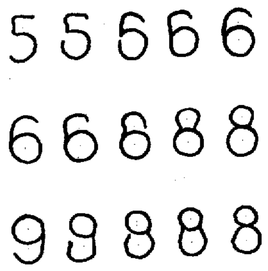

Fig. 7 is a diagram indicating progressive degradation in the form of characters until they look like different characters.

Figure 8:
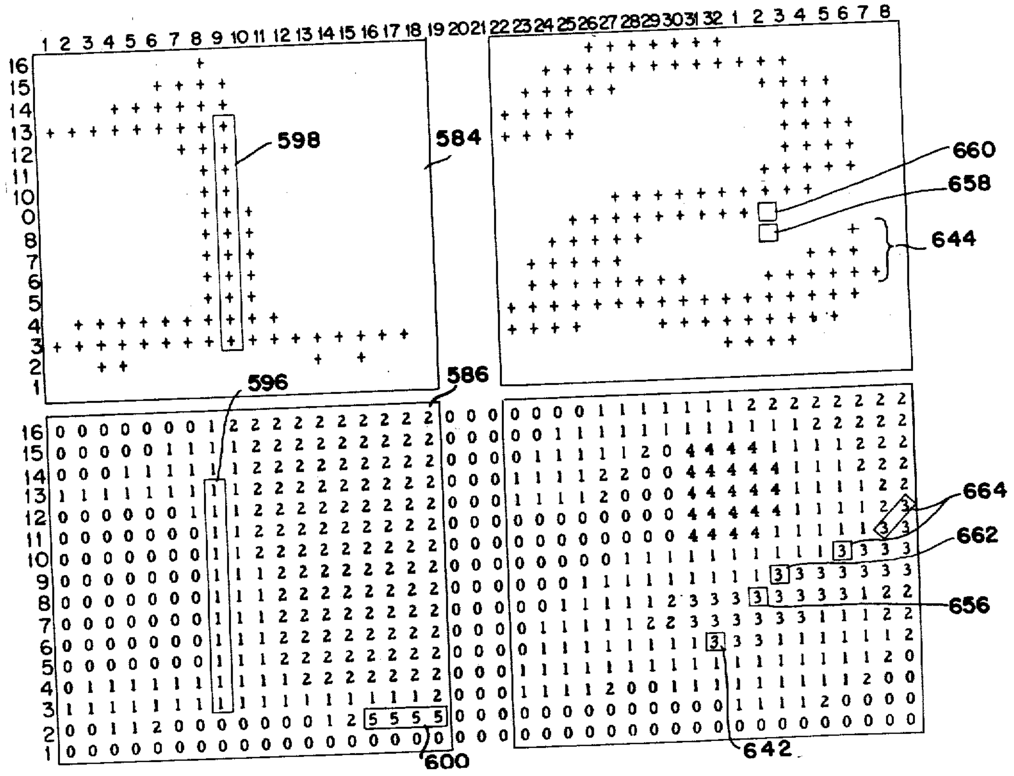

Fig. 8 is a diagram indicating the black bits in a scan of the numerals "1" and "2" and the contents of the marking register during the scanning.

Figure 9:
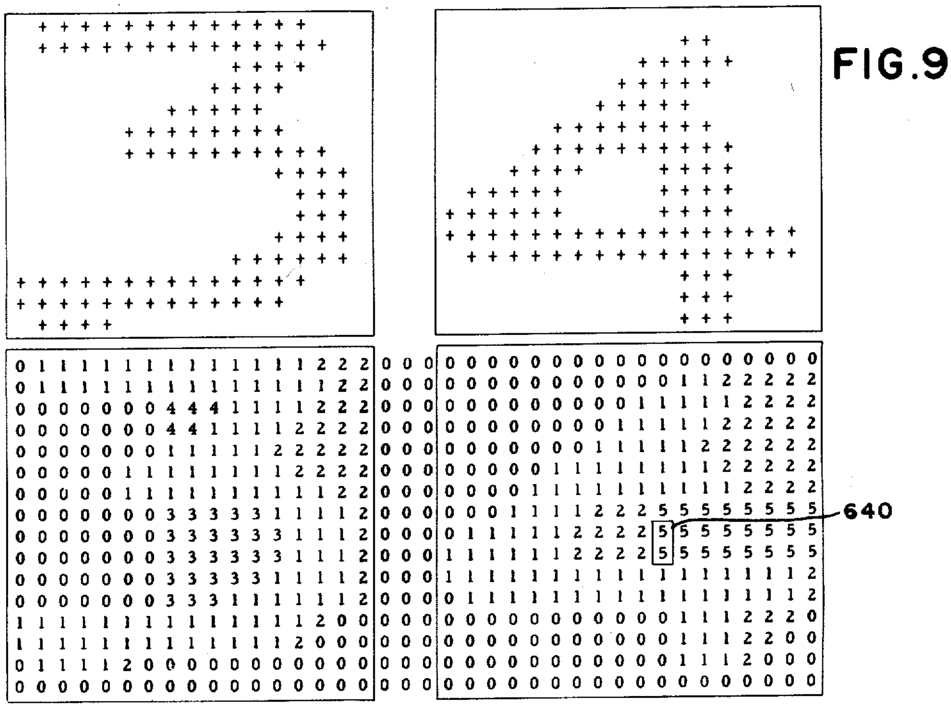

Fig. 9 is a diagram similar to Fig. 8 for the scan of the numerals "3" and "4."

Figure 10:
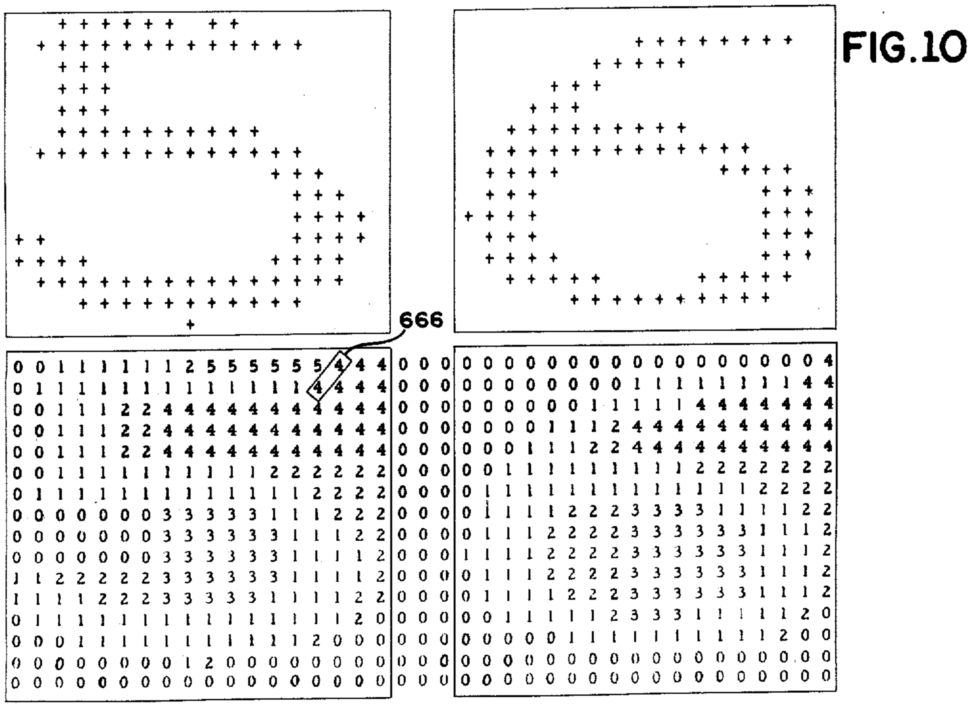

Fig. 10 is a diagram similar to Fig. 8 for the scan of the numerals "5" and "6."

Figure 11:
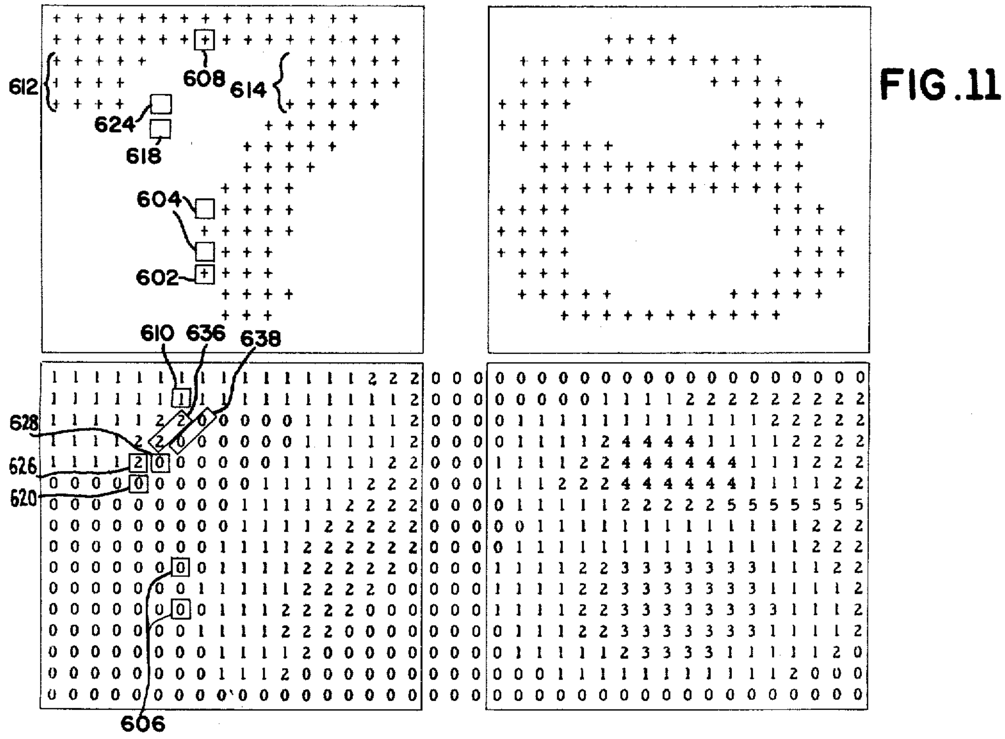

Fig. 11 is a diagram similar to Fig. 8 for the scan of the numerals "7" and "8."

Figure 12:
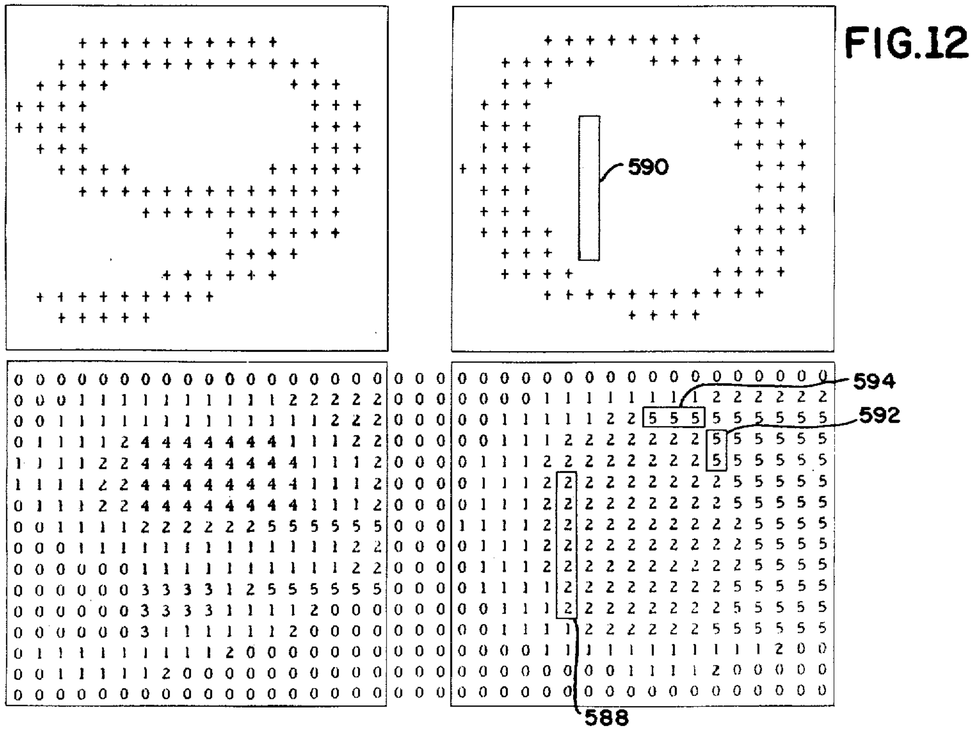

Fig. 12 is a diagram similar to Fig. 8 for the scan of the numerals "9" and "0."

Figure 13:
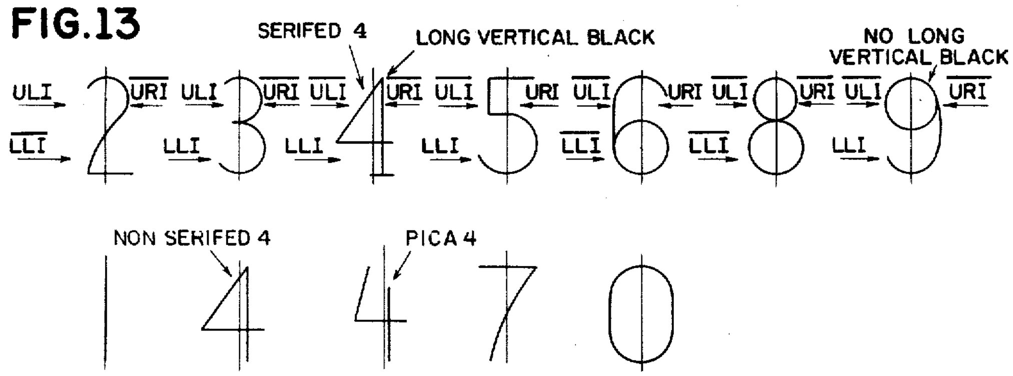

Fig. 13 is a diagram indicating the shapes to be detected for recognition of the different numerical characters.

Figure 14:
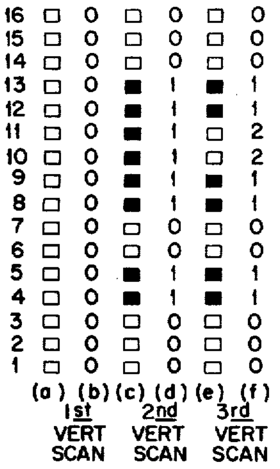

Fig. 14 is a diagram illustrating the operation of the shape rule 1 circuit in modifying the contents of the shift register.

Figure 15:
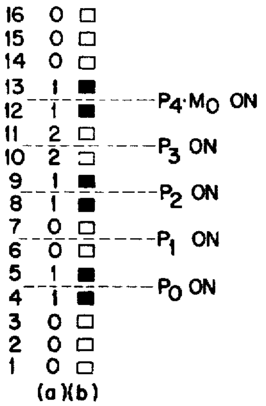

Fig. 15 is a diagram illustrating the operation of shape rules 2 to 7 circuit in modifying the contents of the shift register.

Figure 16:
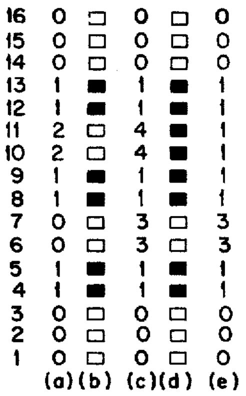

Fig. 16 is a diagram illustrating the operation of shape rules 11 to 12 circuit in modifying the contents of the shift register.

Figure 17:
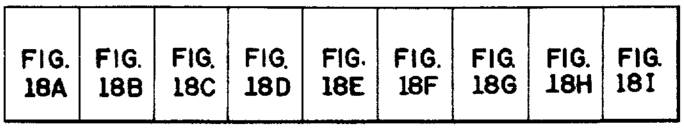

Fig. 17 is a diagram showing the manner in which Figs. 18A to 18I are to be arranged to constitute a complete view.

Figs. 18A to 18I, when arranged in the order indicated in Fig. 17, comprise a timing chart of one horizontal scan by the character recognition circuits.

Figs. 19 to 27 are detailed circuit diagrams and respective block representations of cathode followers employed in the invention.

Figure 28:
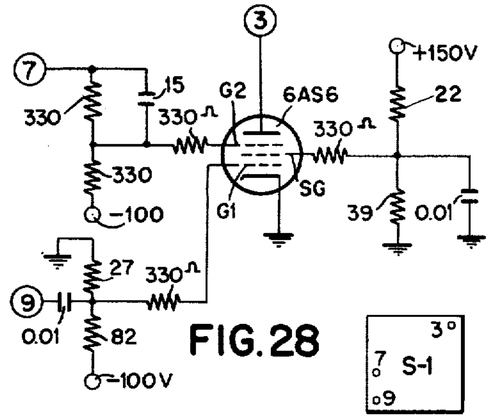
Figure 29:
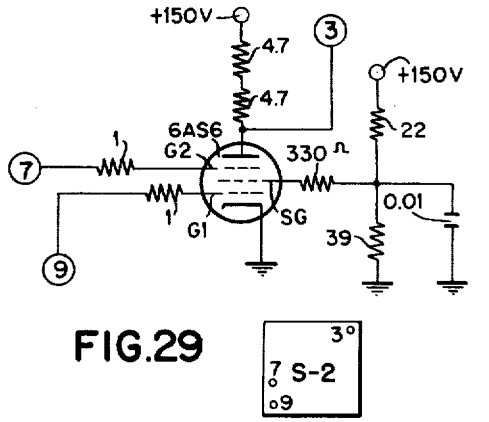
Figure 30:
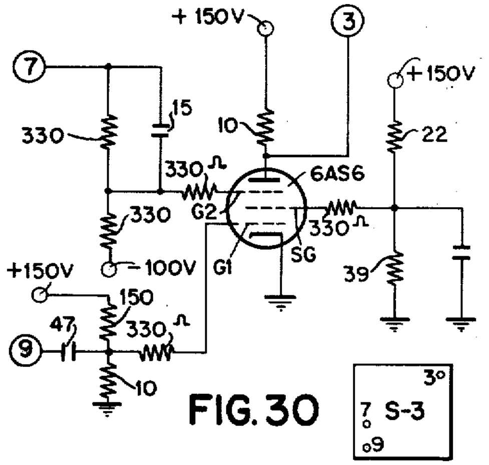
Figure 31:
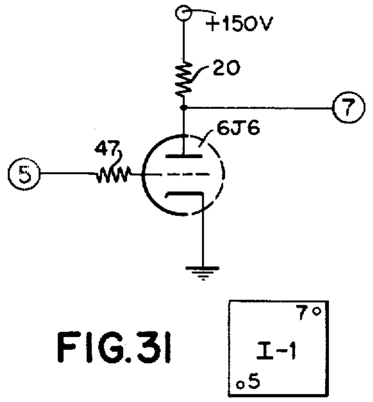

Figs. 28 to 30 are detailed circuit diagrams and respective block representations of multigrid switches employed in the invention.

Figure 31:
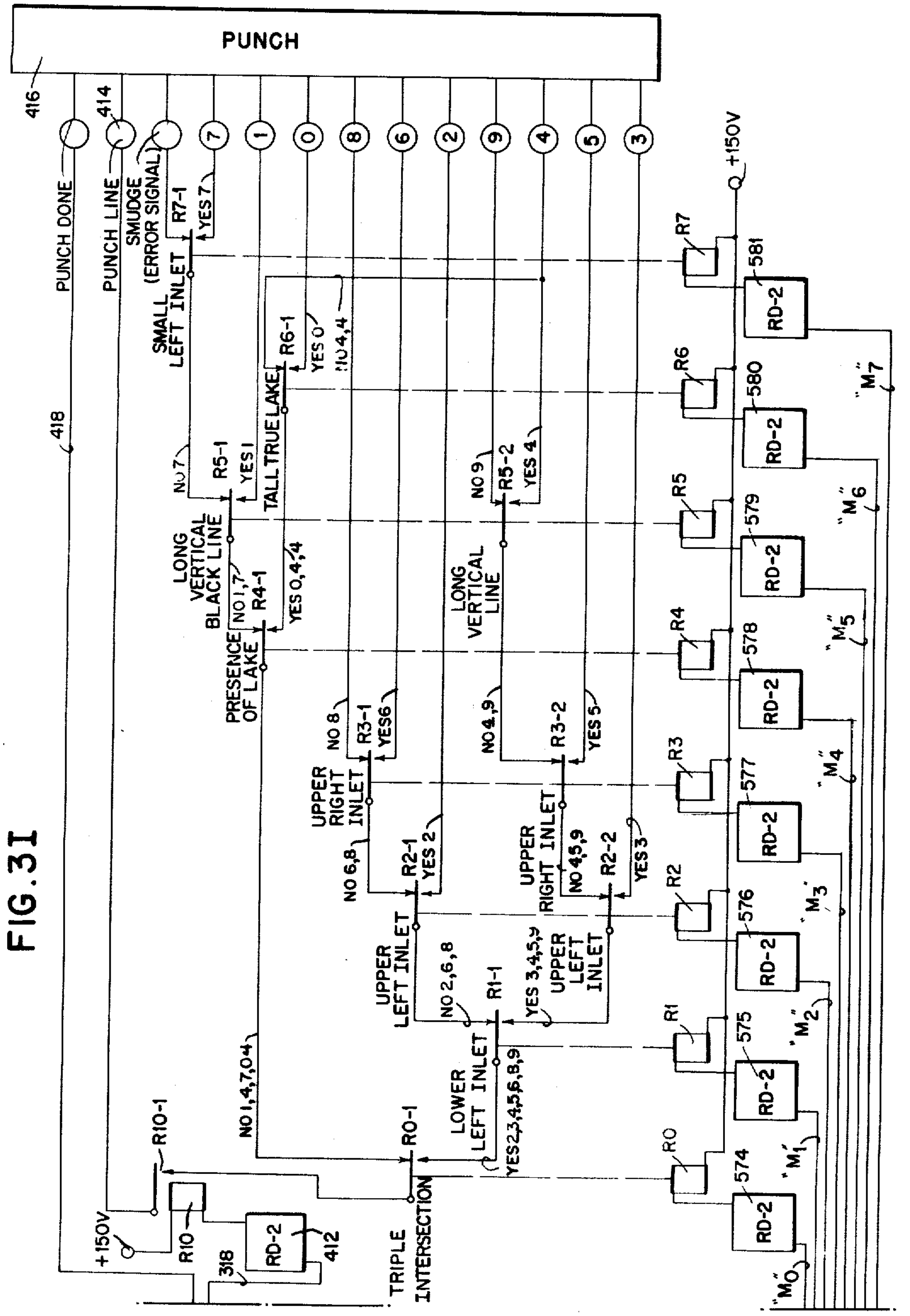
Figure 32:
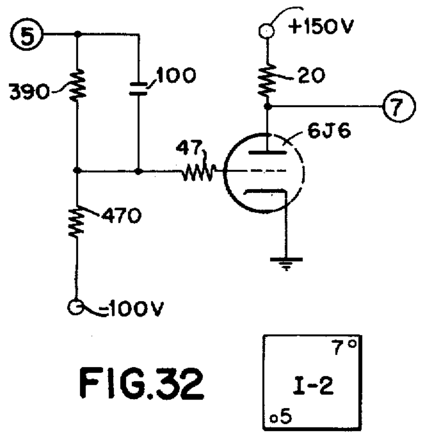
Figure 33:
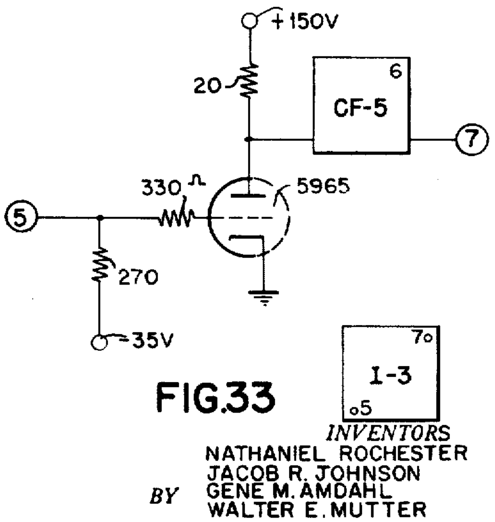

Figs. 31 to 33 are detailed circuit diagrams and respective block representations of inverters employed in the invention.

Figs. 34 to 37 are detailed circuit diagrams and respective block representations of And circuits employed in the invention.

Figure 38:
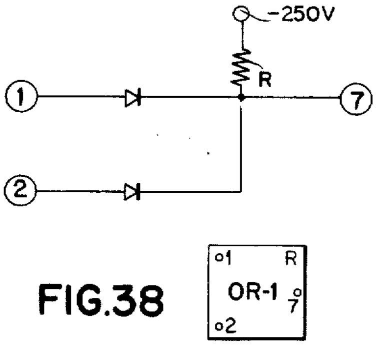
Figure 39:
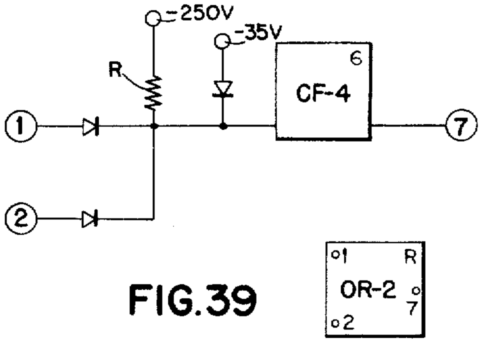
Figure 40:
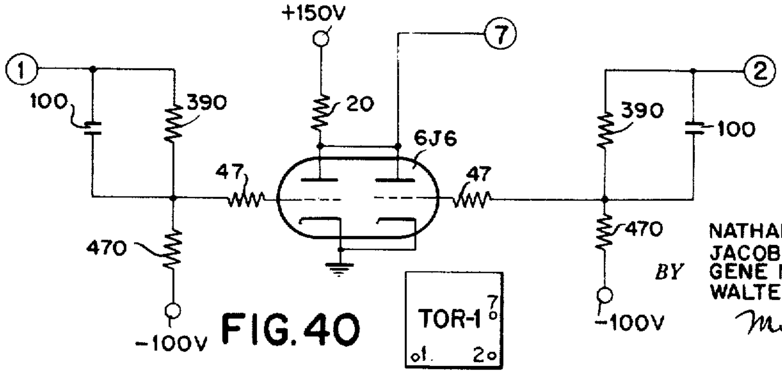

Figs. 38 to 40 are detailed circuit diagrams and respective block representations of Or circuits employed in the invention.

Figure 41:
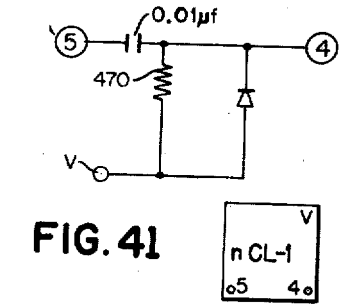
Figure 42:
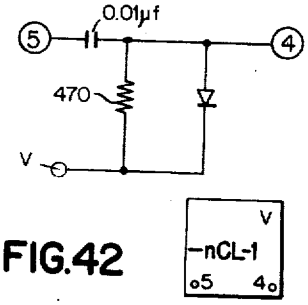

Figs. 41 and 42 are detailed circuit diagrams and respective block representations of clamp circuits employed in the invention.

Figure 43:
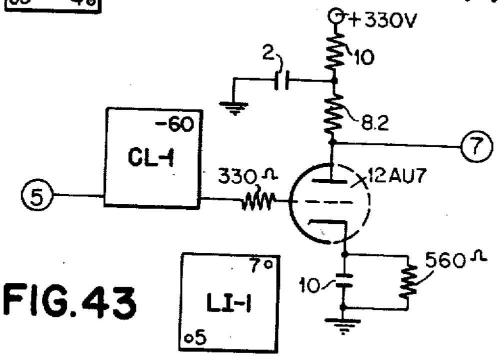

Fig. 43 is a detailed circuit diagram and corresponding block representations of a limiter circuit employed in the invention.

Figure 44:
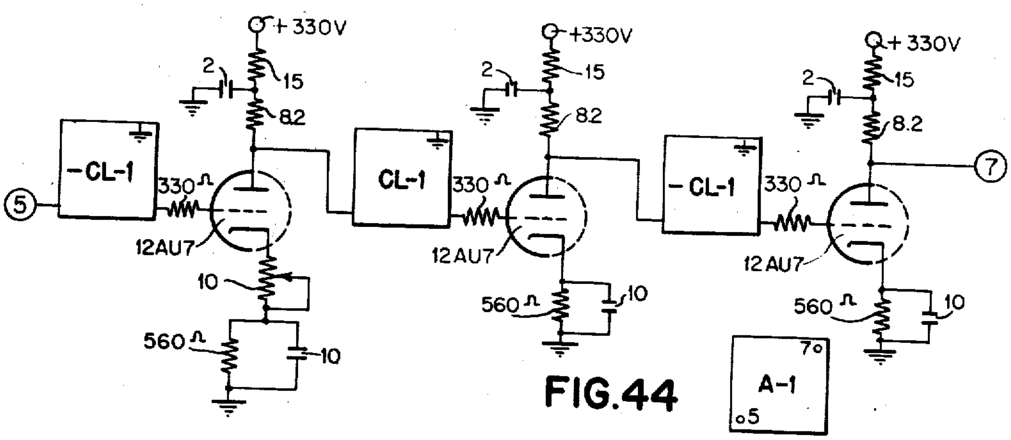

Fig. 44 is a detailed circuit diagram and corresponding block representations of an amplifier employed in the invention.

Figure 45:
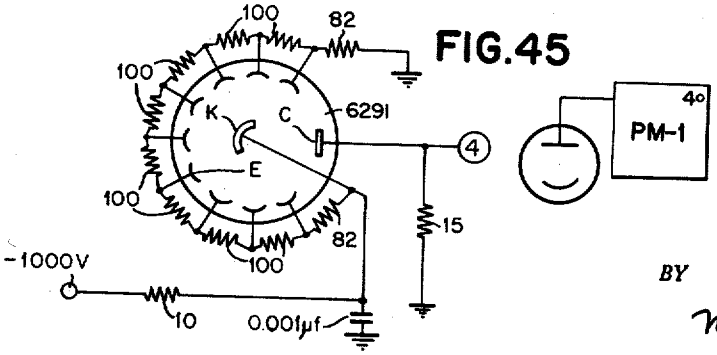

Fig. 45 is a detailed circuit diagram and corresponding block representations of a photo-multiplier employed in the invention.

Figs. 46 to 54 are detailed circuit diagrams and respective block representations of electronic triggers employed in the invention.

Figure 55:
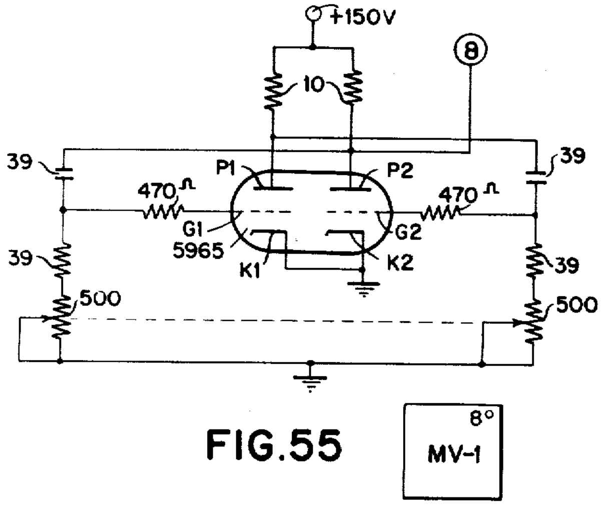

Fig. 55 is a detailed circuit diagram and corresponding block representations of a free running multivibrator employed in the invention.

Figure 56:
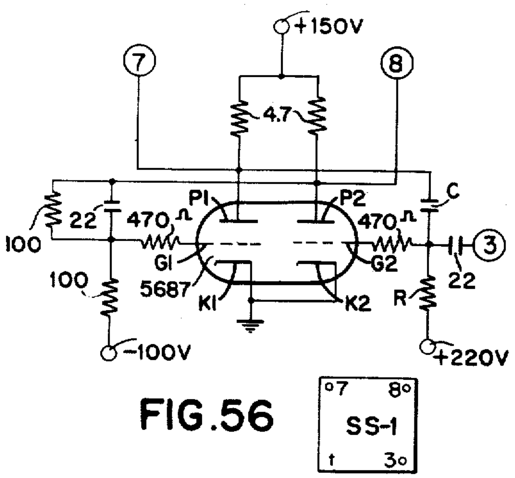
Figure 57:
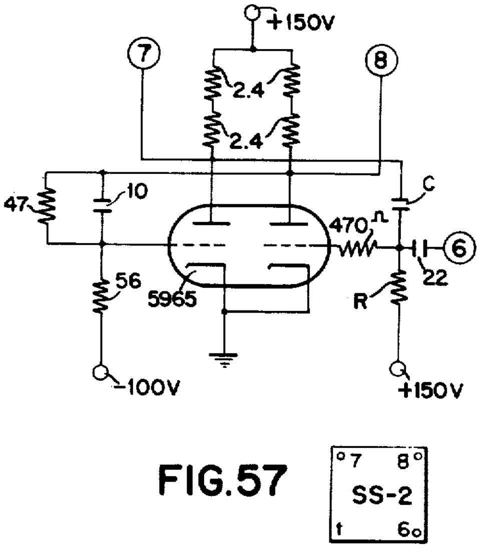

Figs. 56 and 57 are detailed circuit diagrams and respective block representations of single shot multivibrators employed in the invention.

Figs. 58 to 64 are detailed circuit diagrams and respective block representations of counters employed in the invention.

Figure 65:
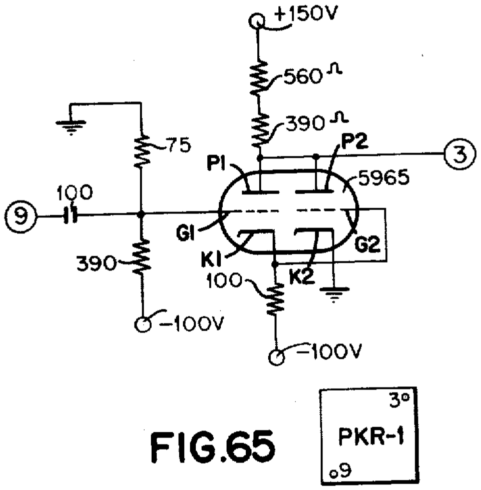

Fig. 65 is a detailed circuit diagram and corresponding block representations of a peaker employed in the invention.

Figure 66:
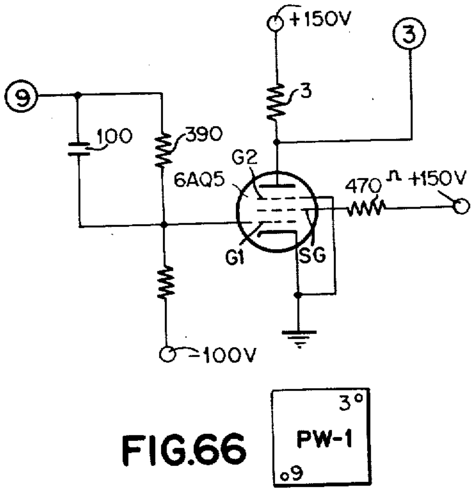

Fig. 66 is a detailed circuit diagram and corresponding block representations of a power unit circuit employed in the invention.

Figure 67:
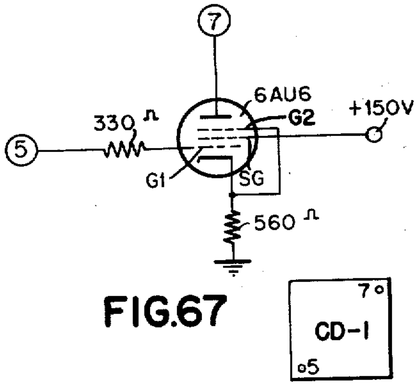
Figure 68:
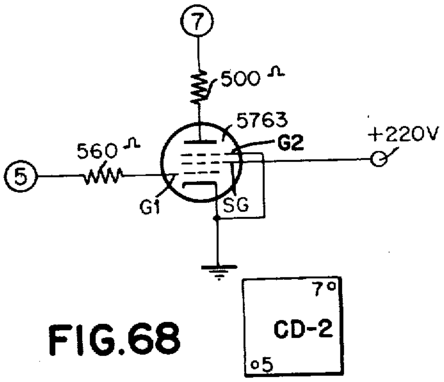

Figs. 67 and 68 are detailed circuit diagrams and respective block representations of core drivers employed in the invention.

Figure 69:
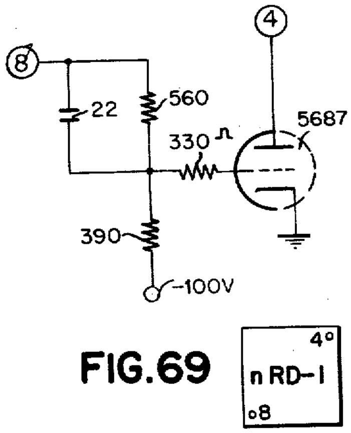
Figure 70:
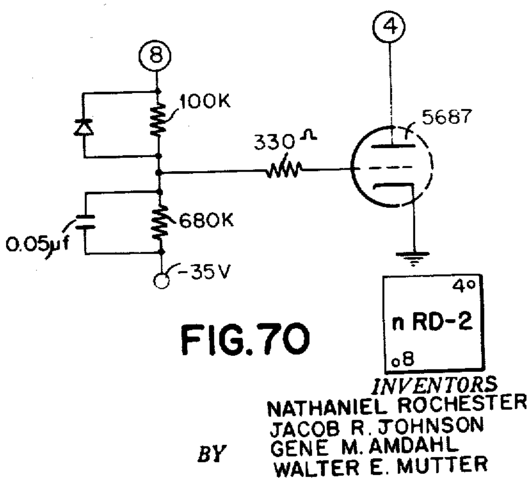

Figs. 69 and 70 are detailed circuit diagrams and respective block representations of relay drivers employed in the invention.

Fig. 71 is a detailed circuit diagram and corresponding block representations of a deflection stage employed in the invention.

Fig. 72 is a detailed circuit diagram and corresponding block representations of a deflection unit employed in the invention.

Fig. 73 is a curve illustrating a preferred hysteresis characteristic for the material of the cores shown in Fig. 73.

Fig. 74 is a detailed circuit diagram and corresponding block representations of a core shifting register employed in the invention.

One embodiment of the invention contemplates that printed characters on a sheet be divided into a suitable number of elemental areas. The number of areas is fixed by the degree of resolution required and may be changed as the circumstances dictate. The character is scanned by a moving light source which applies light to one elemental area at a time. The light source is deflected vertically, in steps, and the light reflected from the paper at each elemental area is analyzed as having been or not having been reflected from the black lines of the character. The results of each vertical scan are stored as coded numbers in a marking register which moves in synchronism with the scanning light beam.

A shape rule circuit in the machine provides a means for modifying the coded numbers put into the marking register, dependent upon the particular white region basic shapes in the characters being read. As a result of the logical coincidence of certain predetermined event involving the presence of white or black, the contents of the marking register, and the state of temporary triggers in the shape rule circuit, shape memory triggers may be turned On or the contents of the marking register may be further modified. This action proceeds while the vertical scan progresses across a character, with the result that a unique configuration of the shape memory trigger states is obtained for each different character to be recognized. Thus, by the time a character has been completely scanned, a decision by a Christmas tree shape decoder circuit dependent upon the states of the shape memory triggers will have been made as to the identity of the character.

ANALYSIS OF WHITE REGIONS

The subject character recognition mechanism looks for the basic features most invariant throughout the range of fonts. In an ideal system, these features should be completely independent of such features as the absolute size of the character, slant proportions and the presence of serifs. The criterion of the basic form of the character is its continued existence through all conceivable distortions of the character up until the point where a human observer becomes uncertain of the identity of an isolated specimen. For instance, the different forms shown in Fig. 6 are easily identified as "5."

It is apparent from Fig. 6 that straight lines, curved lines, height, width, etc., appear to be of little consequence in the mechanism by which the human being discerns a character at first glance.

One of the novel features of this invention is the use of mathematical topology in getting at the crux of the distinctive features. From this point of view, little attention is paid to the lines of the character as such, but the lines are only important insofar as they bound regions. We may consider regions as to type, such as a lake and inlet. The former has its white region bounded on all four sides as found in a 0 or 4, for example. The inlet is a white path bounded on at least two sides and may be distinguished by its position and inlet direction. Four inlets considered are an upper left inlet and lower right inlet, both of which are found in a 2, and a lower left inlet and upper right inlet as in a 5. The use of the regional criteria in the identification of characters may be illustrated by causing the progressive degradation in form of a few characters until they look like different characters. For example, Fig. 7 shows the progressive distortion of the character "5" as it becomes a "6," of a "6" as it becomes an "8," and a "9" as it becomes an "8." At some point along the line, as the "5" degrades to "6," the observer decided that in fact he is looking at a "6." This point seems to correspond quite well with the disappearance of a lower left inlet. Similarly, one begins to think of the "6" as an "8" as soon as the upper right inlet disappears. The degeneration of the "9" into an "8" takes place on the closing on the lower left inlet.

While it may be understod that this white region method may be applied to the recognition of alphabetic characters and other types of intelligence, the description of the invention will be limited to numeric character recognition. It will become clear that the basic principles described may also be applied to the recognition of alphabetic characters.

EIGHT BASIC SHAPES

The lake and the four different inlets described may be considered as five different "basic shapes" to be found in numerical characters. In the preferred embodiment of the numerical character recognition system, a total of eight basic shapes are used; only four of which have been described hereinbefore. These eight basic shapes, all of which will be presently described more fully, are triple intersection, upper left inlet, lower left inlet, upper right inlet, long vertical black line, presence of lake, tall true lake, and small left inlet. Since more than one numerical character may have each shape, it is obvious that for this system to be operative, the characters must be distinguished from each other by the fact that no two characters will have the same combinations of basic shapes.

The logical process by which recognition is achieved will be determined in conjunction with Fig. 4 which is a schematic Christmas tree flow diagram showing each of the different basic shapes as one or more blocks. The lower right-hand exit lead of each basic shape block is a "yes" lead which indicates the presence of that particular basic shape in the character being analyzed, and the upper left-hand exit lead of each basic shape block is a "no" lead to indicate the absence of the particular basic shape. By the time the end of character is reached, the yes and no conditions of the different basic shape block are already set up and a path can be traced from the furthermost left terminal 10 of Fig. 4, through lead 11, towards the right through the blocks and the leads, corresponding to the presence or absence of the basic shapes of the respective blocks, to one of the labeled terminals at the right of Fig. 4 in order to determine which character has been read. The terminals at the right of Fig. 4 are labeled to represent, reading vertically downward, "smudge," 7, 1, 0, 8, 6, 2, 9, 4, 5, and 3. Any unrecognizable characters or dirt on the paper will show up as "smudge" to operate an error signal or print an asterisk, as desired. Referring to Fig. 13, the most common printed numeric characters are shown. It can be noted that three printed fours are shown labeled as "serifed 4," "non-serifed 4" and "pica 4." This recognition system regards the three fours as being three different characters, but, of necessity, the result of scanning each of these numerals in Fig. 4 will be one output meaning "four." In a universal machine designed to read all types of printed characters, there may be many such parallel paths by means of which recognition can be achieved.

I. *Triple intersection*

The basic shape known as the triple intersection is found in characters where a vertical line through the character crosses three horizontal black lines, implying that the character has one inlet or fully enclosed white region above and adjacent to another inlet or fully enclosed white region. From Fig. 13 it can be seen that the characters having the triple intersection basic shape, hereafter called triple intersection characters, are the 2, 3, serifed 4, 5, 6, 8, and 9, all of which appear on the "yes" lead 12 (Fig. 4) of a triple intersection block 14. The non-triple intersection characters are the 1, non-serifed 4, pica 4, 7 and 0 which appear on the "no" lead 15 of the triple intersection block 14.

II. *Lower left inlet*

The triple intersection characters are further separated from each other by means of the detection of a lower left inlet basic shape. The "yes" lead 12 (Fig. 4), from the triple intersection block 14, is connected to a lower left inlet block 16. The lower left inlet is detected when the lower white area of the triple intersection (the white area between the two lower intersections) is able to be projected outward to the left of the character without being completely obstructed by a black line.

Characters that have a lower left inlet are the 3, serifed 4, 5 and 9. This can be observed in Fig. 13 where characters with the lower left inlet have this region labeled LLI, while characters without it, such as the 2, 6, and 8, have this region labeled $\overline{\text{LLI}}$. (The bar above the LLI meaning no lower left inlet.)

III. *Upper left inlet*

To further separate the 3, serifed 4, 5, and 9, the presence of an upper left inlet (ULI in Fig. 13) basic shape, is detected by connecting the "yes" lead 18 of the lower left inlet block 16 to the upper left inlet block 20. The upper left inlet is equivalent to the lower left inlet except that the upper white area of the triple intersection can be projected to the left. The character 3, which has an upper left inlet, appears on the "yes" lead 22 of the upper left inlet block 20, and is connected to a terminal representative of a 3. Thus, the means for recognizing the character 3 consists of detecting the presence of the three basic shapes, triple intersection, lower left inlet and upper left inlet. The "no" lead 24 of the upper left inlet block 20 represents the characters serifed 4, 5, and 9.

IV. *Upper right inlet*

To further separate the 5 from the serifed 4 and 9, the presence of an upper right inlet (URI in Fig. 13) is detected by connecting the "no" lead 24 of the upper left inlet block 20 to an upper right inlet block 26. The upper right inlet is equivalent to the upper left inlet except that the upper white area of the triple intersection character can be projected to the right without being completely obstructed by a black line. The character 5, which has an upper right inlet, appears on the "yes" lead 28 of the upper right inlet block 26, and is connected to a terminal representative of a 5. Thus, the means for recognizing the character 5 consists of detecting the presence of the basic shapes, triple intersection, lower left inlet, and upper right inlet, and the absence of the upper left inlet basic shape. The "no" lead 30 of the upper right inlet block 26 represents the characters serifed 4 and 9.

V. *Long vertical black line*

To differentiate between a serifed 4 and a 9, a long vertical black line basic shape may be used. This is true because in none of the fonts in general use today does a 9 exist with a long vertical black line where the 4 being used has a serif. The method for detecting a long vertical line for determining just how long the line must be to be considered long, will be described later. In Fig. 4, the "no" lead 30 from the upper right inlet block 26, is connected to the long vertical line block 32, the "yes" lead 34 of which represents a serifed 4, and the "no" lead 36 of which represents a 9. It can be understood at this point, that if the type of font known as Gothic is being read, the 4 will have no serif and the 9 will have a long black line. To read Gothic font it is then necessary to disconnect the long vertical black line block 32 from the "no" lead 30 of the upper right inlet block 26. The "no" lead 30 may then be directly connected to the terminal representing a 9.

VI. *Presence of true or quasi-lake*

The non-triple intersection characters 1, non-serifed 4, pica 4, 7 and 0 appear on the "no" output lead 16 of the triple intersection block 14. These characters may be further separated for recognition by the detection of the presence of a lake. It is obvious that a non-serifed 4 and a 0 contain true lakes which are white areas completely surrounded by black. The pica 4 however, has an opening on top (see Fig. 13). It has been found practical for ease of recognition, to consider that the pica 4 has a quasi-lake. In the preferred embodiment of the invention, both the true lake and quasi-lake are detected as a lake. The "no" lead 15 from the triple intersection block 14 is connected to the presence of lake block 38, the "yes" lead 40 of which represents the characters non-serifed 4, pica 4 and 0, and the "no" lead 42 of which represents the characters 1 and 7.

It may be observed that there are lakes in triple intersection characters, but these have no effect on the recognition system because it is possible to distinguish each of the triple intersection characters from the others without making use of the presence or absence of lakes.

VII. *Tall true lake*

The 0 can be distinguished from the non-serifed 4 and the pica 4, by a determination that the former has a tall true lake, while the non-serifed 4 has a short lake and the pica 4 has a quasilake. Thus, the "yes" lead 40 from the presence of lake block 38 is connected to the tall true lake block 44, the "yes" lead 46 of which is connected to a terminal representing the character 0, and the "no" lead 48 (which represents the non-serifed 4 and the pica 4) is connected to lead 34 and the terminal representing all fours.

The characters 1 and 7 may be distinguished from each other by the presence in the character 1 of the same long black line described as present in a serifed 4. The "no" lead 42 of the presence of lake block 38 is connected to a long vertical line block 50, which operates in the same manner as the long vertical line block 32. The "yes" lead 52 of the long vertical line block 50 is connected to a terminal which represents the character 1 and the "no" lead 54 of block 50 represents the character 7.

VIII. *Small left inlet*

The fact that only a character 7 indication appears on the "no" output lead 54 of the long vertical line block should ordinarily be enough for the recognition of a character 7. However, this would mean that a character 7 would be recognized by the absence of any indications, and would also be detected when there might be only a smudge on the paper.

The eighth basic shape then, is a small left inlet, i.e. an inlet from the left of at least a fixed minimum size to be later described. Since a 7 on all types of font has some sort of left inlet, it can be distinguished from a smudge. The fact that some of the triple intersection characters have a left inlet will not effect the operation of the recognition system because the fact of the presence or absence of a small left inlet is not used in recognizing triple intersection characters. The "no" lead 54 of the long vertical line block 50 is thus connected to a small left inlet block 56, the "yes" lead 58 of which is connected to a terminal representing a seven and the "no" lead 60 of which is connected to a terminal which represents a smudge or error.

It is believed unnecessary to follow through a complete written description of how the rest of the numeric characters are recognized. However, it will be a relatively simple matter to trace the selection of the characters which have not been described, through the Christmas tree network. As a further aid, Fig. 5 shows a listing of the Roman numeral representing each of the eight basic shape blocks and a table listing the operation or non-operation of the basic shape blocks for all the numeric characters being sensed. If a basic shape block is not operated (i.e., produces a "no"), the Roman numeral representing it is shown in Fig. 5 with a bar over it, i.e. $\overline{\text{V}}$ represents no long vertical black line, but if the basic shape block is operated, the Roman numeral is shown without the bar, i.e. VI represents presence of lake.

Referring to the character 2 of Fig. 5, for example, it can be observed that a character 2 is recognized when basic shape blocks I and III are operated and relay II is not operated. Similarly, the character 5 is recognized when relay I, II, and IV are operated and relay III is not operated.

FLOW DIAGRAM—SCANNER

Referring now to Fig. 1, a flow diagram of the preferred embodiment of the invention is shown as basically consisting of scan, control and recognition circuits. The scan circuits include a cathode ray tube 70. A spot of light on the fluorescent screen of the cathode ray tube 70, produced by a beam therein, is focused by a lens system 72 onto a document 74 which contains the characters to be identified. The reflected light is collected by phototubes 76 which produce an output signal proportional to the amount of light striking them. Since the light reflected from an inked or black area of the document 74 is less than that reflected from an uninked or white area, a smaller signal will be produced by the black area. The signal is fed via a lead 77 to an amplifier-limiter unit 78 which amplifies it, but selects only the larger or white signals for transmission via a lead 79 to a Black-White circuit 80. The Black-White circuit has two output leads B and B, the former of which signals the presence of a black bit (incremental area) and the latter of which signals the presence of a white or no black bit.

The beam producing the spot of light may be moved stepwise vertically by a suitable vertical deflection generator 85 acting via leads 86 on vertical deflection plates 87. The beam may be moved stepwise horizontally by a horizontal deflection generator 88 acting via leads 89 on horizontal deflection plates 90. The vertical deflection generator is controlled via a lead 91 by a clock circuit 92 which is the master timer for the character recognition machine.

The vertical deflection generator 85 causes the beam to move vertically upward on the face of the scope in thirty-two discrete steps. Even though the presence of black or white is determined at each of the thirty-two discrete steps, only sixteen steps, or every other one of the thirty-two steps, is utilized in the recognition scheme because it has been found that the analysis of 16 bits per vertical sweep produces adequate recognition results. It may be understood however, that more or less bits may be used without materially altering the invention. The beam is not moved continuously because of the problem of phosphor persistence of the spots of light on the cathode ray tube screen 70. An unblank circuit 93 is controlled by the clock circuit 92, via lead 91 and in turn is connected to the control grid of the cathode ray tube 70 via a lead 94 to permit the beam to place the spot of light on the cathode ray tube screen only during a portion of the time that the beam is at rest.

The scanning process normally starts with the spot at a lower left home position. Upon reaching the top of the vertical scan, the vertical deflection generator 85 resets the beam to the home position and via a lead 95 steps the horizontal deflection generator 88 to cause the next scan to begin one horizontal step to the right of the previous vertical scan. The vertical scanning progresses across the characters from left to right until there is a complete absence of black during one complete vertical scan, which indicates the end of the character being scanned.

MARKING REGISTER CODING

During the progress of the scanning and at the end of character, recognition circuits operate to detect the presence of the lakes and inlets. These recognition circuits comprise shape rule circuit 96 (Fig. 1) and storage means. The storage means are shown in Fig. 1 as a marking register 97 and memory trigger 98. The marking register 97 stores binary coded numbers which are determined by the result of each bit and the history of previous bits, as modified and controlled by the shape program rule circuit 96. The memory triggers 98 are controlled via leads 99 by the shape program rule circuits 96 to store the finding of the particular shapes of the eight basic shapes which are present in the character being scanned.

The marking register 97 has 16 positions of storage corresponding to the 16 bits of the vertical scan. Each position of storage is capable of storing any number from 0 to 7 in binary coded form. In the preferred scheme for recognizing numeric characters, it is only necessary to store coded numbers from 0 to 5. The binary coded numbers stored in the marking register 97 are caused to move through the marking register 97 in synchronism with the scanning beam.

These binary coded numbers are assigned in the marking register for each elemental area or bit according to an arbitrary code. At the start of the scan of a character, all white elemental areas are assigned the arbitrary coded number 0, and black elemental areas are assigned the number 1. This is illustrated in Fig. 14 where column (*a*) illustrates the black-white determination made in a first vertical scan. All sixteen elemental areas are shown as white. Column (*b*) of Fig. 14 indicates that coded 0's were assigned to the 16 position of the marking register to represent the 16 white bits in the vertical scan.

Column (*c*) illustrates the black-white determinations made in a second vertical scan, and the assigned numbers therefor are illustrated in column (*d*). It can be observed, that the fourth, fifth, and eighth to thirteenth inclusive, bits from the bottom, which are indicated as black in column (*c*), have each been assigned the coded number 1 in column (*d*). The number coded 0 continues to be assigned to the white bits.

It can be pointed out at this time, that it is possible to store the result of each bit in some sort of storage means and keep the indication of each bit of every vertical scan therein. However, it has been found that by the use of coded numbers, it is possible to use a single marking register which will contain numbers representative of not only the present bits but of the past bits. For instance, if the tenth bit from the bottom was black on the previous scan and is now white, the tenth bit is assigned the coded number 2, which indicates that the tenth bit is now white but had black bit to its left. Thus, the fact that a white bit may be assigned the coded number 2 or the coded number 0 indicates that the past history of the horizontal row containing the bit may be determined by the coded number assigned. In Fig. 14, column (*e*) illustrates the black-white determination made in a third vertical scan, and column (*f*) indicates the assigned coded numbers therefor. The only change in column (*e*) over column (*c*) is that the tenth and eleventh bits which were black, have now become white. The coded number 1 assigned to the tenth and eleventh bits in column (*d*) are now changed to coded number 2.

If the white bit in a horizontal row had been assigned the coded number two and again changes to black, the coded number 5 is assigned to that bit, as will be illustrated later.

It now becomes possible to detect a triple intersection which has previously been defined as the crossing, during a vertical scan, of three black lines of a character. It is to be noted that the fact that there are three black lines implies that white areas exist between the black lines.

Referring to Fig. 15, column (*a*) indicates a vertical scan in which black was crossed three times. This can be observed by noticing that in scanning upward, there is a coded 1 indicating a first black at the fourth bit from the bottom, a coded 0 indicating white at the sixth bit from the bottom, a coded 1 indicating a second black at the eighth bit, a coded 2 indicating white at the tenth bit, and a coded 1 indicating a third black at the twelfth bit. To insure against accidental indications of triple intersection, it has been found expedient to test for triple intersection on two successive vertical scans. Fig. 15, column (*b*) indicates a second vertical scan crossing black three times. The triple intersection indication is then stored in one of the memory triggers 98 in a manner to be described hereinafter.

On the scan immediately following the second successive scan indicating a triple intersection, a determination is made as to whether there are upper and lower left inlets. If the white area between the lower and middle black intercepts which existed during the second triple intersection indication scan has been assigned the coded number 0 in the marking register, it is an indication of a lower left inlet, i.e. this area is not closed by black to the left. If this white area had been assigned the coded number 2, it is an indication of no lower left inlet. The indication of presence of lower left inlet is then placed in one of the memory triggers 98. As this vertical scan continues, a determination is made in a similar manner, as to whether the white area between the middle black intercept and upper black intercept which existed during the second triple intersection indication scan was closed by black to the left, and an indication of presence of an upper left inlet is stored in one of the memory triggers 98. Referring to Fig. 16, column (*a*) indicates the assigned coded numbers that may be in the marking register having the second triple intersection indication scan. The sixth and seventh bits from the bottom were assigned the number 0, and are between the bottom and middle black bits. Since they are assigned the coded number 0 instead of 2, it is an indication that there is a lower left inlet in the character being scanned. The tenth and eleventh bits from the bottom were assigned the number 2, and are between the middle and upper black bits, indicating no upper left inlet.

In order to be able to detect upper and lower right inlets, the white area between the lower black intercept and the middle black intercept is assigned the coded number 3 in the marking register, and the white area between the middle black intercept and the upper black intercept is assigned the coded number 4. This assignment takes place in the first vertical scan after the second triple intercept indication scan, and occurs simultaneously with the detection of upper and lower left inlets. At this point it may be understood that while the lower right inlet has not been used in the preferred embodiment, it may be used for checking purposes, and the method for detecting its presence is therefore described. Referring again to Fig. 16, column (*b*) illustrates the black-white determination made in the vertical scan following the second trip intersection indication scan, and column (*c*) indicates the assigned coded numbers therefor. The sixth and seventh bits from the bottom are white, and since these white bits are between a lower black intercept and a middle black intercept, they have been assigned coded number 3 in column (*c*). The tenth and eleventh white bits are between the middle black intercept and an upper black intercept, and have been assigned the coded number 4.

In Fig. 16, column (*d*) illustrates the black-white determinations made in a scan following the vertical scan of Fig. 16 column (*b*), and column (*e*) indicates the assigned coded numbers therefor. The only change in column (*d*) over column (*b*) is that the tenth and eleventh bits which were white, have now become black. The coded numbers 4 assigned to the tenth and eleventh bits are now changed to coded numbers 1 to indicate a black to the right.

It is to be noted that the coded number 3 assigned to the sixth and seventh bits remain coded 3's in column (*e*) because these bits remain white. Since coded 3's and 4's can only be assigned during the scan following the second triple intersection scan, and since the coded 3's and 4's are replaced by coded 1's if there is black to the right; if there are coded 3's present at the end of character, it is an indication of a lower right inlet, while if there are coded 4's present, it indicates an upper right inlet. The end of character determination is made when there is a complete vertical scan having all white bits.

At the end of character indication, a Christmas tree shape decoder 100, which operates like the previously mentioned Christmas tree of Fig. 4, analyzes the memory triggers 98 via leads 101, to determine the numerical character on the document 74. This numerical character may then be punched out on a punch, or used by any other utilization means 102, as desired.

FLOW DIAGRAMS—CONTROL AND RECOGNITION CIRCUITS

The method for detecting the triple intersection and inlet basic shapes, from the binary coded numbers in the marking register and the status of the memory triggers, has been briefly described. The means for detecting the other basic shapes will be described later, but the description of the flow diagram of the recognition and control circuits can now be continued.

In order to get the marking register to move in synchronism with the scanning beam, the clock circuit 92 produces pulses alternately at a fixed frequency on a shift 1 line 104 and a shift 2 line 106, and feeds these pulses to register control circuits 108. A pulse appears on the shift 1 line at the same time the vertical sweep generator 85 is pulsed to step the light beam. A pulse fed by the shift 2 line 106 to the register control circuits 108 controls the shifting of the marking register 97 by causing a pulse on a register shift line 110 which is connected to the marking register 97 to cause the contents of the marking register 97 to be shifted one position. The contents of the sixteenth stage of the marking register are thereby shifted through three leads 112 to register readout trigger circuits 114, where they are temporarily stored, still in binary form. The binary indications are applied through six leads 116 to a digit decode circuit 118, and through three of the six leads 116 to a digit encode circuit 120. The digit decode circuit 118 converts these binary coded indications to an equivalent one out of six coded indication which is applied via one of six leads 122 to the input of the shape program rules circuits 96. In the one out of six code, six numbers may be indicated by having each number represented by a different one of six leads being operative. The black indication lead B and the white indication $\bar{B}$ are also connected to the input of the shape rules circuit 96. The shape rules circuit 96 operates in such a manner that a one out of six coded indication will appear at its output which is dependent upon the different combinations of one out of six coded indications from the digit decode 118 and the presence of a black or white indication. For instance, as previously described, if the one out of six coded input to the shape rules circuit 96 is a coded 1, and there is a white indication, a one out of six coded 2 will appear at the output of the shape rules circuit 96. The output one out of six coded indications are fed through one of six leads 124 and applied to the digit encode circuits 120. The output one of six indication on leads 124 is converted to a binary coded indication and fed via three leads 126 for writing into the first stage of the marking register 97. Writing into the first stage of the marking register does not occur until a pulse appears on a write line 128 which is connected from the register control circuits 108 to the digit encode circuits 120. The write pulse from the register control circuit 108 is produced by a pulse on the shift 1 line 104 to the register control circuit and therefore occurs between two register shift pulses. At the time of a write pulse, if there is no output one of six indication on any of the leads 124, the binary coded indication on the three leads 116 are transmitted through the digit encode circuit 120 through leads 126 to the first stage of the marking register 97. Immediately after the register write pulse, a register read out trigger reset pulse from register control circuits 108 over lead 127, resets the register read out triggers.

At the start of the scan of each character, the marking register 97 is set so that all its 16 stages contain coded zeros. When the scanning beam is at the bottom of a sweep and is unblanked for the first bit, the register contents are in position so that the coded zero stored in the 16th position is shifted to the register read out triggers 114.

Assume that the first bit is white. The presence of white on line $\bar{B}$ and the presence of a coded zero on one of the leads 122 are indicated at the input of shape rules circuit 96. In this particular case, as will be later more fully described, there is no output from the shape program rules circuits 96 to the digit encode circuits 120. Therefore, the coded zero in the register read out triggers 114 is effectively transmitted to the first stage of the marking register 97.

After the events for this first bit are completed, the beam is moved vertically upward to where the second scan spot is to be sampled, and the contents of the marking register are shifted so that the second binary coded digit (then in the 16th stage, is shifted to the register readout triggers 114. Assuming that the second sample is black, the presence of black on line B combined with the presence of a coded zero on one of the leads 122, are indicated on the input of the shape rules circuit 96. In this case, the one lead of the one out of six output from the shape program rules circuit 96 is effective, and this coded number 1 is transmitted via the digit encode circuit 120 where it is converted to a binary coded number and written into the first stage of the marking register 97. This process continues in the same manner until the beam reaches the top of the scan when it is returned to the bottom, home position. At this point, the marking register has gone through a complete cycle and the first coded number is again in the register readout triggers 114 in position to be read out. At this point the vertical sweep generator 85 produces a pulse on an end of vertical scan line 130. This pulse is fed to a reset and end of character circuit 132. The reset and end of character circuit 132 contains three output leads 134, which are connected to primer triggers (to be described hereinafter) in the shape program rules circuit 96, and also to the memory triggers 98. The vertical scans will continue until a complete vertical scan has taken place without the sensing of a black area, indicating an end of character. An OK to Punch signal then appears at the output of the end of character circuit 132 and is transmitted via an OK to Punch lead 136 to the Christmas tree shape decoder circuit 100. The character then represented by the Christmas tree shape decoder is transmitted through leads 138 to the punch 102 where an indication is made of the character that has been sensed from the document 74.

In order to more fully understand the interrelation between the shape rules circuit 96, the marking register 97, and the memory trigger storage 98, these circuits must be described in more detail and therefore a description will be given of Figs. 3A to 3I which comprise the circuits of the invention.

CONVENTIONS EMPLOYED

Figure 19:
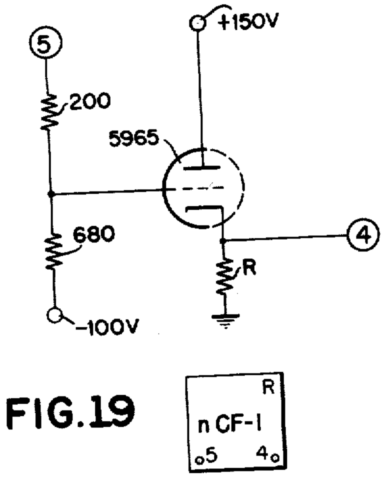
Figure 20:
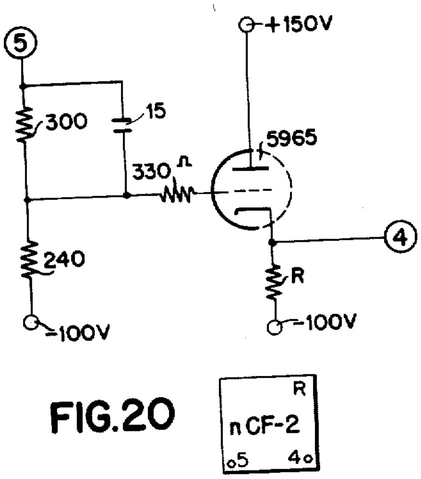
Figure 21:
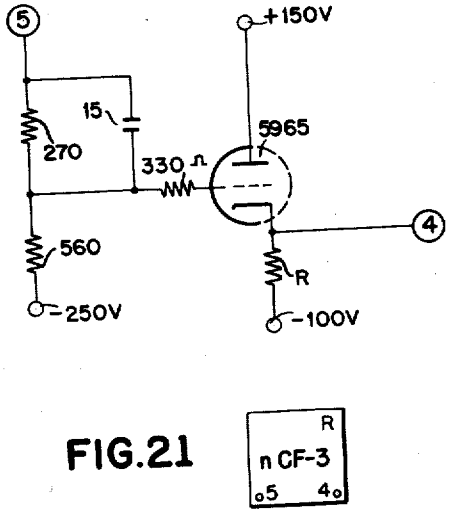
Figure 22:
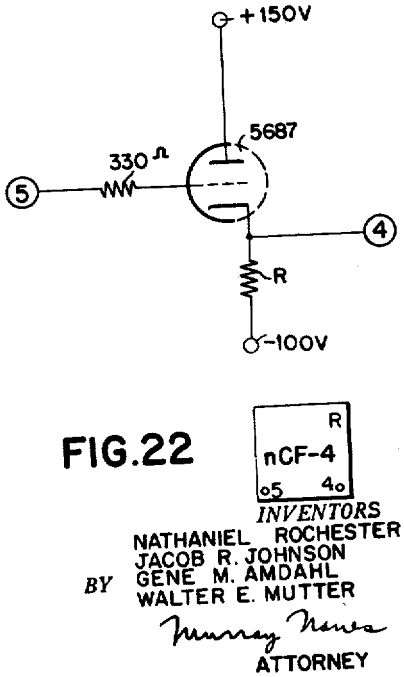
Figure 23:
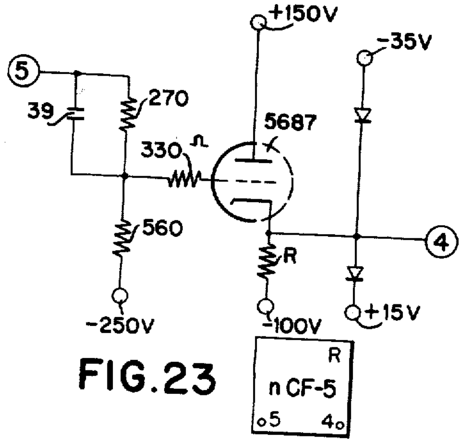
Figure 24:
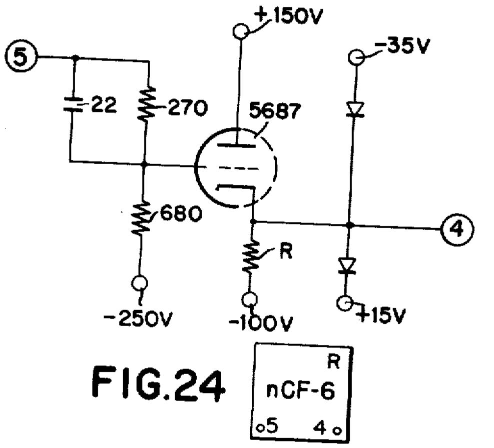
Figure 25:
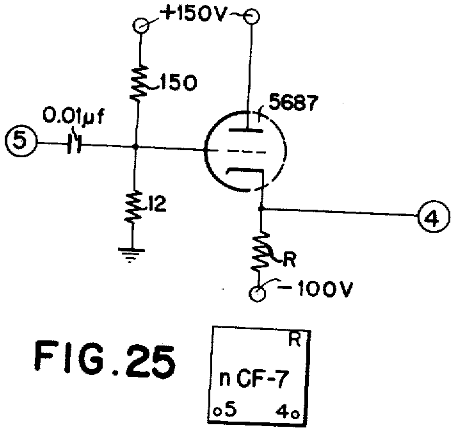
Figure 26:
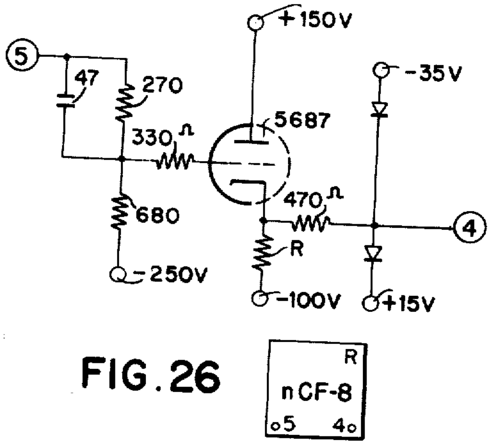
Figure 27:
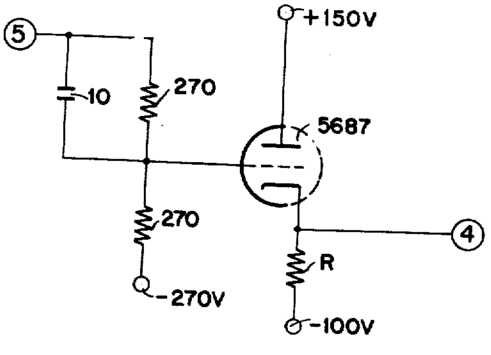

Referring to Figs. 3A to 3I of the drawings, it will be seen that the different elements comprising the invention are represented by blocks, whose contents are illustrated in other figures of the drawings, the inputs and outputs to the blocks only being indicated in Figs. 3A to 3I. Before proceeding with a description of the Figs. 3A to 3I, a detailed description will be given of the respective elements such as the cathode follower, multigrid switch, inverter, And circuit, Or circuit, clamping circuit, limiter circuit, amplifier, photomultiplier, trigger, free running multivibrator, single shot multivibrator, counter, peaker, power inverter, core driver, and relay driver. The contents of the respective blocks and the respective block representations are shown in Figs. 19 to 74. The position of terminals in the blocks of wiring diagrams Figs. 3A to 3I correspond to the position of the terminals in the blocks of block symbols diagrams Figs. 19 to 74.

Wherever shown in the drawings, unless otherwise indicated, the values for the various resistors, condensers, and inductances are in thousands of ohms, micro-micro-farads, and millihenrys respectively. For example, a resistor labeled 200, indicates a 200K (200,000) ohm resistor; a condenser labeled 100, indicates a 100 micro-microfarad condenser; and an inductance labeled 10 indicates a 10 millihenry inductance. Resistors labeled 100Ω and 1 meg. indicate respectively a 100 ohm and a 1,000,000 ohm resistor. A condenser labeled 0.01 $\mu$f. indicates a 0.01 microfarad condenser.

Hereinafter, in this specification where a conductor or circuit terminal, etc. is referred to as being shifted positive or negative in potential, this does not necessarily mean that the point in question is positive or negative in an absolute sense, but only more positive or more negative, relative to its previous state. This principle also applies to any description where positive and negative pulses are mentioned.

CATHODE FOLLOWER—CF

Referring to Fig. 19, there is illustrated a block symbol of a standard cathode follower and also the details of the circuit within the block. A cathode follower functions to produce an output signal having greater power than the input signal, but of the same polarity and substantially the same wave shape and with no appreciable time difference between the input signal and the output signal.

The cathode follower may employ, for example, a triode tube, the plate of which is directly connected to a positive supply voltage and the cathode of which is connected to an output terminal and via cathode circuit resistance to a negative voltage source. A positive signal applied to the grid of the tube causes an increased flow of current, through the tube and cathode circuit resistance. Consequently, due to the increased current flow, a positive voltage shift occurs at the cathode. The voltage of the output signal at the output terminal remains substantially the same as that of the input signal, but due to the increased current flow the power of the signal is increased proportionately. Likewise, it is obvious that a negative shift on the grid will cause the voltage at the cathode to shift relatively negative.

The standard cathode follower (Fig. 19), which may comprise one triode of a dual triode 5687 type tube, has its grid connected via a 330Ω resistor to an input terminal "5," and its plate directly connected to a +150 volt supply. The cathode, which is directly connected to an output terminal "4," is connected via a resistance R to a −100 volts supply.

It may be necessary in order to help speed output signal shifts and to permit faster discharging of line capacitance, to operate two or more cathode followers in parallel. This may be accomplished where there are no bleeder resistors in the grid circuit by commonly connecting the input terminals to a new common input terminal "5," and commonly connecting the output terminals to a new common output terminal "4." Where there is a bleeder network, in the grid circuit, all but one of the grid circuits are disconnected from their respective bleeder resistor junctions and then the disconnected ends are commonly connected to the bleeder resistor junction of the remaining connected grid circuit.

The standard cathode follower is hereinafter represented by a block containing the alphabetic character CF followed by a numerical designation 1, i.e., CF–1. Where standard cathode followers are connected in parallel, the number of cathode followers so connected is indicated by the number *n* preceding the CF in the block diagram, for example, if there are two standard cathode followers connected in parallel, the block is identified by the symbol 2CF–1. Further, the value of the effective cathode resistance R which may vary depending on circuit requirements, is indicated in the upper right-hand corner of the block.

Cathode followers *n*CF–2 through *n*CF–9 are shown in Figs. 20 through 27 respectively, and operate in basically the same manner as the standard cathode follower *n*CF–1. The changes in the cathode followers CF–2 through CF–9 are obvious from the drawings and are well understood in the art. Consequently, no further description of these cathode followers is believed necessary.

MULTIGRID SWITCH—S

Referring to Fig. 28, there is illustrated a block symbol of a standard multigrid switch and also the details of the circuit within the block.

A multigrid switch functions to produce a negative output signal when there is a coincidence of two positive input signals.

The multigrid switch may employ, for example, a multigrid tube, the plate of which is connected via plate circuit resistance to a positive supply voltage. The plate circuit resistance and positive supply voltage may sometimes be shown as part of another circuit. The input terminals of the switch are connected to two grids G1 and G2, and the output terminal is connected in the plate circuit. No current flows through the tube and plate circuit resistance until there is a coincidence of positive signals at both of the grids G1 and G2. When this occurs, the voltage drop across the plate resistance due to the current flow, causes the voltage at the plate to shift relatively negative.

The standard multigrid switch which includes a 6BE6 type pentagrid tube, has its grid G1 connected through a 330 ohm resistor to the junction of a bleeder network consisting of an 82K ohm resistor connected to a −100 volt source, and a 27K ohm resistor connected to ground. The junction is also connected via a 0.01 microfarad condenser to an input terminal "9." Grid G2 is connected through a 330 ohm resistor to the junction of a bleeder network consisting of a 330K ohm resistor connected to a −100 volt source, and another 330K ohm resistor paralleled by a 15 micro-microfarad condenser connected to an input terminal "7."

The plate is connected directly to an output terminal "3," implying that the plate resistance and plate voltage are in the circuit to which the switch is to be connected. The screen grid SG, is connected via a 330 ohm resistor to the junction of a bleeder network consisting of a 22K ohm resistor connected to +150 volts, and a 39K ohm resistor connected to ground. The junction of the bleeder network is also connected through a 0.01 microfarad condenser to ground.

The standard multigrid switch is hereinafter represented by a block containing the alphabetic character S followed by a numerical designation 1, i.e., S–1.

Multigrid switches S–2 and S–3 are shown in Figs. 29 and 30, respectively and operate in basically the same manner as the standard multigrid switch S–1. The changes in the multigrid switches S–2 and S–3 are obvious from the drawings and are well understood in the art. Consequently, no further description of these multigrid switches is believed necessary.

INVERTER—I

Referring to Fig. 31, there is illustrated a block symbol of an inverter and also the details of the circuit within the block.

An inverter functions to produce an output signal having substantially the same waveshape as the input signal but of opposite polarity and with no appreciable time difference between the input signal and the output signal.

The inverter may employ, for example, a triode tube, the plate of which is connected via plate circuit resistance to a positive supply voltage. A positive signal applied to the grid of the tube causes an increased flow of current through the tube and plate circuit resistance. The voltage drop across the plate resistance due to the increased current causes the voltage at the plate to shift relatively negative. Consequently, since the output is taken from the plate circuit of the triode, a negative signal is produced in response to the positive input signal. Likewise, a negative shift on the grid will decrease the current through the plate resistance with a resulting positive potential at the plate. Consequently, a positive output signal is produced in response to the negative input signal.

The standard inverter (Fig. 31) which may comprise one triode of a dual triode 5965 type tube, has its grid connected via a 47 ohm resistor to an input terminal "5," and its cathode connected to ground. The plate is connected to an output terminal "7" and via a 20K ohm resistor a +150 volt supply.

The standard inverter is hereinafter represented by a block containing the alphabetic character I followed by a numerical designation 1, i.e. I–1.

Inverters I–2 and I–3 are shown in Figs. 32 and 33 and operate in basically the same manner as the standard inverter I–1. It is to be noted that inverter I–3 has its plate connected via a cathode follower CF–5 to the output terminal "7." It can thus be understood that inverter I–3 represents an inverter followed by a cathode follower. Since the cathode follower does not affect the logical operation of a circuit, but only the power of the signal, the combined unit may be used to reduce the size, and make for clearer description of the wiring diagram of Figs. 3A to 3I.

AND CIRCUIT—&

Figure 34:
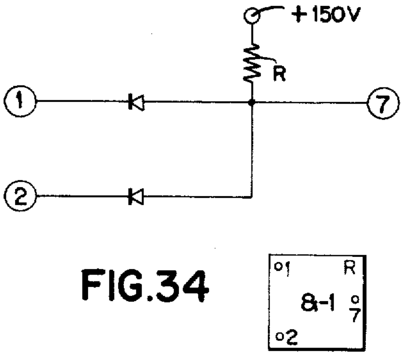

Referring to Fig. 34, there is illustrated a block symbol of a standard diode And circuit and also the details of the circuit within the block.

A positive diode And circuit functions to produce a positive output signal only when there is a coincidence of positive signals at all of the input terminals thereof.

The positive diode And circuit employs at least two diodes, the cathodes of which are connected to input terminals, while the anodes are connected to an output terminal and via a common resistor R to a positive voltage source. The input terminals are normally biased so that the diodes are in conductive states. It will be remembered that during conduction the resistance of a diode is negligible compared to that of the common resistor R. Consequently, the anodes are at potentials more nearly that of their respective cathodes. If a positive signal is applied to any of the input terminals, the diode to which the signal is applied is cut off as the cathode is now at a more positive potential than the corresponding anode. However, the remaining diode or diodes are still in a conductive state or states, so that the same amount of current flows through the common resistor R and the potential at the anode of the diode to which the positive input signal is applied, does not follow the change at the corresponding cathode but remains at relatively the same potential. Therefore, since the output terminal is connected to the anodes of the diodes, no change in potential is effectively passed to the output terminal when a positive signal is applied to any or all but one of the input terminals. If positive signals are coincidently applied to all of the input terminals, all of the diodes are cut off and the potential at the anodes starts to rise toward that of the positive voltage source connected at the other end of the common resistor R. When the potential reaches a value approximately that at the input terminals, all of the diodes start to conduct, whereupon the potential at the anodes stops rising and is maintained at approximately that at the input terminals. Therefore, since the output terminal is connected to the anodes of the diodes, the rise in potential at the anodes is effectively passed to the output terminal so that the potential at the output terminal is raised to approximately that existing at all of the input terminals. It should be noted at this point that the positive input signals are not necessarily applied simultaneously to the input terminals of the positive diode And circuit. Hence, in instances where positive signals are applied to all but one of the input terminals thereof, the circuit is said to be conditioned so that when a positive signal is applied to the remaining input terminal there is a coincidence of positive input signals causing the production of a positive output signal in a manner as previously described.

The standard positive diode And circuit of Fig. 34 comprises at least two diodes (only two of which are shown), the anodes of which are commonly connected through a resistor R to a source of +150 volts. The cathodes are shown connected to input terminals "1" and "2," and the commonly connected anodes are connected to an output terminal "7."

Figure 37:
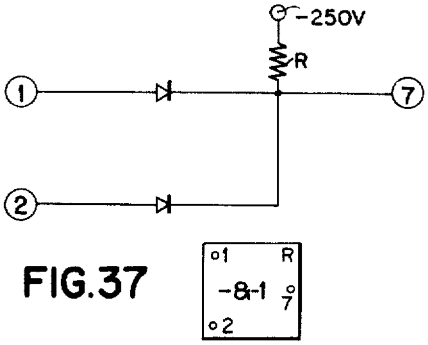

Referring now to Fig. 37, there is illustrated a block symbol of a standard negative diode And circuit and also the details of the circuit within the block.

A negative diode And circuit functions to produce a negative output signal only when there is a coincidence of negative signals at all of the input terminals thereof.

The negative diode And circuit employs at least two diodes, the anodes of which are connected to input terminals, while the cathodes are connected to an output terminal and via a common resistor R to a negative voltage source. The input terminals are normally biased so that the diodes are in conductive states. Consequently, the cathodes are at potentials more nearly that of their respective anodes. If a negative signal is applied to any of the input terminals, the diode to which the signal is applied is cut off as the anode is now at a more negative potential than the corresponding cathode. However, the remaining diode or diodes are still in a conductive state or states so that the same amount of current flows through the common resistor R. Consequently, the potential at the cathode of the diode to which the negative input signal is applied, does not follow the change at the corresponding anode but remains at relatively the same potential and since the output terminal is connected to the cathodes of the diodes, no change in potential is effectively passed to the output terminal when a negative signal is applied to any but not all of the input terminals. If negative signals are coincidently applied to all of the input terminals, all of the diodes are cut off and the potential at the cathodes start to fall toward that of the negative voltage source connected at the other end of the common resistor R. When the potential reaches the value approximately that at the input terminals, all of the diodes start to conduct whereupon the potential at the cathodes stops falling and is maintained at approximately that at the input terminals. Therefore, since the output terminal is connected to the cathodes of the diodes, the fall in potential at the cathodes is effectively passed to the output terminal so that the potential at the output terminal falls to approximately that existing at all of the input terminals. It should be noted at this point that the negative input signals are not necessarily applied simultaneously to the input terminals of the negative diode And circuit. Hence, in instances where negative signals are applied to all but one of the input terminals thereof, the circuit is said to be conditioned so that when a negative signal is applied to the remaining input terminal, there is a coincidence of negative input signals causing the production of a negative output signal in a manner as previously described.

The standard negative diode And circuit of Fig. 37 comprises at least two diodes (only two of which are shown), the cathodes of which are commonly connected through a resistor R to a source of −250 volts. The anodes are connected to input terminals "1" and "2," and the commonly connected cathodes are connected to an output terminal "7."

The standard positive diode And circuit is hereinafter represented by a block symbol containing an ampersand "&" followed by a numerical designation 1, i.e., &–1, while the standard negative diode And circuit is hereinafter represented by the designation —&–1. It is to be understood that a positive and negative diode And circuit may have any number of input terminals so long as a diode is provided between each input terminal and the output terminal. If there are more than two inputs required, leads connected to these inputs are shown in the wiring diagram of Figs. 3A to 3I as entering the left side of the block. In both the positive and negative diode And circuits, the value of the common resistor R, which may vary according to circuit requirements, is indicated in the upper right-hand corner of the block.

Figure 35:
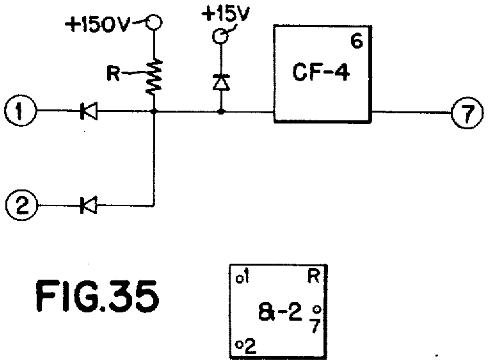
Figure 36:
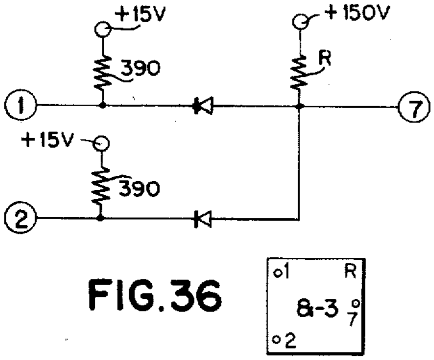

Positive diode And circuits &–2 and &–3 are shown in Figs. 35 and 36 and operate in basically the same manner as the standard positive And circuit &–1 of Fig. 34. It is to be noted that positive diode And circuit &–2 has its common anode connected via a CF–4 type cathode follower to the output terminal "7." It can thus be understood that positive diode And circuit &–2 represents a positive diode And circuit followed by a cathode follower. Since the cathode follower does not affect the logical operation of a circuit, but only the power of the signal, the combined unit may be used to reduce the size, and make for clearer description of the wiring diagrams of Figs. 3A to 3I.

OR CIRCUIT—OR—TOR

Referring to Fig. 38, there is illustrated a block symbol of a standard positive diode Or circuit and also the details of the circuit within the block.

A positive diode Or circuit functions to isolate two or more positive input signals from each other and to produce a positive output signal in response to a positive input signal at any or all of the input terminals thereof.

The positive diode Or circuit employs at least two diodes, the anodes of which are connected to the input terminals thereof, while the cathodes are connected to the out terminal thereof and via a common resistor to a negative voltage source. The input terminals are normally biased so that the diodes are in conductive states. If a positive signal is applied to either or both of the input terminals, the potential at the anode or anodes to which the input signal or signals are applied, become more positive causing an increased flow of current through the common resistor. Consequently, since during conduction the resistance of a diode is negligible in comparison to that of the common resistor, the potential at the cathodes of those diodes to which the positive input signals are applied follows more nearly that of their respective anodes. Also, since the output terminal is connected to the cathodes of the diodes, the rise in potential at the cathodes is effectively applied to the output terminal so that the potential at the output terminal is raised to approximately that existing at any or all of the input terminals to which the positive input signals are applied.

The standard positive diode Or circuit of Fig. 38 comprises at least two diodes (only two of which are shown), the cathodes of which are commonly connected through a resistor R to a source of −250 volts. The cathodes are connected to input terminals "1" and "2," and the commonly connected anodes are connected to an output terminal "7."

The standard positive Or circuit is hereinafter represented by a block containing the alphabetic characters OR, followed by a numeric designation 1, i.e. OR–1. It is to be understood that a positive diode Or circuit may have any number of input terminals so long as a diode is provided between each input terminal and the output terminal. If there are more than two inputs required, leads connected to these inputs are shown in the wiring diagram of Figs. 3A to 3I as entering the left side of the block. The value of the common anode register R, which may vary according to circuit requirements, is indicated in the upper right-hand corner of the block.

Positive diode Or circuit OR–2 is shown in Fig. 39 and operates in basically the same manner as the standard positive diode Or circuit OR–1. It is to be noted that positive diode Or circuit OR–2 has its common cathode connected via a CF–4 type cathode follower to the output terminal "7." It can thus be understood that positive diode Or circuit OR–2 represents a positive diode Or circuit followed by a cathode follower. Since the cathode follower does not affect the logical operation of a circuit, but only the power of the signal, the combined unit may be used to reduce the size, and make for clearer description of the wiring diagrams of Figs. 3A to 3I. Referring now to Fig. 40, there is illustrated a block symbol of a standard triode Or circuit, and also the details of the circuit within the block.

A triode Or circuit functions to isolate two or more positive input signals from each other, and to produce a negative output signal in response to a positive input signal at any or all of the input terimnals thereof.

The triode Or circuit employs at least two triodes, the grids of which are connected through circuitry to input terminals, while the plates are connected to an output terminal and via a common plate resistor to a positive voltage source. The grids are normally biased so that the triodes are in non-conductive states. If a positive signal is applied to either of the grids via the input terminals, the respective tube will conduct through the common plate resistor producing a voltage drop across said resistor which causes the potential at the plates and the output terminal to shift negative.

The standard triode Or circuit of Fig. 40 is hereinafter represented by a block symbol containing the alphabetic characters TOR and a numerical designation 1, i.e., TOR–1.

CLAMPING CIRCUITS—CL

Referring to Fig. 41, there is illustrated a block symbol of a positive clamp or clamping circuit, and also the details within the block of the components and their connections.

A positive clamping circuit is a circuit which functions to hold the negative amplitude extreme of input waveform to a fixed reference level of potential. A clamping circuit usually couples two units when it is desired that the signals at the plate circuit of a tube in a first unit be transmitted to the grid of a tube in a second unit, and vary from the fixed reference level.

The positive clamping circuit employs one or more diodes in conjunction with the ordinary resistance-capacitance coupling circuit because in coupling between units, a coupling capacitor almost always must be used to keep the high positive D.C. plate potential of the first unit isolated from the grid of the second unit. The input signal of the positive clamping circuit is connected via the coupling capacitor to the cathode of a diode, the plate of which is connected to a D.C. reference level voltage. The output voltage is taken at the junction of the condenser and cathode. Any portion of the input signal more negative than the reference level will be shorted by the conduction of the diode, but the portions more positive than the reference level will be developed across a resistance shunting the diode. Thus any positive swing in the plate circuit of the previous unit is transmitted as a swing in the positive direction from the reference level.

The standard positive clamping circuit (Fig. 41) includes an input terminal "5" connected via a 0.01 microfarad condenser and a 470K ohm resistor to a supply of V volts. An output terminal "4" is connected to the junction of the 0.01 microfarad condenser and 470K ohm resistor, and the junction is also connected to the cathode of a diode which shunts the 470K ohm resistor.

Referring to Fig. 42, there is illustrated a block symbol of a negative clamping circuit.

A negative clamping circuit is a circuit which functions to hold the positive amplitude extreme of an input waveform to a fixed reference level of potentials. Thus, any negative swing in the plate circuit of a previous unit is transmitted by the negative clamping circuit as a swing in the negative direction from the reference level.

The negative clamping circuit employs the same components as the positive clamping circuit except that the connections to the diode or diodes are reversed.

The standard negative clamping circuit (Fig. 42) is similar to the standard positive clamping circuit (Fig. 41) except that the anode of the diode is connected to output terminal "4" and the cathode is connected to the supply of V volts.

It may be necessary, in order to help output signal shifts, to parallel two or more diodes of the clamp. Where this is done, the rest of the circuit remains unaffected.

The standard positive clamp is hereinafter represented by a block containing the alphabetic character CL followed by a numerical designation 1, i.e., CL–1, hereinafter represented by −CL–1. Where diodes in a clamp are connected in parallel, the number of diodes so connected is indicated by the number $n$, preceding the CL in the block diagram, for example, if there are two diodes connected in parallel in a negative clamp, the block is identified by the symbol —2CCL–1. Further, the value of the voltage to which the circuit is clamped, which may vary according to circuit requirements, is indicated in the upper right-hand corner of the block.

LIMITER CIRCUITS—LI

Referring to Fig. 43, there is illustrated a block symbol of a limiter circuit, and also the details, within the block, of the components and their connections.

A limiter or clipper circuit is one which removes one extremity or the other of an input wave. A negative portion of the wave may be removed by cut-off limiting, and a positive portion of the wave may be removed by grid limiting. Both cut-off and grid limiting may be performed by one circuit.

Cut-off limiting makes use of the cut-off characteristics of a triode. With a given plate voltage, if the grid is made sufficiently negative with respect to the cathode, all electrons are repelled by it and are forced back to the cathode. No electrons reach the plate and so the plate current is zero. The smallest negative voltage between the grid and cathode which causes the tube to cease to conduct is called the cut-off bias. By clamping the lower level of an input waveform below the cut-off bias, only signals which are greater than the difference between the reference voltage and the cut-off bias will cause the triode to conduct. In this manner, these signals of larger amplitude are selected for transmission through the circuit.

This particular circuit also acts as a grid limiter circuit because it is adapted to remove the positive extremity of the input waveform and this provides for the pulses that pass through to be of no greater than a predetermined amplitude. When the signal at the grid is of a positive potential greater than the potential at the cathode, the resulting grid current causes a drop across the 330 ohm grid resistor and the 470K ohm resistor of the clamp in a direction which tends to counterbalance the positive swing, and the grid therefore will not go materially above the voltage of the cathode. Therefore, the voltage swings at plate will not go negative by more than a predetermined amount.

Referring now to Fig. 43, there is illustrated a standard limiter comprising a clamp and one triode of a 12AU7 type dual triode. The plate of the triode is connected via an 8.2K ohm resistor and a 10K ohm resistor to a source of +330 volts. The junction of the 8.2 ohm resistor and 15K ohm resistor is connected via a 2 microfarad condenser to ground. The plate is also connected directly to an output terminal "7". The cathode is connected via a 560 ohm resistor shunted by a 10 micro-microfarad condenser to ground. The grid is connected via a 330 ohm resistor and a 2CL–1 type positive clamp to an input terminal "5." The positive clamp has its reference voltage fixed at −60 volts. Since the cut-off potential of the triode is approximately −15 volts, a signal of greater than +45 volts is required in order to bring the grid above the cut-off. The signals of less than +45 volts will not be transmitted through the standard limiter.

The standard limiter circuit is hereinafter represented by a block containing the alphabetic characters LI followed by a numerical designation 1, i.e., LI–1.

AMPLIFIER—A

Referring to Fig. 44, there is illustrated a block symbol of an amplifier, and also the details of the circuit within the block.

An amplifier is a device consisting of one or more vacuum tubes and associated circuits, employed to increase the magnitude of a signal.

The well known inherent characteristics of certain vacuum tubes cause an input signal, applied to the grid, to produce a signal of greater magnitude (i.e. to be amplified) at the plate. The amplified signal may, when desired, be fed through successive amplifier stages for further amplification.

Referring now to Fig. 44, there is illustrated a standard three stage amplifier. Each stage comprises one triode of a 12AU7 type dual triode. The plate of the first stage triode is connected via an 8.2K ohm resistor and a 15K ohm resistor to a source of +330 volts. The junction of the 8.2K ohm and 15K ohm resistors is connected via a 2 micro-microfarad condenser to ground. The cathode is connected via a 10K ohm gain control potentiometer in series with the parallel connected 560 ohm resistor and 10 micro-microfarad condenser to ground. The grid is connected via a 330 ohm resistor and a —CL–1 type negative clamp to an input terminal "5." A negative signal applied to input terminal "5" will be operated on by the clamp so as to cause it to vary negatively relative to ground. This negative signal is then transmitted via the 330 ohm resistor to the grid of the first stage where it is amplified and appears as a larger positive signal at the plate of the first stage. This positive signal is fed via a CL–1 positive clamp, which causes it to vary positively with respect to ground, to a second stage which is similar in every way to the first stage except that there is no 10K ohm gain potentiometer in the cathode circuit. The positive signal is amplified and inverted, and the now negative signal is fed through a —CL–1 type clamp and a third stage which is exactly the same as the second stage. The output of the standard three stage amplifier is then a positive signal taken off the plate of the third stage at an output terminal "7."

The standard amplifier is hereinafter represented by a block containing the alphabetic character A followed by a numerical designation 1, i.e., A–1.

PHOTOMULTIPLIER—PM

Referring to Fig. 45, there is illustrated a circle connected to a square, the combination comprising a block symbol of a photomultiplier. The details within the block of the components and their connections are also shown.

A photomultiplier, which includes a photomultiplier tube and associated circuitry, functions to produce an output signal proportional to the amount of light striking it.

The photomultiplier tube of the standard photomultiplier circuit contains a collector, a plurality of emitters having secondary emission characteristics, and a cathode made of material which emits a number of primary electrons proportional to the amount of light striking its surface. The primary electrons from the cathode are drawn to a first emitter which is at a higher potential than the cathode and where, due to the secondary emission characteristics, secondary electrons are emitted. The secondary electrons and the reflected primary electrons are drawn to a second emitter where secondary emission also takes place. The process is repeated at successive anodes, each of which is at a higher potential than the preceding one. A collector then collects the electrons from the last emitter and feeds it to an output terminal. Since each electron may knock out five or more secondary electrons, and a large number of emitters are used, very high current amplification is obtainable.

The standard photomultiplier (Fig. 45) which includes a Dumont 6291 type photomultiplier tube has a collector C, a cathode K and nine emitters E. The collector C is directly connected to an output terminal "4" and via a 15K ohm resistor to ground. A source of −1000 volts is connected via a 10K ohm resistor to the cathode K, which is connected via a 0.001 microfarad condenser to ground. The cathode K is also connected via a bleeder network comprising an 82K ohm resistor, eight 100K ohm series connected resistors, and another 82K ohm resistor to ground. The first emitter is connected to the junction of the first 82K ohm resistor and its adjoining 100K ohm resistor, and each succeeding emitter is connected so that there is one 100K ohm resistor between adjacent emitters. Thus, each emitter is at a higher potential than the preceding emitter.

The standard photomultiplier is hereinafter represented by a circle having a curved line cathode and a straight line collector which is connected to a block containing the alphabetic characters PM followed by a numerical designation 1, i.e., PM–1.

TRIGGER—T

Figure 46:
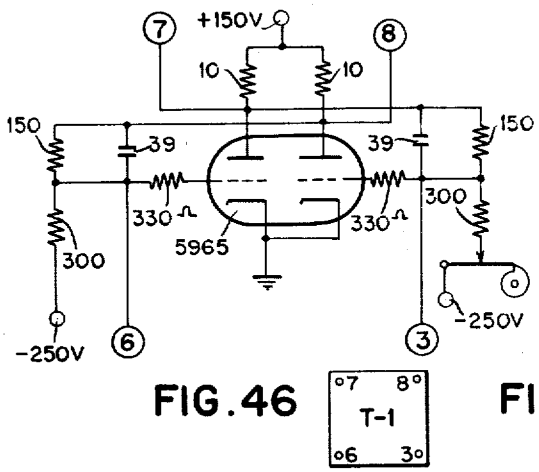
Figure 47:
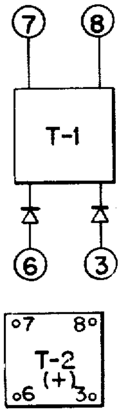
Figure 48:
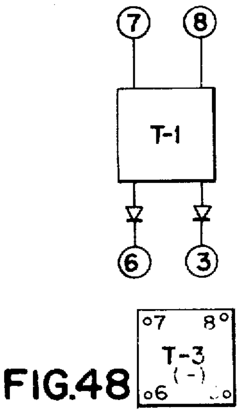
Figure 49:
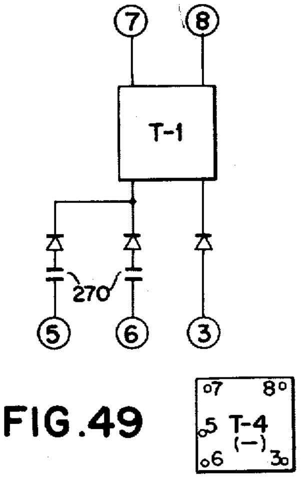
Figure 50:
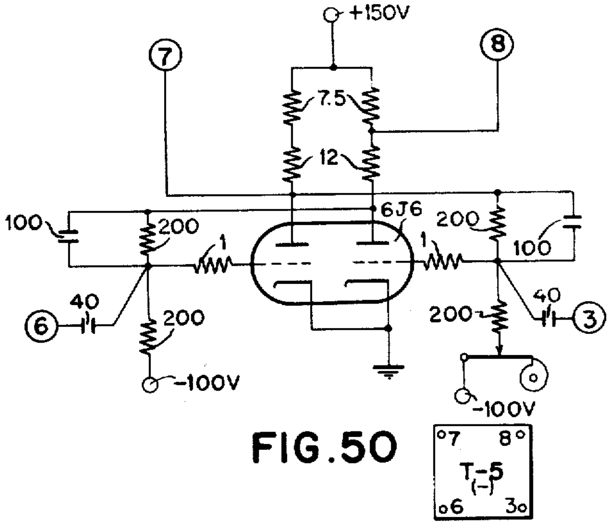
Figure 51:
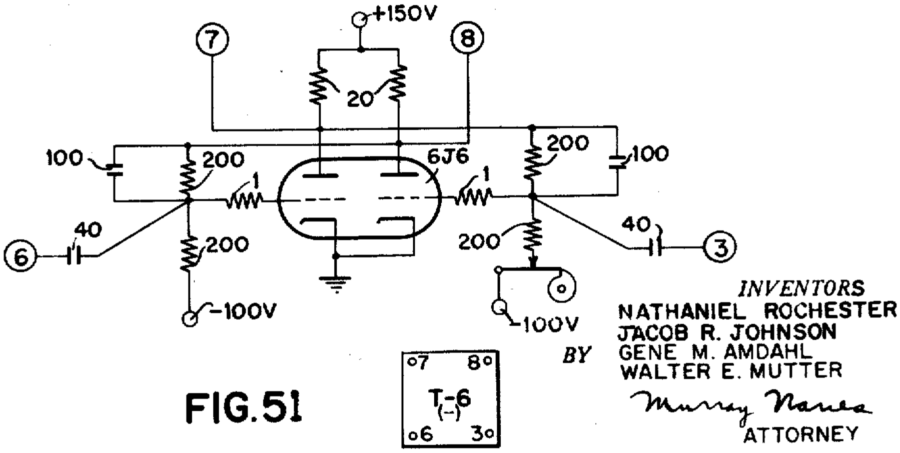

Referring now to Fig. 46, there is illustrated a block symbol of a standard trigger and also the details of the circuit within the block.

A trigger, commonly known as the Eccles-Jordan trigger, functions as a storage or control device inasmuch as it is a bistable device, that is, one that remains in either one of two stable states until it is forced or triggered by an input signal to assume the other state, each subsequent input signal being effective to turn the trigger to the opposite state.

The trigger may comprise a cross-coupled dual triode, that is, the plate of the right-hand tube is resistively coupled via a voltage divider network to the grid of the left-hand tube, while the plate of the left-hand tube is resistively coupled via a voltage divider network to the grid of the right-hand tube. Therefore, any changes in potential at the plates of the dual triode are coupled to the grids of the opposite tubes. One stable state of the trigger is termed the Off state and exists when the right-hand tube is in a conductive state while the left-hand tube is in a non-conductive state. In this state, the plate of the right-hand tube is at a relatively negative potential while the plate of the left-hand tube is at a relatively positive potential. If the right-hand tube is triggered to a non-conductive state a positive shift of potential occurs at the plate thereof which is coupled via the voltage divider cross-coupling to the grid of the left-hand tube so that the left-hand tube is triggered to a conductive state with a resulting negative shift of potential occurring at the plate thereof. This is the other stable state of the trigger and is termed the On state. The trigger may also be set to the On state by triggering the left-hand tube to a conductive state with a resulting negative shift of potential occurring at the plate thereof, which is coupled via the voltage divider cross-coupling to the grid of the conducting right-hand tube so that the right-hand tube is triggered to a non-conductive state. In a similar manner, when the trigger is in the On state, it may be reset back to the Off state by triggering the left-hand tube to conduct or the right-hand tube to stop conducting.

The standard trigger (Fig. 46) may comprise a 5965 type dual triode having its right-hand plate connected via a voltage divider network comprising a 150K ohm resistor and a 300K ohm resistor to a −250 volt source. The left-hand plate is connected via a similar voltage divider comprising a 150K ohm resistor and a 300K resistor through normally closed reset cam contacts to a −250 volt source. The junction of the 150K ohm resistor and the 300K ohm resistor in each voltage divider network is connected via a 300 ohm resistor to the respective grids of the dual triode. Additionally, a 39 micro-microfarad capacitor is connected in parallel with each of the 150K ohm resistors. Also, an input terminal "6" is connected to the left-hand junction while an input terminal "3" is connected to the right-hand junction. Each plate of the dual triode is connected via a 10K ohm resistor to a +150 volt source. Output terminal "7" is connected directly to the left-hand plate and output terminal "8" is connected directly to the right-hand plate.

The standard trigger is hereinafter represented by a block containing the alphabetic character T followed by a numerical designation 1, i.e., T–1. The trigger T–1 is never used directly, but rather is used with different input circuits of the types shown in the triggers T–2, T–3, and T–4 of Figs. 47, 48, and 49 respectively. Trigger T–2 thus includes input terminals "6" and "3" respectively connected to the anodes of diodes, the cathodes of which are connected to the left and right-hand inputs respectively of a trigger T–1. The diodes are inserted in this manner to conduct when pulsed by a positive input, to effect a triggering of T–2 by positive input pulses only. Triggers triggered by positive pulses are hereinafter referred to as positive input triggers and have this fact indicated by a (+) indication in the block under the trigger designation, i.e., trigger T–2 has a (+) indication under the designation T–2. Trigger T–3 is similar to trigger T–2 except that the connections to the input diodes are reversed so that the diodes will conduct when pulsed by a negative input to effect a triggering of T–3 by negative input pulses only. A(−) designation under the designation T–3 indicates that trigger T–3 is a negative input trigger.

Trigger T–4 is similar to trigger T–2 except that its input terminal "6" is connected via a 270 micro-microfarad condenser to the anode of the input diode, and it has an additional left-hand input terminal "5" connected via a 270 micro-microfarad condenser to the anode of another input diode, the cathode of which is connected to input terminal "6" of a trigger T–1. A positive shift at terminal "5" or "6" is integrated and appears as a positive pulse to turn On the trigger. A positive shift appearing at input terminal "3" will turn Off the trigger even if the positive potential is still applied to terminal "5." However, if input terminal "3" remains positive, a positive shift at input terminal "6" will not turn the trigger On. It thus becomes apparent that a condenser in the input circuit is provided to permit the trigger to change its state even while the potential which turned it to its present state is still being applied.

In all triggers, the opening of the reset cam contacts disconnects the path between a negative voltage and the right-hand grid causing a positive shift at the right-hand grid which resets the trigger Off. This reset operation is performed when the machine is turned On to place all the triggers in the Off condition.

Triggers T–5 to T–9 are shown in Figs. 50 to 54 respectively and operate in basically the same manner as the triggers hereinbefore described. The changes in the triggers T–5 to T–9 are obvious from the drawings and are well understood in the art. Consequently, no further description of these triggers is believed necessary.

FREE-RUNNING MULTIVIBRATOR—MV

Referring to Fig. 55, there is illustrated a block symbol of a standard free-running multivibrator, and also the details of the circuit within the block.

A free-running multivibrator functions to produce nearly rectangular pulses of a specified (and sometimes adjustable) duration.

The free-running multivibrator resembles a standard trigger in that it has two states, but differs in that it oscillates at one frequency between the two states due to its own internal circuitry.

The free-running multivibrator may comprise a cross-coupled dual triode, that is, the plate of the right-hand tube is capacitively coupled to the grid of the left-hand tube, while the plate of the left-hand tube is capacitively coupled to the grid of the right-hand tube. Resistors connected from the grid of each tube to ground in combination with the coupling condensers comprise an RC network which is used to control the time duration of the trigger in each state. When the left-hand tube is conducting, the coupling capacitor between the left-hand plate and the right-hand grid charges through the right-hand grid resistance causing the potential at the grid of the right-hand tube to rise toward a relatively positive value. At some positive value the right-hand tube begins to conduct and switching action takes place causing the left-hand tube to turn off. The frequency of the multivibrator may be varied by simultaneously varying the grid resistance of each tube.

Thus the standard free-running multivibrator of Fig. 55 may comprise a 5965 type dual triode. Plate P1 of the left-hand triode is coupled via a 39 micro-microfarad condenser, in series with a 470 ohm resistor to the grid G2 of the right-hand triode, while plate P2 of the right-hand triode is coupled via a 39 micro-microfarad condenser, in series with a 470 ohm resistor to a grid G1 of the left-hand triode. Connected between ground and the junction of each 39 micro-microfarad coupling condenser and 470 ohm resistor are a 500K ohm potentiometer in series with a 39K ohm resistor. Each plate is connected through a 10K ohm resistor to a source of +150 volts, and the cathodes K1 and K2 are commonly connected to ground. The plate P2 of the right-hand tube is connected to a right-hand terminal "8." For the purpose of the invention, the frequency of the free-running multivibrator may be set to 100 kc. by varying the two 500K ohm potentiometers.

The free-running multivibrator is hereinafter represented by a block symbol containing the alphabetic characters MV and a numeric designation 1, i.e., MV–1.

SINGLE SHOT MULTIVIBRATOR—SS

Referring now to Fig. 56, there is illustrated a block symbol of a standard single shot multivibrator, the details of the circuit within the block, and a chart of the different values of resistance and capacitance in an RC network for the different time duration of the signal developed by the multivibrator.

A single shot multivibrator functions to produce positive and/or negative rectangular wave shaped signals of predetermined time duration.

The single shot multivibrator resembles the standard trigger in that it may be triggered to the On state by an input signal, but differs therefrom in that it automatically returns to the Off state after a predetermined period of time without requiring a subsequent input signal.

The single shot multivibrator may comprise a cross coupled dual triode, that is, the plate of the left-hand tube is capacitively coupled via a voltage divider network to the grid of the right-hand tube, while the plate of the right-hand tube is resistively coupled to the grid of the left-hand tube. A capacitor between the left-hand plate and the right-hand grid is connected through a resistor to a source of positive voltage and this resistor and condenser comprise an RC network that is used to control the time duration of the On state of the single shot multivibrator. The grids of the dual triode are so biased that the single shot multivibrator is normally in the Off state, that is, with the left-hand tube in its non-conductive state and the right-hand tube in a conductive state. If a negative shift of potential is applied via the input circuit to the grid of the right-hand tube, switching action occurs, as in the standard trigger, and the single shot multivibrator is set to the On state, with a resulting negative shift of potential occurring at the plate of the left-hand tube, and a positive shift of potential occurring at the plate of the right-hand tube. The single shot multivibrator remains in the On state for a period of time dependent upon the time constant of the RC network associated with the grid of the right-hand tube. The capacitance of the RC network, connected to the grid of the right-hand tube starts to charge through its associated resistance causing the potential at the grid of the right-hand tube to rise toward a relatively positive value. At a certain positive value, the right-hand tube begins to conduct once more and switching action takes place causing the single shot multivibrator to be reset back to the Off state. The time duration of the On state of the single shot multivibrator can be varied by varying the values of the resistance and capacitance in the RC network connected to the grid of the right-hand tube.

The standard single shot multivibrator of Fig. 56 may comprise a 5687 type dual triode. Plate P1 of the left-hand triode is coupled via a condenser C in series with a 470 ohm resistor to the grid G2 of the right-hand triode, while plate P2 of the right-hand triode is coupled via a 100K ohm resistor, shunted by a 22 micro-microfarad condenser, in series with a 470 ohm resistor to a grid G1 of the left-hand triode. Connected between −100 volts and the junction of the 100K ohm resistor and 470 ohm resistor is a 100K ohm resistor. The junction between the condenser C and the 470 ohm resistor is connected via a 22 micromicrofarad condenser to an input terminal "3," and also via a resistor R to a source of +220 volts. Each plate is connected through a 4.7K ohm resistor to a source of +150 volts, and the cathodes K1 and K2 are commonly connected to ground. The plate P2 of the right-hand tube is connected to a right-hand output terminal "8," while the plate P1 is connected to an output terminal "7."

The single shot multivibrator is hereinafter represented by a block symbol containing the alphabetic characters SS and a numeric designation 1, i.e., SS–1. The time duration of the On state of single shot multivibrator SS–1 depends on the values of resistor R and condenser C. Fig. 56 contains a chart indicating the different values of resistor R and condenser C for particular time duration *t*. The time duration *t* is indicated in the drawings at the lower left-hand corner of the single shot multivibrator blocks.

Single shot multivibrator SS–2 is shown in Fig. 57 and operates in basically the same manner as the single shot multivibrator hereinbefore described. The changes in single shot multivibrator SS–1 are obvious from the drawings and are well understood in the art. Consequently, no further description of this single shot multivibrator is believed necessary.

BINARY COUNTER—CTR

Figure 58:
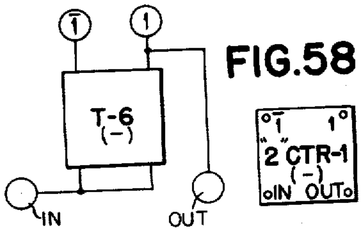

Referring now to Fig. 58, there is illustrated the block symbol of standard binary counters and also the details of the circuit within the block.

The binary counter may comprise one or more trigger stages, each of which have commonly connected inputs, and each of which reverses between its two stable states each time a new input signal is introduced. A single trigger so connected may thus act as a "2" counter, i.e., one that produces a carry pulse after two input pulses. Since the right-hand output of a trigger goes positive when the trigger is On, the presence of a positive potential on the right-hand plate of the trigger, and a negative potential on the left-hand plate of the trigger indicates that one pulse has been applied to the "2" counter. The right-hand plate is therefore labeled 1 to indicate that it is positive after one input pulse, while the left-hand plate is labeled $\bar{1}$ (not one) to indicate that it is negative after one input pulse. At the end of two pulses, the "2" counter returns to its initial state, emitting a carry pulse from its output terminal.

The binary "2" counter of Fig. 58 comprises a T–6 type negative input trigger having its two input terminals commonly connected to an input terminal "In." The left-hand output terminal of the T–6 trigger is connected to a terminal $\bar{1}$ and the right-hand output terminal of the T–6 trigger is connected to the output terminals 1 and "Out."

The standard binary "2" counter is hereinafter represented by a block containing the alphabetic characters CTR, preceded by a "2" and followed by a numerical designation 1, i.e., "2" CTR–1. The type of input pulse (+) or (−) necessary to operate the counter is shown in parentheses under the block label.

Figure 59:
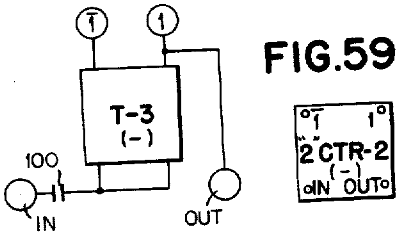
Figure 60:
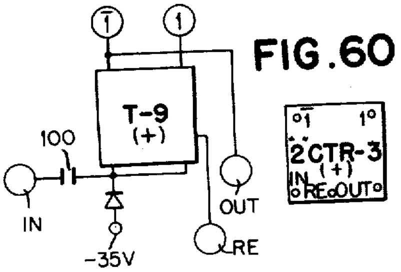
Figure 61:
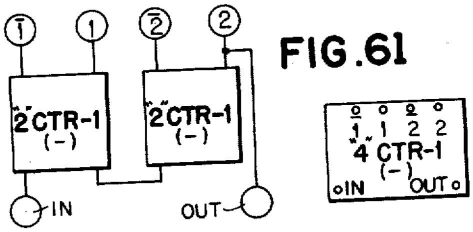
Figure 62:
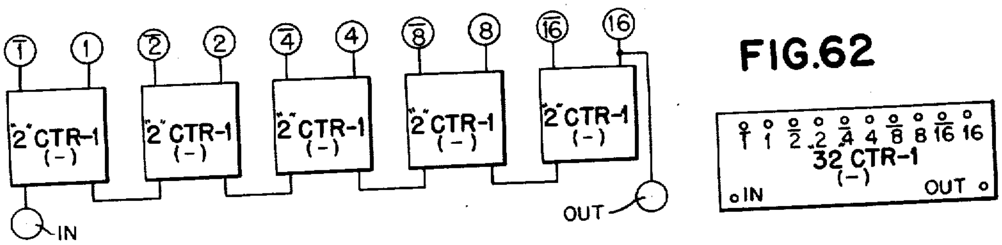
Figure 63:
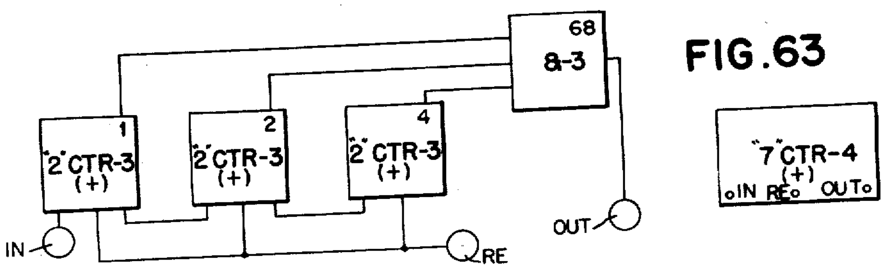
Figure 64:
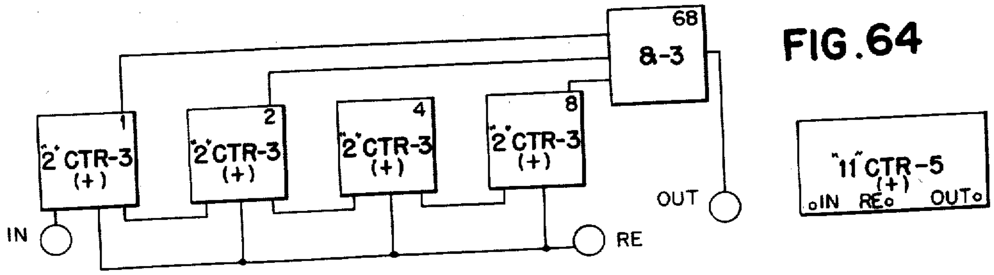

Binary "2" counters "2" CTR–2 and "2" CTR–3 are shown in Figs. 59 and 60 respectively, and operate in basically the same manner as the standard binary "2" CTR–1. The binary "2" CTR–3 which it a counter based on a T–9 type trigger has an additional electronic reset terminal "RE" connected to the input terminal "4" of the trigger.

To obtain counts of greater than two binary "2" counters may be connected in cascade by connecting the output terminal of each stage to the input terminal of the succeeding stage. The counts which may be obtained by the counter can be recognized by the number in quotes preceding the alphabetic characters CTR in the block. At the end of two pulses, when the first stage goes from an On, back to an Off condition, the carry pulse from the first stage will cause the second stage to go On. The right-hand plate of the second stage is labeled 2 to indicate that it is positive after two input pulses to the binary counter, and the left-hand plate of the second stage is labeled $\bar{2}$ to indicate that it is negative after two input pulses. On the third input pulse, the first stage is turned On, and both output terminals 1 and 2 are positive. On the fourth input pulse, the first stage is turned Off, which in turn, turns the second stage Off creating a carry pulse. Where there is a third stage, it is turned On, and its right-hand terminal 4 will be positive. Now it is clear that a "4" binary counter emits a carry pulse after four input pulses and also indicates the number of input pulses, by the status of the output terminals of each stage. The number designating the right-hand output terminal of each stage may then be considered the weighted value of that stage. The weighted value of each stage in a binary counter is always twice as much as that of the previous stage. Thus, to determine the number of input pulses applied to a counter from the last time it was reset to zero, it is only necessary to add the weighted value of the stages in the On condition.

The counter "4" CTR–1 (Fig. 61) comprises two cascaded "2" CTR–1's to provide weighted value indications up to the count of four and a carry pulse at the count of four. The counter "32" CTR–1 (Fig. 62) comprises five cascaded "2" CTR–1's to provide weighted value indications up to the count of thirty-two and a carry pulse at the count of thirty-two.

To obtain a carry pulse at a count other than that of the normal carry pulse from the last counter stage, it is possible to connect the input terminals of an And circuit to the right-hand output terminals. The And circuit will then only provide an output when all the triggers to which the And circuit are connected are On. This output will come at a time which can be determined by the sum of the weighted values of the stages connected to the And circuit.

The counter "7" CTR–4 (Fig. 63) provides a carry pulse at the end of seven input pulses and comprises three stages of cascaded "2" CTR–3 type counters, the input terminals of the first stage being connected to the counter input terminal "In." The right-hand output terminals of the three stages having weighted values of 1, 2, 4 are connected to the input terminals of an &–3 type And circuit, the output terminal of which is connected to the counter output terminal "Out." The reset terminals of all the stages are commonly connected to the counter electronic reset terminal "Reset."

The counter "11" CTR–5 (Fig. 64) provides a carry pulse at the end of 11 input pulses and comprises 4 stages of cascaded "2" CTR–3 type counters, the input terminal of the first stage being connected to the counter input terminal (In). The right-hand output terminals of the three stages having weighted values of 1, 2, and 8 are connected to the input terminals of an &–3 type And circuit, the output terminal of which is connected to the counter output terminal "Out." The reset terminals of all four stages are commonly connected to the counter electronic reset terminal "Reset."

PEAKER—PKR

Referring to Fig. 65, there is illustrated a block symbol of a peaker, and also the details of the circuit within the block.

A peaker functions to produce an output pulse of very short duration and with an extremely sharp leading edge. The function performed by a peaker may be accomplished by a multitude of circuit arrangements.

One standard type of peaker utilizes a resistance-capacitance differentiator input feeding to what is effectively a power inverter. In a resistance-capacitance differentiator circuit, the resistance and capacitance are connected to act as a voltage divider network, and thus the portion of the applied voltage which does not appear across the capacitor, will appear across the resistor. The time constant of the circuit is made short relative to the duration of the applied pulse in order that the capacitor will become charged in a small fraction of the pulse duration. Thus at the first instant, all the voltage drop is across the resistor, but in a very short time the capacitor is charged up and therefore, the voltage across the resistors falls off very rapidly. The output at the resistor is thus a very sharp pulse that is fed to the power inverter which inverts the polarity of the pulse and gives it greater power.

The standard peaker (Fig. 65) includes a 5965 type dual triode. The left-hand grid G1 is connected to a junction on a bleeder network comprising a 390K ohm resistor connected to −100 volts, and a 75K ohm resistor connected to ground. The grid G1 is also connected via a 100 micro-microfarad condenser to an input terminal "9." The two plates P1 and P2 are commonly connected to an output terminal "3" and also via a 390 ohm resistor in series with a 560 ohm resistor to a +150 volt supply. The left-hand cathode K1 is connected via a 100K ohm resistor, a −100 volt supply, and also to the right-hand grid G2. The right-hand cathode K1 is connected directly to ground. Due to the bleeder network, the grid of the left-hand tube is kept at approximately −17 volts which is enough to keep the left-hand tube cut off. The cathode of the left-hand tube will therefore be at a negative potential because it is tied via the 100K ohm resistor to −100 volts. Since the cathode of the left-hand tube is connected to the grid of the right-hand tube, the right-hand grid is negative too, and the right-hand triode is cut off. The capacitance of the resistance-capacitance differentiator is the 100 micro-microfarad input capacitor, and the resistance includes the two cathode to grid resistances in series in the path from ground through the cathode K2, cathode K1, and grid G1. A positive going input pulse applied via the 100 micro-microfarad capacitor to the grid G1 will cause the left-hand tube to conduct. The cathode K1 follows the grid G1 and goes positive causing the grid G2, to which it is tied, to go positive. The right-hand tube then conducts and since the only external resistance in the circuit of the right-hand tube are the two low plate resistors, the right-hand tube conducts heavily. The 100 micro-microfarad condenser charges through a path from ground via the cathode K2 to grid G2, and via cathode K1 to grid G1. Since this is a low resistance path, the 100 micro-microfarad capacitance charges very rapidly until −17 volts appear at the right-hand plate at which point the tube has been cut off, as previously indicated. The effect is a very short pulse of high power in the plate circuit.

The standard peaker is hereinafter represented by a block containing the alphabetic characters PKR followed by a numerical designation 1, i.e., PKR–1.

POWER INVERTER—PW

Referring to Fig. 66, there is illustrated a block symbol of a power inverter, and also the details of the circuit within the block.

A power inverter functions to produce an output signal having greater power than the input signal. The power inverter is no more than a special inverter inasmuch as the output signal is of opposite polarity and has substantially the same wave-shape as as the input signal.

A power inverter however, generally employs a pentode tube, and circuitry which provides a greater current flow than is normally obtained in an inverter with consequent increase in power.

The standard power inverter (Fig. 66), which includes a 6AQ5 type pentode tube, has a grounded cathode and a suppressor grid directly connected to the cathode. The screen grid SG is connected via a 470 ohm resistor to a source of +150 volts. The plate, which is directly connected to an output terminal "3," is connected via a 3K ohm resistor to +150 volts. The grid G1 is connected through a 47K resistor, in series with a 330K resistor, to a −100 volt negative bias supply. Grid G1 is coupled through the same 47K resistor, in series with a 390K ohm resistor shunted by a 100 micro-microfarad condenser to an input terminal "9."

The standard power unit circuit is hereinafter represented by a block containing the alphabetic characters PW followed by a numerical designation 1, i.e., PW–1.

CORE DRIVER—CD

Referring now to Fig. 67, there is illustrated a block symbol of a standard core driver, and also the details of the circuit within the block.

A core driver is a circuit which provides current to a core winding of sufficient magnitude to cause the core to assume a predetermined state, more fully described presently.

A standard core driver may comprise a pentode having its plate connected to an output terminal which is externally connected through a core winding or windings to a positive D.C. voltage source. The application of a positive pulse to the grid will cause the core driver tube to conduct through the external core winding.

The standard core driver (Fig. 67) which comprises a pentode 6AU6 type tube, has its cathode and suppressor grid commonly connected through a 560 ohm resistor to ground, its screen grid SG connected to a source of +150 volts, and its grid G1 connected via a 330 ohm resistor to an input terminal "5." The plate is directly connected to an output terminal "7."

The standard core driver is hereinafter represented by a block containing the alphabetic characters CD followed by a numerical designation 1, i.e., CD–1.

Core driver CD–2 is shown in Fig. 68 and operates in basically the same manner as the standard core driver CD–2. The changes in the core driver CD–2 are obvious from the drawings and are well understood in the art. Consequently, no further description of this core is believed necessary.

RELAY DRIVER—RD

Referring now to Fig. 69, there is illustrated a block symbol of a standard relay driver and also the details of the circuit within the block.

A relay driver is a circuit which provides the current required for energizing a relay upon the application of a positive input pulse.

A standard relay driver may comprise a triode having its cathode connected to ground and its plate connected to an output terminal which is externally connected through a relay to a positive D.C. voltage source. The application of a positive pulse to the grid will cause the relay driver tube to conduct through the external relay causing the energization thereof.

The standard relay driver (Fig. 69), which comprises one triode of a dual triode 5687 type tube, has its cathode connected to ground and its plate directly connected to an output terminal "4." The grid is connected via a 330 ohm grid resistor to a junction on a divider network comprising a 390K ohm resistor connected to a −100 volt supply and a 560K ohm resistor, shunted by a 22 micro-microfarad condenser, connected to an input terminal "8."

It may be necessary for current carrying reasons to operate two or more relay drivers in parallel. This may be accomplished by commonly connecting the plates and commonly connecting the cathodes. Each grid is then connected via its own 330 ohm grid resistor to a common point, and where there is a bleeder network input in the single relay driver, the common point is connected to the junction of the resistor in the bleeder network.

The standard relay driver is hereinafter represented by a block containing the alphabetic characters RD followed by a numerical designation 1, i.e., RD–1. Where relay drivers are connected in parallel, the number of relay drivers so connected is indicated by the number *n* preceding the RD in the block diagram, for example, if there are two standard relay drivers connected in parallel, the block is identified by the symbol 2RD–1.

Relay driver *n*RD–2 is shown in Fig. 70 and operates in basically the same manner as the standard relay driver *n*RD–1. The changes in the relay driver *n*RD–2 are obvious from the drawings and are well understood in the art. Consequently, no further description of this relay driver is believed necessary.

DEFLECTION UNIT—DU, AND DEFLECTION STAGE—DE

Referring now to Fig. 72, there is illustrated a block diagram of a deflection unit containing deflection stage blocks and associated circuitry. Fig. 71 illustrates the standard deflection stage block, the details of the components and connections within the block, and a chart of the number of tubes and the value of cathode resistance for the different variations of the standard block.

A deflection unit is a circuit which may be utilized for deflecting the beam of a cathode ray tube, and functions to provide a control of the voltages at its two output terminals for use by a pair of cathode ray tube deflection plates.

The deflection unit consists of a series of deflection stages, each of which comprises at least one dual triode. The left-hand triode of a deflection stage is normally conducting and the right-hand triode is normally not conducting. The deflection stage can be energized so as to start the left-hand triode conducting and cut off the right-hand triode.

A deflection unit is comprised of a plurality of deflection stages, each of which can provide twice as much current as its previous stage. This permits the input of each stage to be connected to respective right-hand output terminals of a binary counter which, as has been previously described, have stages the outputs of which go positive according to their weighted values. Thus, as the counter is stepped by input pulses and produces voltage conditions at its outputs representative of the number of input pulses, the respective inputs of the deflection stages are energized so that an amount of current flows through the left-hand triode of the deflection stages proportional to the number of pulses applied to the counter. Thus, when the first counter stage produces an output, the first stage of the deflection unit provides a unit amount of current through the left-hand triode to cause a deflection of one unit. Then when the second counter stage is On, the second stage of the deflection unit provides two units of current to cause a deflection of two units, etc.

The standard deflection stage (Fig. 71) which comprises a dual triode 5965 type tube, has its cathodes commonly connected via a cathode resistance R to a source of −250 volts. The left-hand grid G1 is connected via a 330 ohm resistor to the anode of a diode, the cathode of which is connected to an input terminal "5." The junction of the 330 ohm resistor and the diode is connected via a 19K ohm resistor to ground. The right-hand grid G2 is connected via a 330 ohm resistor to the junction of the resistors of a bleeder network comprising a source of −250 volts connected via a 270K ohm resistor and a 15K ohm resistor shunted by a 0.01 microfarad to ground. The left-hand plate P1 is directly connected to an output terminal "6" and the right-hand plate P2 is directly connected to an output terminal "7."

The standard deflection stage is hereinafter represented by a block containing the alphabetic characters DE followed by a numerical designation *n*, i.e., DE–*n*. The value of *n* is the weighted value of the deflection stage. The value of the cathode resistance R for the different deflection stages are shown in the chart of Fig. 71. It is to be noted that as the weighted value *n* of the deflection stage doubles the cathode resistance R approximately halves, providing double the current carrying capacity.

The standard deflection unit (Fig. 72), comprises five deflection stages with commonly connected left-hand output terminals and commonly connected right-hand output terminals. The commonly connected left-hand output of the deflection stages are connected through a 1500 ohm resistor to −250 volts, and the right-hand output of the deflection stages are commonly connected via a 1591 ohm resistor to the +250 volts source. The commonly connected left-hand outputs are also connected via two 10K ohm resistors in series to the commonly connected right-hand outputs. An output terminal "6" is connected to a tap on the 10K ohm resistor that is connected to the commonly connected left-hand terminals, and an output terminal "7" is connected to a tap on the 10K ohm resistor connected to the commonly connected right-hand output terminals. Initially, since all the right-hand triodes are conducting, and the left-hand triodes are not conducting, the right-hand plates are at a negative potential with respect to the left-hand plates and therefore, output terminal "7" of the deflection unit is negative with respect to the output terminal "6." As the left-hand triodes are caused to conduct by the operation of the counter stage, more and more current is caused to flow through the 1500 ohm resistor lowering the voltage at the commonly connected left-hand plates and the output terminal "6," and raising the voltage at the output terminal "7." Due to the nature of the binary counter action, it is obvious that the voltage at terminal "6" goes down in step-wise fashion while the voltage at output terminal "7" goes up in synchronism in step-wise fashion.

The standard deflection unit is hereinafter represented by a block containing the alphabetic characters DU followed by a numerical designation 32. This deflection unit is capable of producing a 32 step deflection of the cathode ray tube.

MAGNETIC CORE SHIFTING REGISTER—SR

Referring to Fig. 74, there is illustrated a block symbol of a standard core shifting register and also the details of the circuit within the block.

A magnetic core shifting register functions to store a bit of binary information in each stage thereof and is provided with means for shifting the binary information from each stage to its succeeding stage when externally pulsed.

The magnetic core shift register may employ a plurality of magnetic cores, each of which has a shift winding, an input winding, and an output winding. The cores, magnetizable to either of two stable states, have remanent flux either clockwise or counterclockwise within the cores. Ordinarily, the value of remanent flux in either direction, referred to as retentivity, is substantially equal. Remanent flux is established in one direction to represent a binary one and in the opposite direction to represent a binary zero. For the purposes of the present invention, a current pulse applied to a shift winding changes the core if in the One state to the Zero state; whereas a current pulse through the input winding, if sufficient in magnitude, changes the core if in the Zero state to the One state. The magnetic state of a core is transferred to the succeeding core by a transfer circuit which is energized when a core changes its magnetic state from One to Zero in response to a shift pulse. If a core is in the One state when a shift pulse is applied, the output winding serves to energize the transfer circuit which establishes the One state in the succeeding magnetic core; if a core is in the Zero state when a shift pulse is applied, the transfer circuit is not energized and the succeeding magnetic core remains in the Zero state.

Before describing a standard core shifting register, a description will be given of Fig. 73 which illustrates an idealized hysteresis loop of commercially obtainable magnetic core material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C, and upon relaxation of this positive force, revert to point A. Application of a negative magnetomotive force greater than the coercive force causes the curve to be traversed to point D, and when the force is terminated, traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated.

The standard magnetic core shift register of Fig. 74 may comprise sixteen magnetic core stages, only the first two and last two of which are shown. A write terminal is connected to the input of a CF–1 type core driver unit, the output of which is connected through an input winding I to a +150 volts source. A shift terminal is connected through the parallel combination of a 270K ohm resistor and a 1000 micro-microfarad condenser to a source of −30 volts. The shift terminal is also connected to the input of two CD–2 type core drivers, one of which is connected through the series connected shift windings S of the first eight core stages to +220 volts and the other of which is connected through series connected shift windings S of the last eight core stages to +220 volts. A circuit in each core stage is completed from ground through the output winding O to a transfer circuit *t*. The contents of transfer circuit *t* is shown between the first and second core stages. The output winding O is connected to the anode of a diode D1, in the transfer circuit *t*, the cathode of which is connected to a junction point *b*, and through a 1000 micro-microfarad condenser to ground. The junction point *b* is also connected through a 4.7K ohm resistor and a 10 millihenry inductance out of the transfer circuit to the input winding I of the succeeding stage to ground. There is a transfer circuit *t* between each of the core stages. The output winding O of the last stage is connected to the anode of a diode, the cathode of which is connected to the parallel combination of a 4.7K ohm resistor and a 100 micro-microfarad condenser to ground. The anode of the diode is also connected through a 100 micro-microfarad condenser and a 10K ohm resistor to a source of −30 volts. An output terminal 16 is connected to the junction of the 1000 micro-microfarad condenser and the 10K ohm resistor.

With the state of remanence indicated at point A on the curve in Fig. 73 arbitrarily selected as representing a binary One and the state of remanence indicated at point E as a binary Zero application of a negative magnetomotive force, by pulsing a shifting winding S on the Stage 1 magnetic core, simultaneously causes a voltage to be induced on the output windings O of the Stage 1 core if it previously was in the One state; while a negligible voltage is induced in these output windings if the core was in the Zero state. If the State 1 core is in the One state when a negative magnetomotive force is applied, the resulting voltage induced on the output winding O establishes current flow through the diode D1 to charge the 1000 micro-microfarad condenser in the transfer circuit t between Stage 1 and Stage 2. Simultaneously, the voltage on each of the output windings O establishes current flow through their respective diodes to charge the 1000 micro-microfarad condensers. As soon as the shift pulse terminates, the charge on the upper plate of the 1000 micro-microfarad condenser discharges through the 4.7K ohm resistor, the 10 millihenry inductance and the input winding I of the Stage 2 core to ground. The positive magnetomotive force established in the Stage 2 core by the discharge current through the Stage 2 input winding I changes the magnetic state of this core from that indicated at point E on the curve in Fig. 73 to that state indicated at point A. Thus, the binary One previously stored in the Stage 1 magnetic core is transferred to the Stage 2 magnetic core in response to the first shift pulse. Thus, it can be understood that each shift pulse applied to the shift terminal will shift all the bits of information to its succeeding stage, leaving the Stage 1 core in a Zero state and providing an output at terminal "16" which is representative of what the state of Stage 16 had been. Write pulse may be applied to the write terminal between shift pulses and thus provide the information for the Stage 1 magnetic core.

The standard magnetic core shift register is hereinafter represented by a block containing the alphabetic characters SR followed by a numerical designation 16, i.e., SR-16.

SCANNER

A description will now be given of the preferred embodiment of the invention, the block circuitry being shown in Figs. 3A to 3I and the timing of the electronic signals in the block circuitry being shown in Figs. 18A to 18I. A multivibrator 150 (Fig. 3B) is used as a parent source of square waves having a ten microsecond period. These square waves are transmitted through a Space multi-grid switch 152 and a Punch multi-grid switch 154 to the input of a "4" counter 156. Waveform (*a*) of Figs. 18A to 18I shows the square waves at the input to "4" counter 156. The operation of the Space multi-grid switch 152 and the Punch multi-grid switch 154 will be described hereinafter.

Figure 3A:
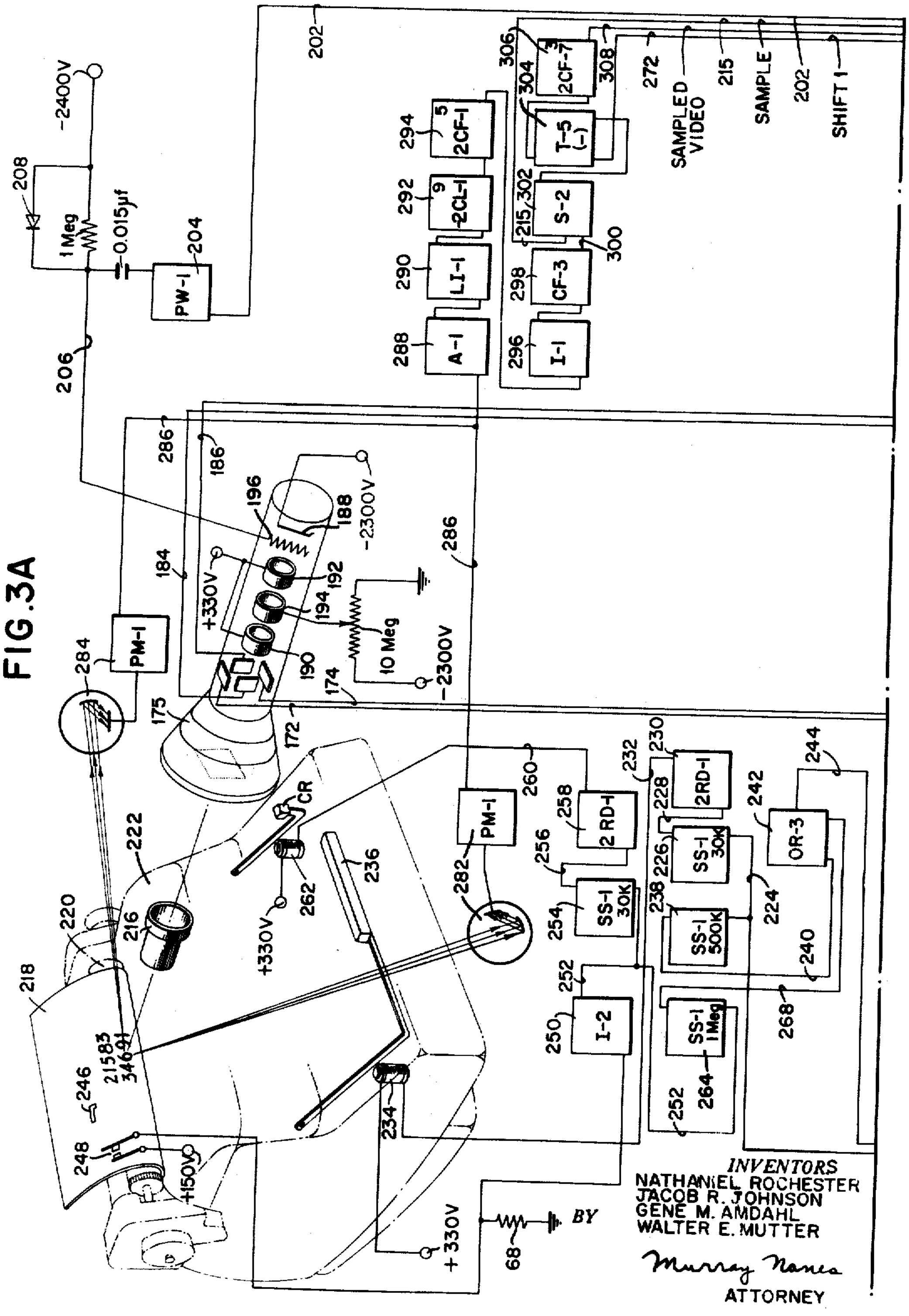
Figure 3B:
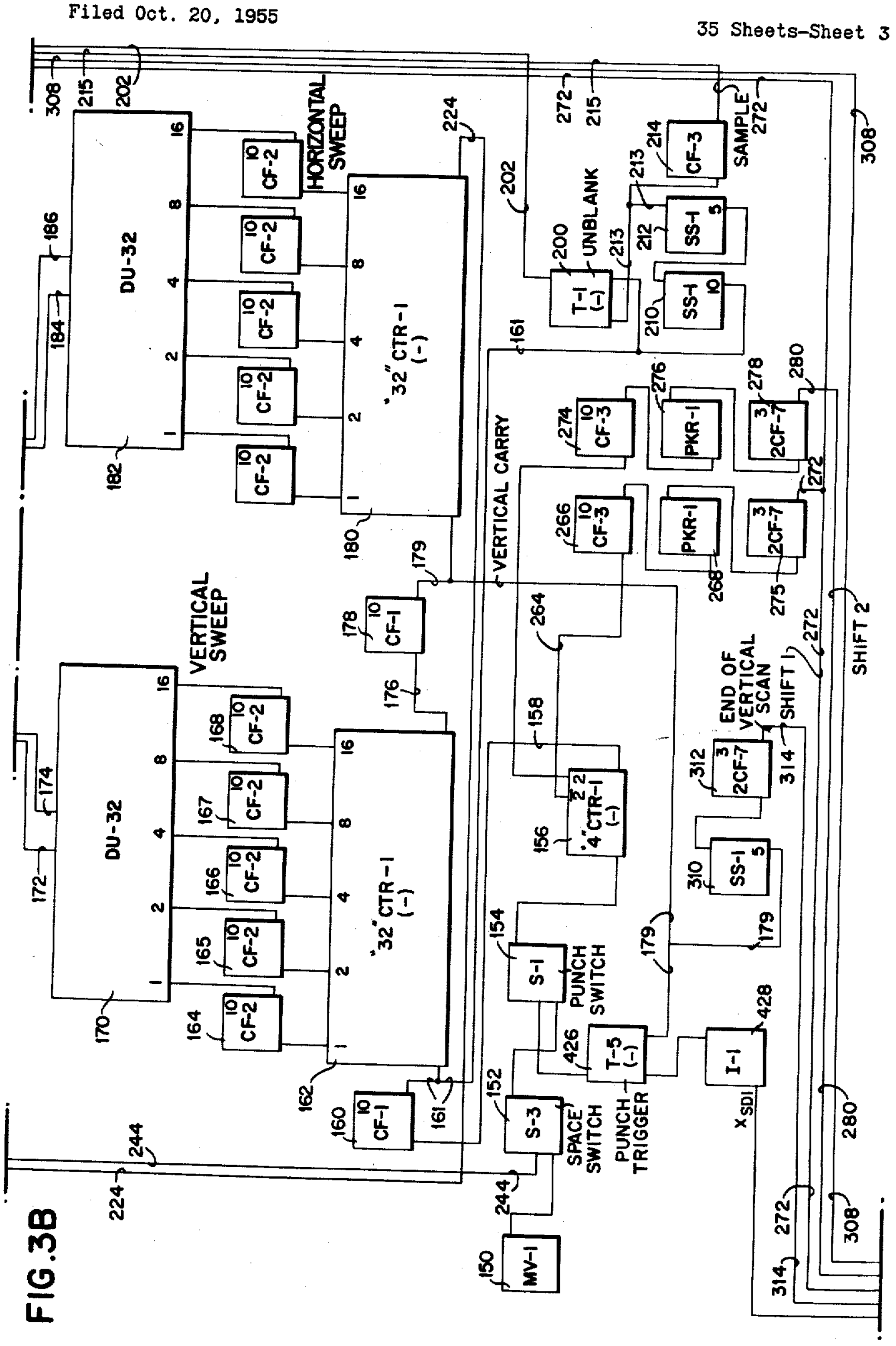

Every fourth pulse into the "4" counter 156 produces a negative output shift, i.e., one every forty microseconds, at its output. The output which is shown as waveform (*b*) of Figs. 18A to 18I is fed via a line 158, a cathode follower 160, and a lead 161 to a "32" counter 162. The 1, 2, 4, 8 and 16 terminals of the "32" counter are each connected via cathode followers 164, 165, 166, 167, and 168 respectively to the terminals 1, 2, 4, 8, and 16 respectively of a DU-32 type vertical deflection unit 170. The two outputs of the vertical deflection unit 170 are connected via leads 172 and 174 to the upper and lower vertical deflection plates respectively, of cathode ray tube 175 (Fig. 3A). As has been previously described, the combination of a "32" counter and a DU-32 type deflection unit acts to produce a 32 step waveform at the vertical deflection plates. The vertical carry pulse from the "32" counter 162 (Fig. 3B) is transmitted via a lead 176, a cathode follower 178, and a lead 179 to a "32" counter 180. The "32" counter 180 is connected in a manner similar to the "32" counter 162 to a horizontal deflection unit 182, the two outputs of which are connected via leads 184 and 186 to the left and right horizontal deflection plates respectively of cathode ray tube 175 (Fig. 3A). The combination of the "32" counter 180 and the horizontal deflection unit 182 acts to produce a "32" step waveform to the horizontal deflection plates of the cathode ray tube 175. The height of the total vertical deflection is controlled by varying the 10K ohm taps (see Fig. 72) in the deflection unit 170 and the width of the total horizontal deflection is controlled by varying the 10K ohm taps in deflection unit 182.

The waveforms in Figs. 18A to 18I are plotted against time from the start of the first vertical scan at the first bit from the bottom to the end of the thirty-second vertical scan at the last bit from the bottom. The bits have been identified by two numbers and a letter, the first number representing the horizontal position and the second number, the vertical position. Since there are thirty-two vertical bits, and only every other one, i.e. sixteen bits, have been found necessary for adequate recognition, the vertical bits have been numbered up to 16 and have been suffixed alternately by a letter *a* or *b*. The suffix *a* bits are the ones used in the recognition system, while the suffix *b* bits are ignored, as will be presently described. For example, the 18 in the notation 18-16*a* represents the eighteenth vertical column to the right of the first scan and the 16*a* represents the thirty-first bit from the bottom, but the sixteenth bit used.

The cathode ray tube 175 (Fig. 3A) which is used as a source of the moving light spot, has its cathode 188 directly connected to a source of −2300 volts. The accelerating anodes 190 and 192 are connected to a source of +330 volts, and the focusing anode 194 is connected to a 10 megohm potentiometer, which in turn is connected between −2300 volts and ground. The control grid 196 is ordinarily at a more negative potential than the cathode 188. When the control grid 196 goes positive, however, the cathode ray tube 175 is unblanked to produce a light spot on its fluorescent screen. The negative output shift of the "4" counter 156 (Fig. 3B), is fed through the output lead 158 and the cathode follower 160 and lead 161 to the right-hand input of an unblank trigger 200. A positive shift appears on the right-hand output of trigger 200 (waveform (*d*) of Fig. 18) and is applied via a lead 202 to the input of a power inverter 204. The output of the power inverter is connected through a 0.015 microfarad condenser through an unblank lead 206 to the control grid 196. Lead 206 is connected to the cathode of a diode 208, the anode of which is connected to a source of −2400 volts. A 1 megohm resistor is shunted across the diode 208. Ordinarily, −2400 volts is applied via the 1 megohm resistor directly to the control grid 196 to prevent the conduction of the cathode ray tube 175. However, when the output of the power inverter 204 goes positive, this positive pulse is applied via the 0.015 microfarad condenser and lead 206 to the control grid 196 to unblank the electron beam and cause a spot of light to fall on the fluorescent screen of the cathode ray tube 175. The discharge time of the 0.015 microfarad condenser and the 1 megohm resistor is relatively slow and so the 0.015 microfarad condenser does not discharge before the positive potential at the output of the power inverter 204 is removed. The same pulse from the "4" counter 156 which turned on trigger 200 via lead 161 is applied to a single shot 210 having a 10 microsecond duration. The waveform (*e*) of Fig. 18 appears at the output of single shot 210 and the negative shift at the end of 10 microseconds is applied to a single shot multivibrator 212 having a 5 microsecond duration positive output (i.e. waveform (*f*) of Fig. 18). Five microseconds after the input pulse, the output of single shot 212 goes negative (a total of 15 microseconds after the unblank trigger 200 is turned On) and the negative pulse is fed via a lead 213 to turn Off unblank trigger 200 and end the unblank pulse (waveform *d*). The 5 microsecond positive pulse is also applied via lead 213 and a cathode follower 214 to a sample lead 215. The use of the 5 microsecond sample pulse on lead 215 will be described hereinafter.

The unblank pulse permits a spot of light to appear on the surface of the cathode ray tube 175. The spot of light is focused by a suitable lens 216 on to a document 218 upon which are shown a plurality of characters to be recognized. The particular embodiment shown in Figs. 3A to 3I contemplate the use of a carriage 220 of a standard electric typewriter 222 to move the document. The carriage 220 is stationary for a period of thirty-two vertical sweeps at which time it is caused to space in a well known manner. The height of the total sweep on the document may be adjusted in a manner previously described, so as to sweep an area as high as the height of the tallest character. The width of the total sweep is adjusted so that the first vertical sweep after spacing will occur one horizontal position to the right of the last vertical sweep before the spacing, thus providing for a continuous series of vertical sweeps across the entire line. As will be shown presently, the determination of end of character and beginning of new character takes place independently of the spacing. Thus, it is obvious that the same results could be obtained by moving the document continuously and vertically sweeping in the same horizontal position over the moving document.

Figure 18A:
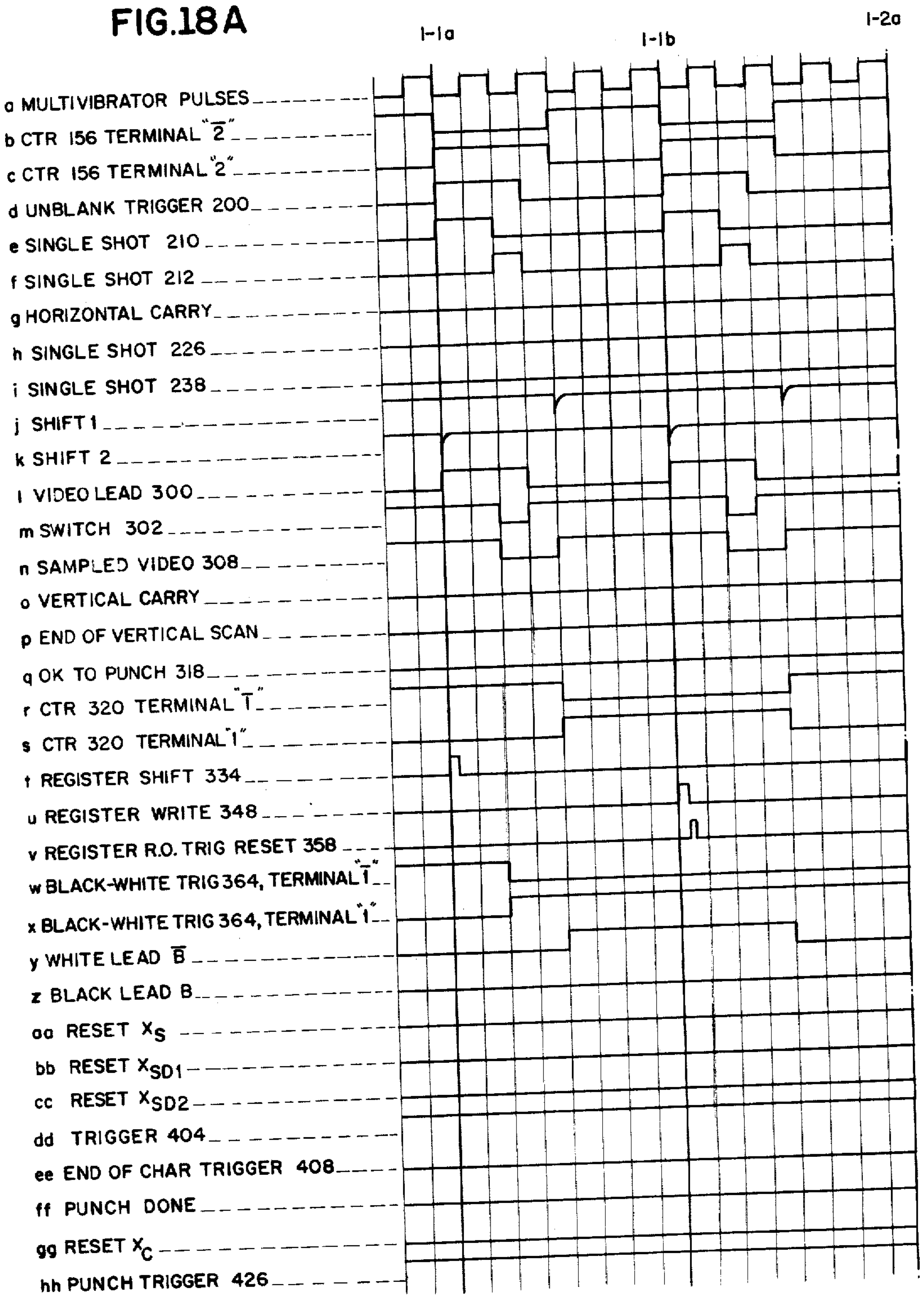
Figure 18B:
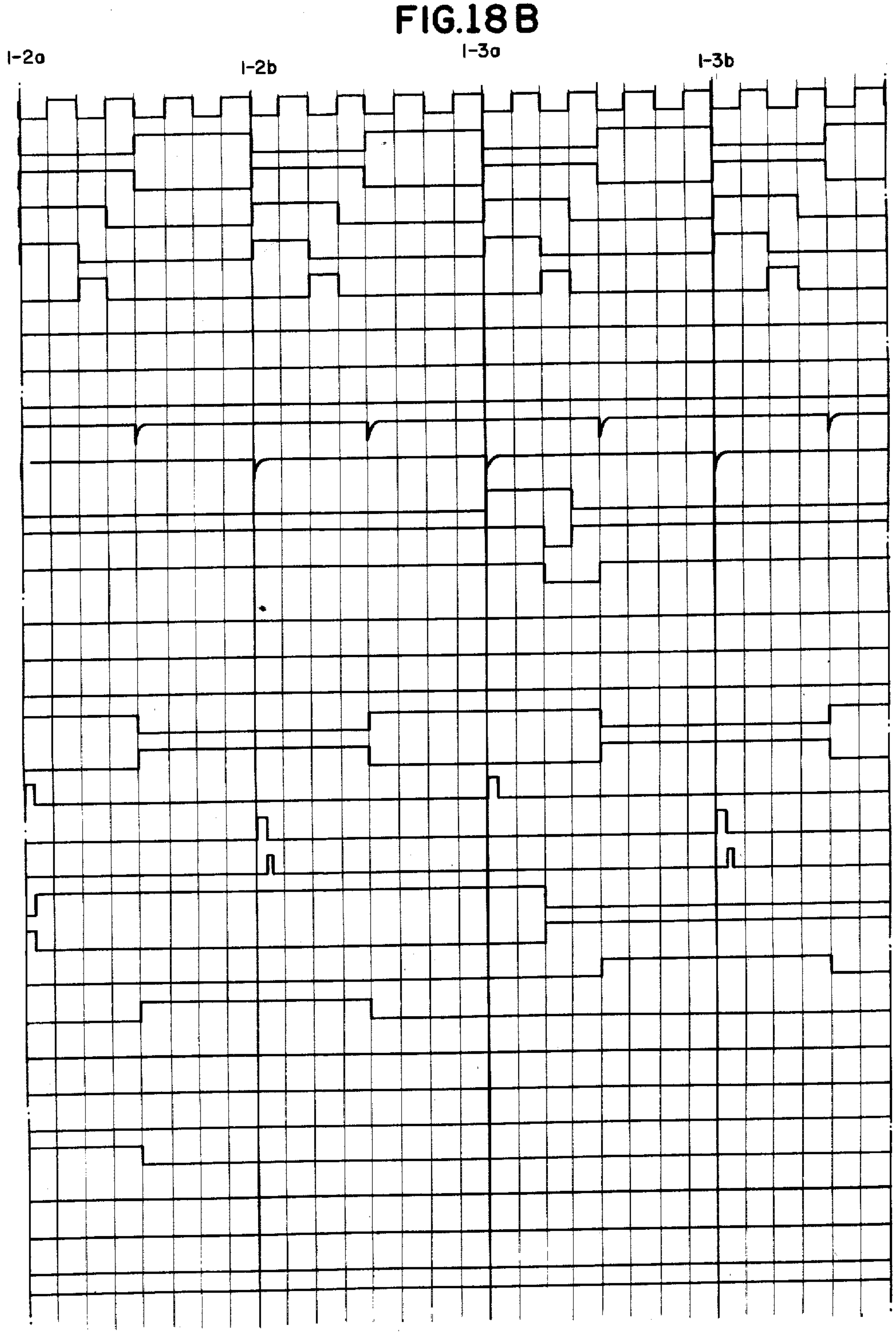
Figure 18C:
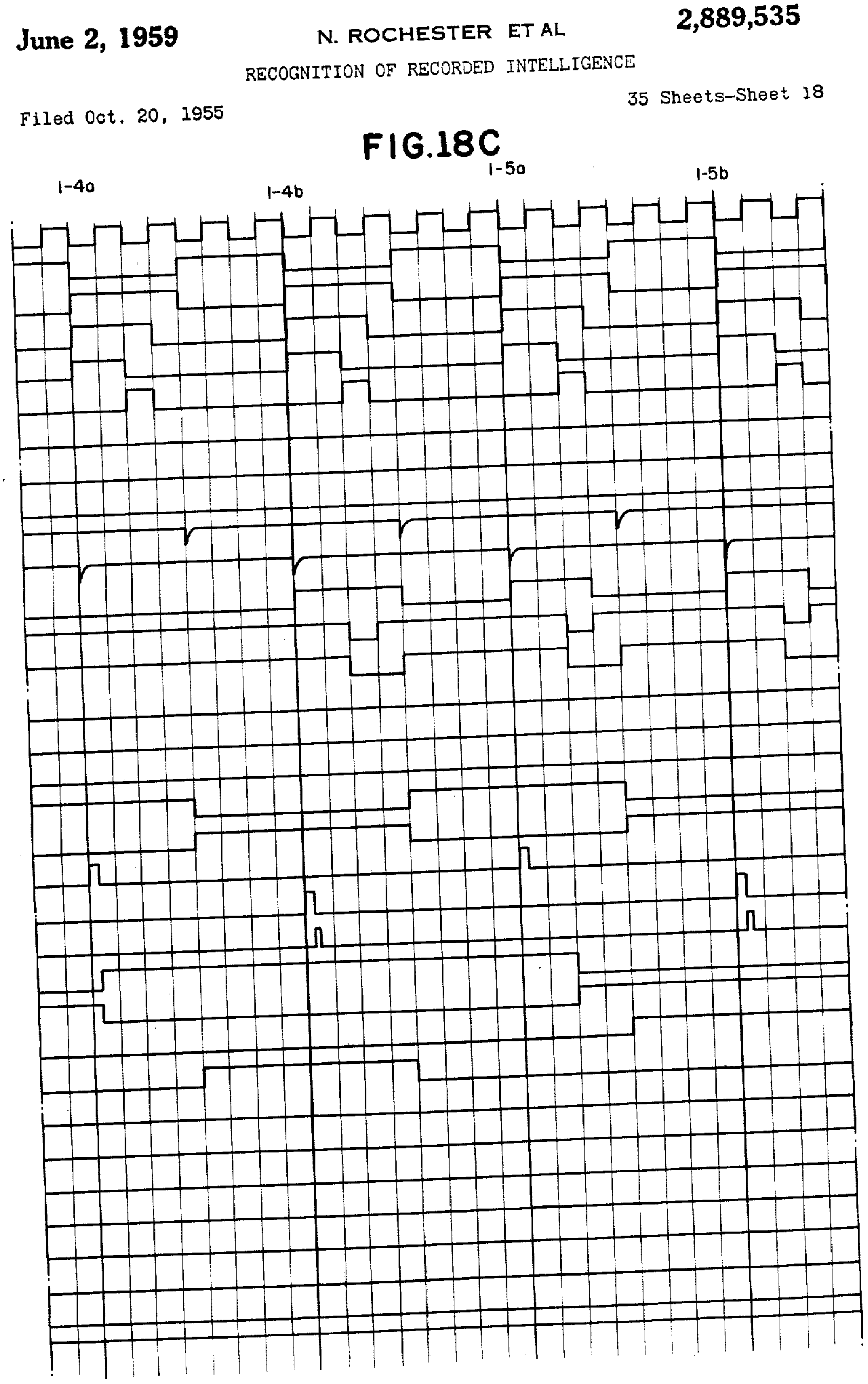
Figure 18D:
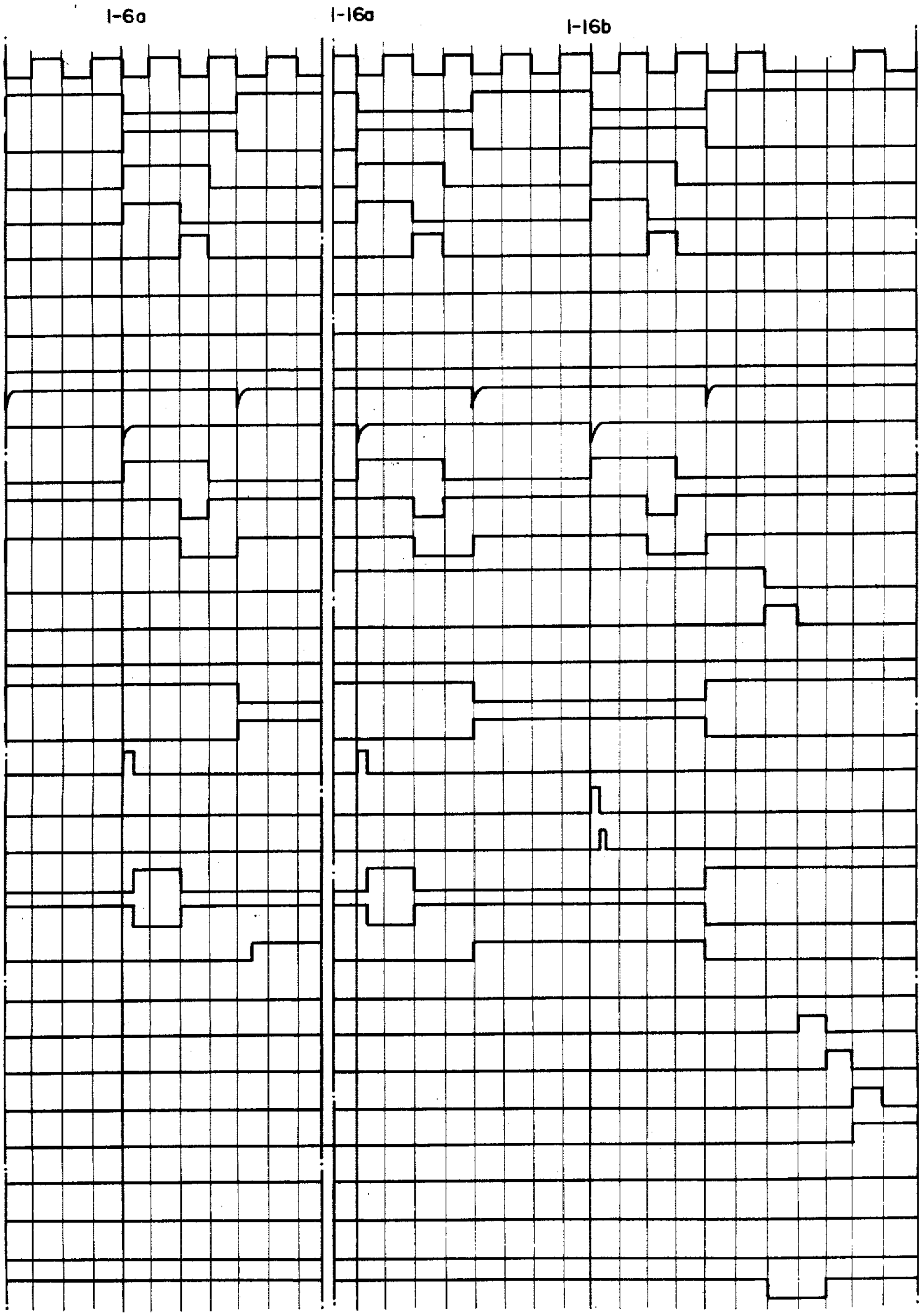
Figure 18E:
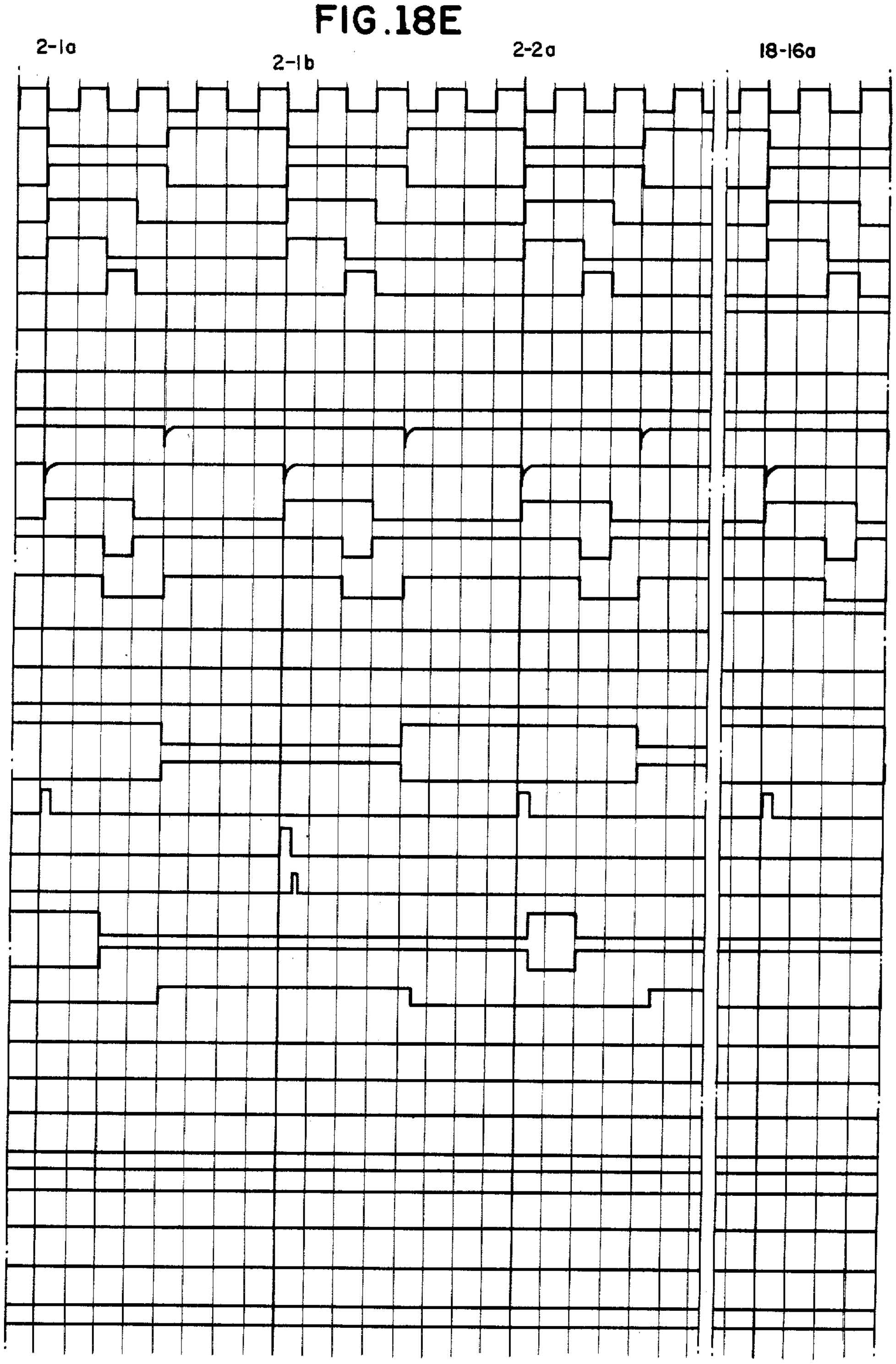
Figure 18F:
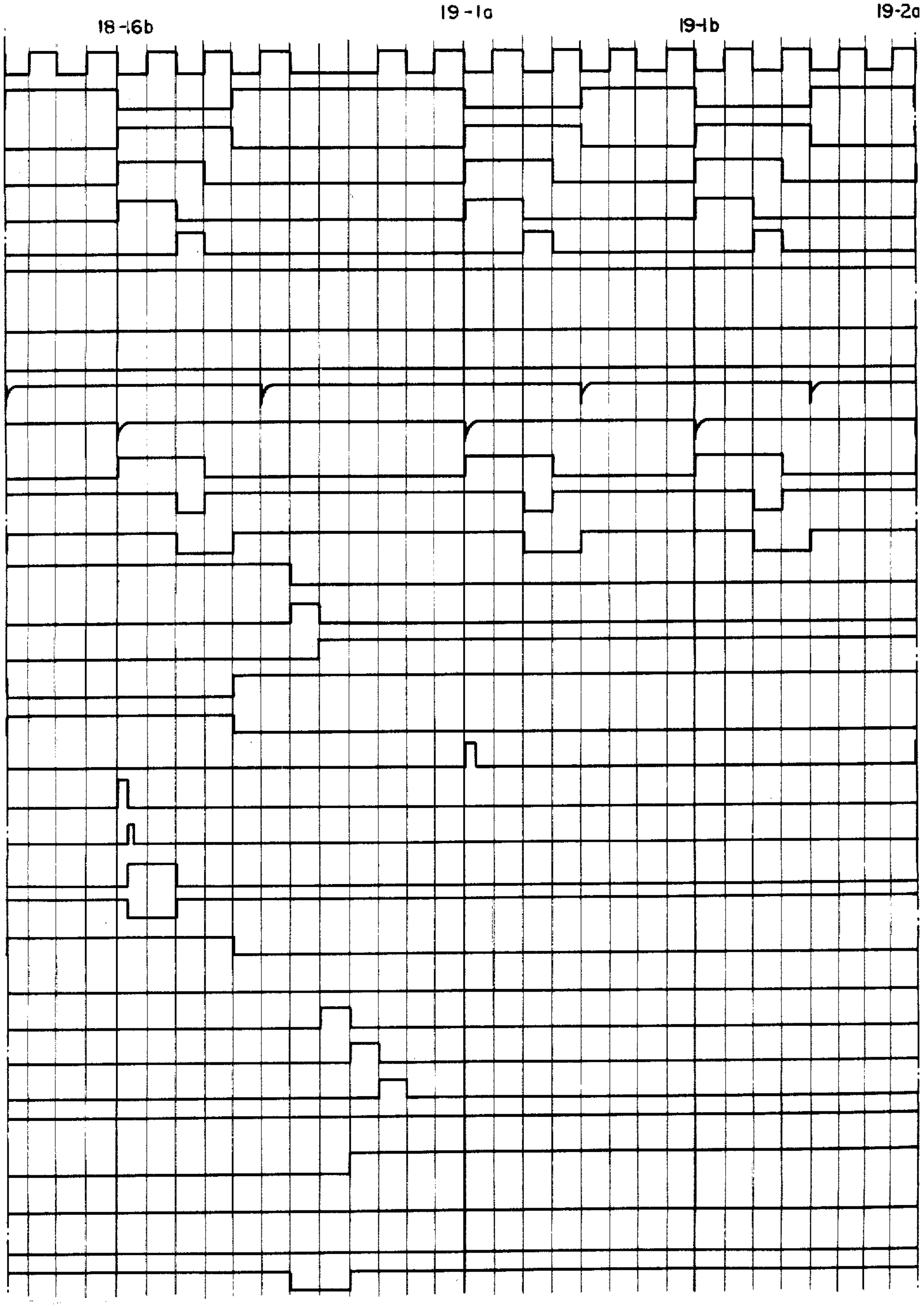
Figure 18G:
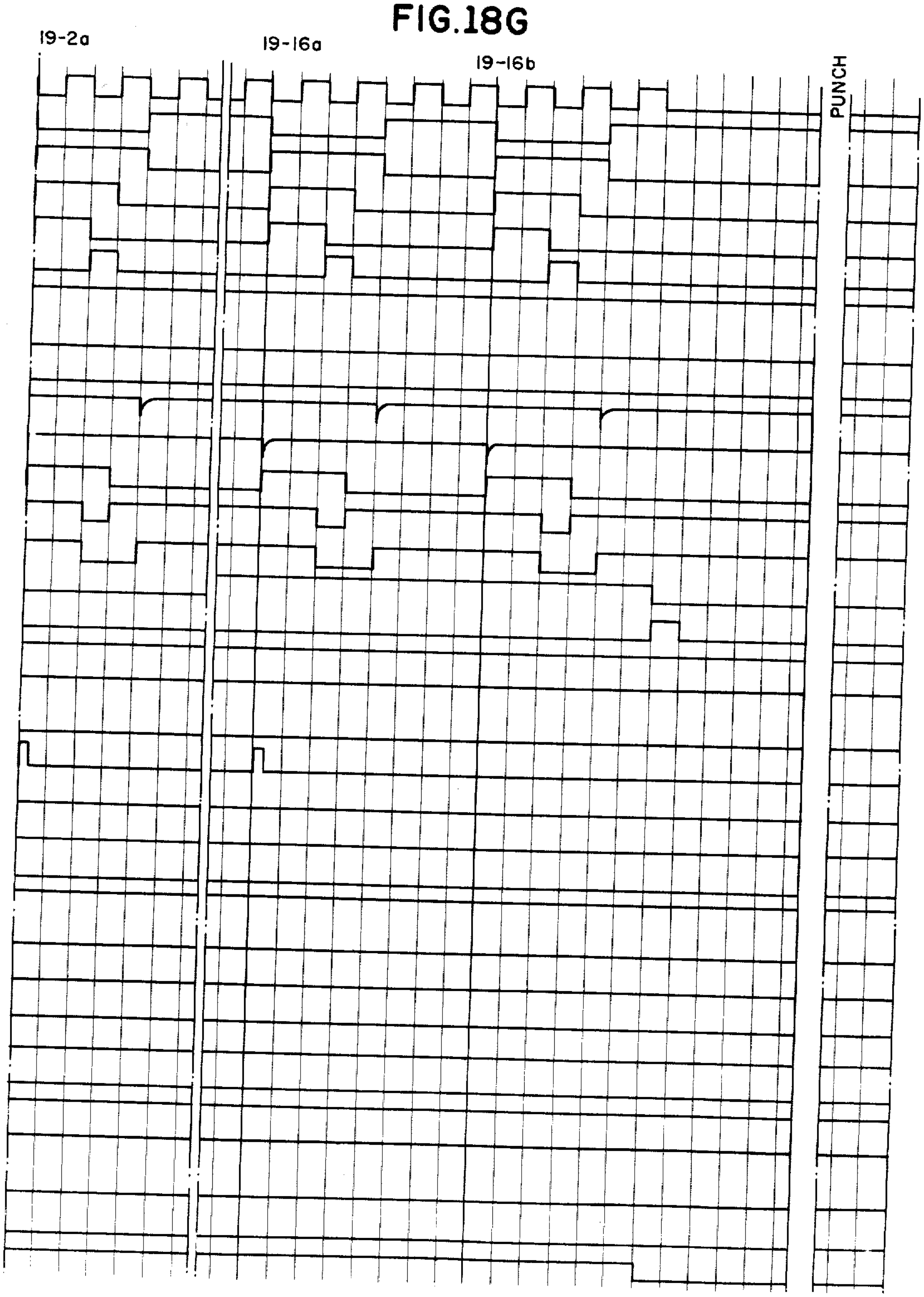
Figure 18H:
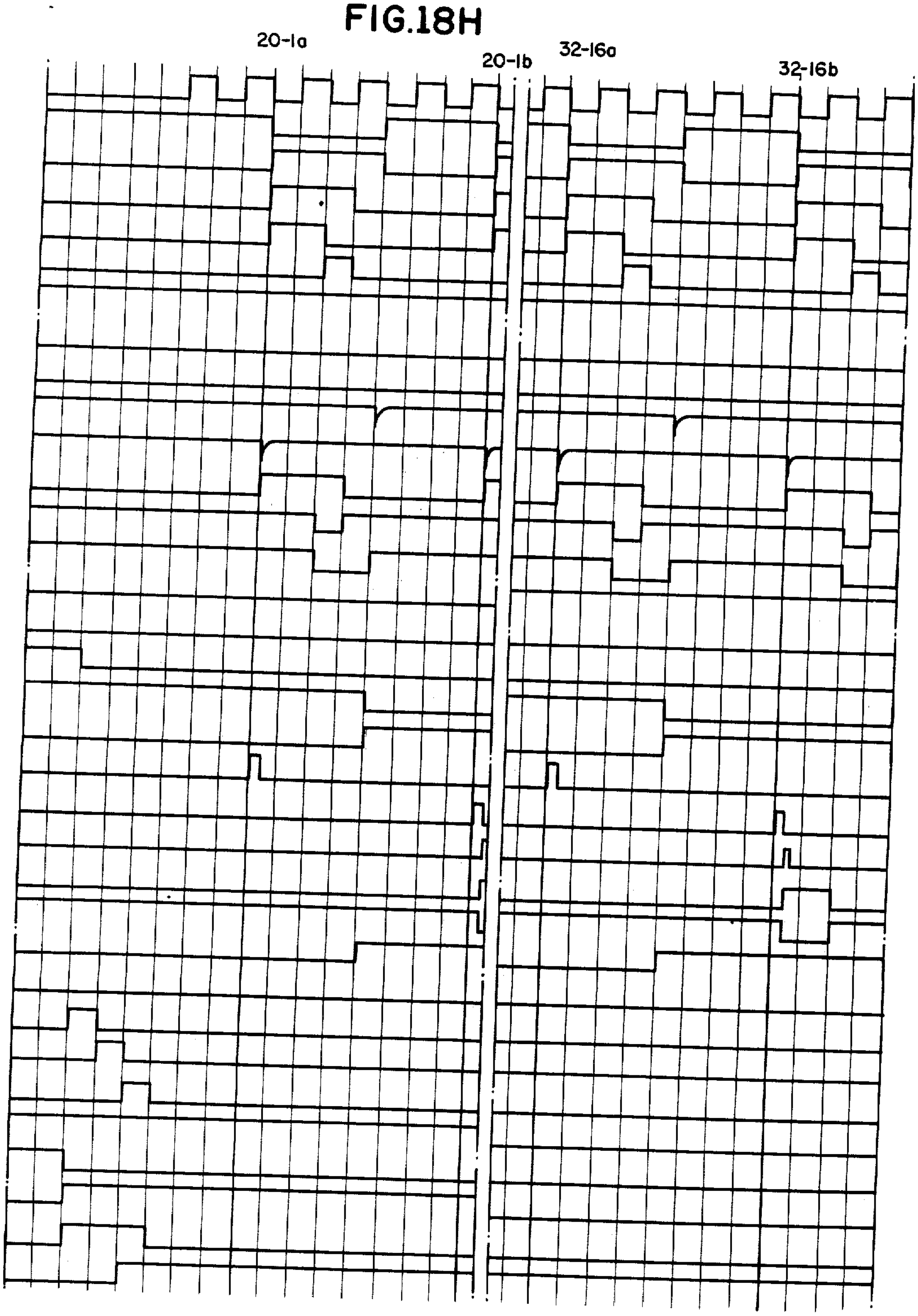
Figure 18I:
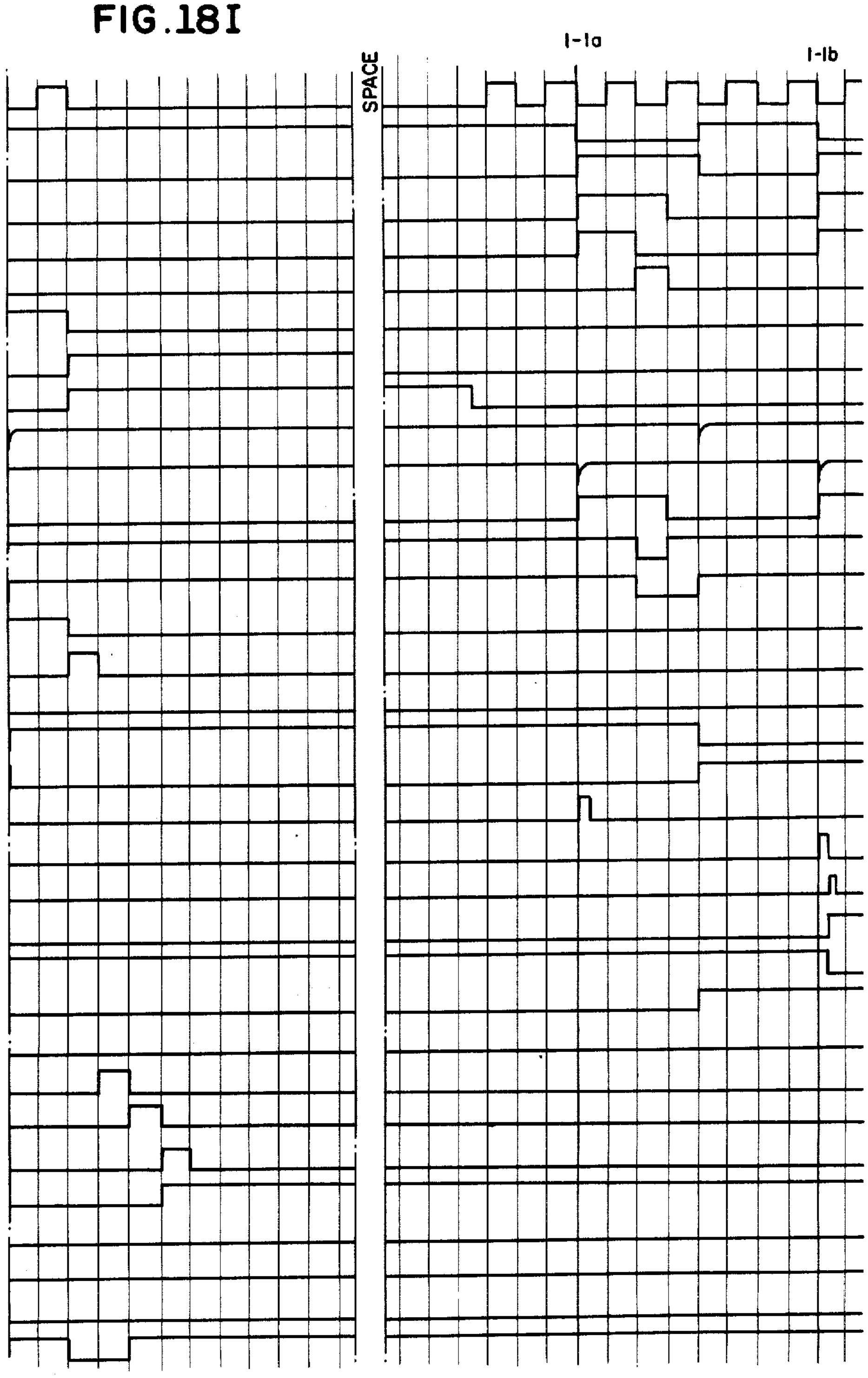

At the end of the thirty-second vertical sweep, a negative horizontal carry (waveform *g* of Figs. 18A to 18I) from the horizontal sweep counter 180, is applied via a lead 224 to a 30,000 microsecond (30 millisecond) single shot 226 (Fig. 3A). For 30 milliseconds, a positive pulse (waveform *h*) is applied via a lead 228 to energize a relay driver 230 which causes current to flow through a lead 232 and Space relay 234 to actuate a standard space bar 236 to space the carriage 220 in any well known manner. Simultaneously, the negative shift on the lead 224 is applied to a half second single shot multivibrator 238 which goes On to apply a positive shift (waveform *i*) via a lead 240, an Or circuit 242, and a lead 244 to the Space multigrid switch 152. The positive shift at the grid of the Space multi-grid switch presents any multivibrator pulses from passing through. Fig. 18I (waveform *i*) indicates that at the end of the 32 vertical sweep there is a one half second delay to allow time for spacing during which time the multivibrator pulses (waveform *a*) are not permitted to pass through to counter 156.

When the carriage has reached its extreme left position, a member 246 moving with the carriage, closes stationary contacts 248 to complete a circuit from +150 volts to the input of an inverter 250. The negative resulting output is applied via a lead 252 to a single shot multivibrator 254 which remains On for 30 milliseconds to apply a positive potential via a lead 256 to a relay driver 258. Relay driver 258 conducts through lead 260 and relay 262 to energize said relay which actuates a carriage return key CR to move the carriage to the beginning of the next line in any well known manner. Simultaneously, the negative output voltage from inverter 250 is applied via lead 252 to a single shot multivibrator 264 which remains On for one second to apply a positive potential to the positive Or circuit 242 which prevents the multivibrator pulses from passing through to counter 156 during a carriage return operation.

As has been previously described, it is necessary to shift the marking register, make a black-white determination, and then write the results of the determination into the first stage of the marking register. To get the proper timing to perform these three functions in sequence, the outputs of the second stage of the "4" counter 156 is utilized. The output of terminal "$\bar{2}$" of counter 156 (waveform *b* of Fig. 18) is fed via a lead 264 and a cathode follower 266 to a peaker 268. The positive shift, every forty microseconds, causes a negative peaked output every forty microseconds as shown in waveform *j* of Figs. 18A to 18I. This negative peaked output is fed via a cathode follower 270 to a shift 1 line 272. The output of terminal "$\bar{2}$" of counter 156 (waveform *c* of Fig. 18) is fed via a cathode follower 274 to a peaker 276 where its positive shift causes a negative peaked output every forty microseconds (waveform *k*) which is fed via a cathode follower 278 to a shift 2 line 280. Since every time the output of terminal "2" of counter 156 goes positive, the output of the terminal "$\bar{2}$" goes negative and vice versa, the pulses will appear on the shift 1 and shift 2 lines 272 and 280 alternately.

The light spot reflected off the document 218 is collected by a pair of photomultiplier tubes 282 and 284 where it is converted to an electrical video pulse and fed via lead 286 to an amplifier 288. The amplified video signal is fed to an LI–1 type limiter 290 which, as previously described, will only allow signals of magnitude of greater than +45 volts to pass through as a negative pulse. Since a white area will reflect more light than a black area, only white indications will cause a signal of over +45 volts to be applied to the limiter 290. The negative pulse representing a white area is then applied via a negative clamp 292 and a cathode follower 294 to an inverter 296, the output of which is a positive video pulse which is applied via a cathode follower 298 and a lead 300 to a multigrid switch 302. The positive video pulse representing white on lead 300 is shown in waveform *l* (Figs. 18A to 18I) as a pulse of 15 microseconds which is the length of the unblank pulse. The other input to multigrid switch 302 is the sample lead 215 carrying the 5 microsecond positive sample pulse (waveform *f*) starting 10 microseconds after the start of the video pulse on lead 300. The resulting output of multigrid switch 302 is a negative pulse, shown in waveform *m*, which is fed to the right-hand input of a trigger 304, turning it On. Trigger 304 is turned Off by the shift 1 pulse on the shift 1 lead 272 which is connected to the right-hand input of trigger 304. Since the shift 1 pulse appears 10 microseconds after the turning On of the trigger 304, a 10 microsecond negative pulse appears at the left-hand output of trigger 304 (waveform *n*) and this negative pulse representation of white is fed via a cathode follower 306 to sampled video lead 308.

The negative shift of the vertical carry on lead 179 (waveform *o*), previously described, is fed to a single shot multivibrator 310, the output of which is then a negative end of vertical scan pulse of 5 microseconds (waveform *p*) which is fed via a cathode follower 312 to an end of vertical scan lead 314.

CONTROL CIRCUITS

Figure 3C:
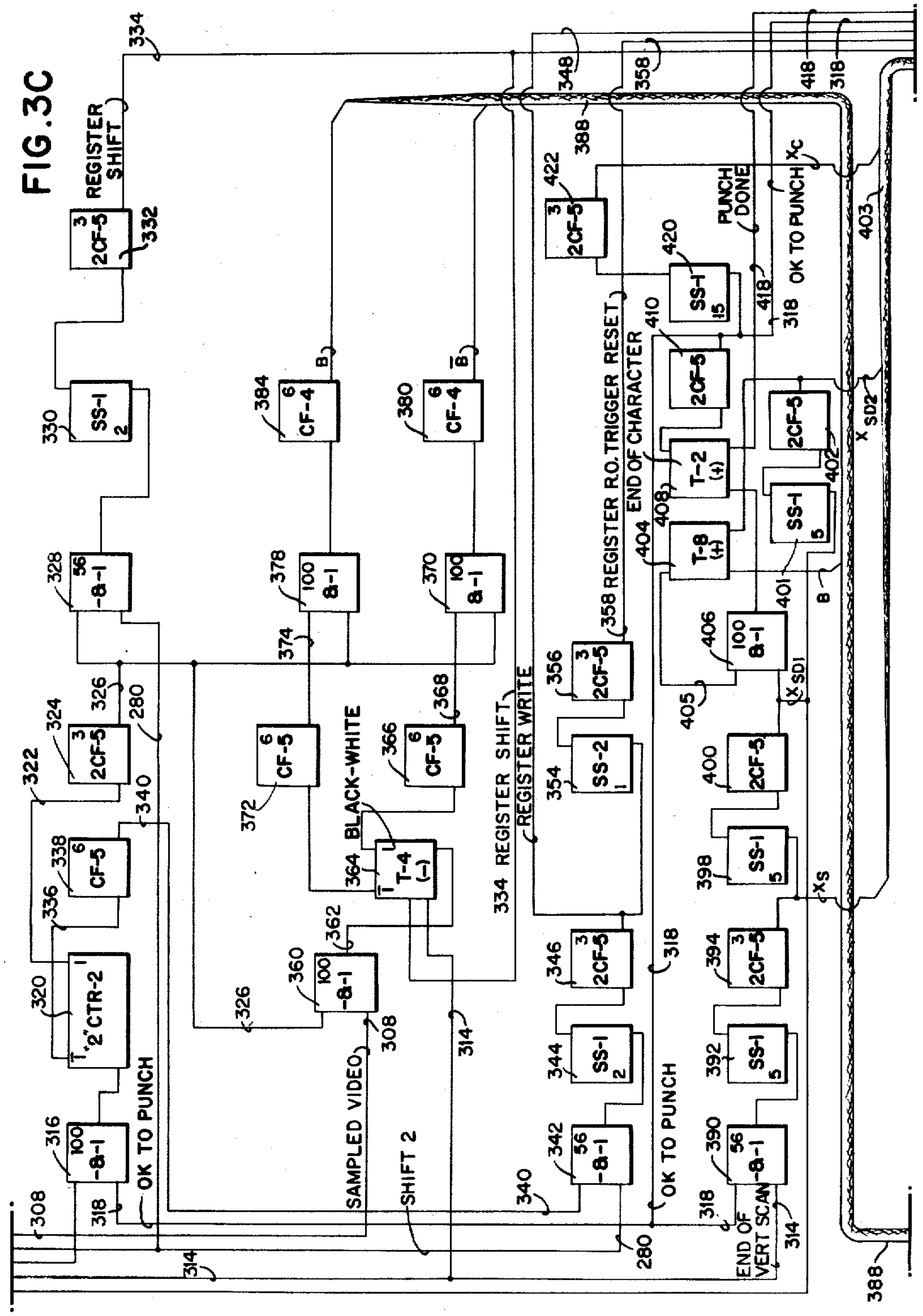
Figure 3D:
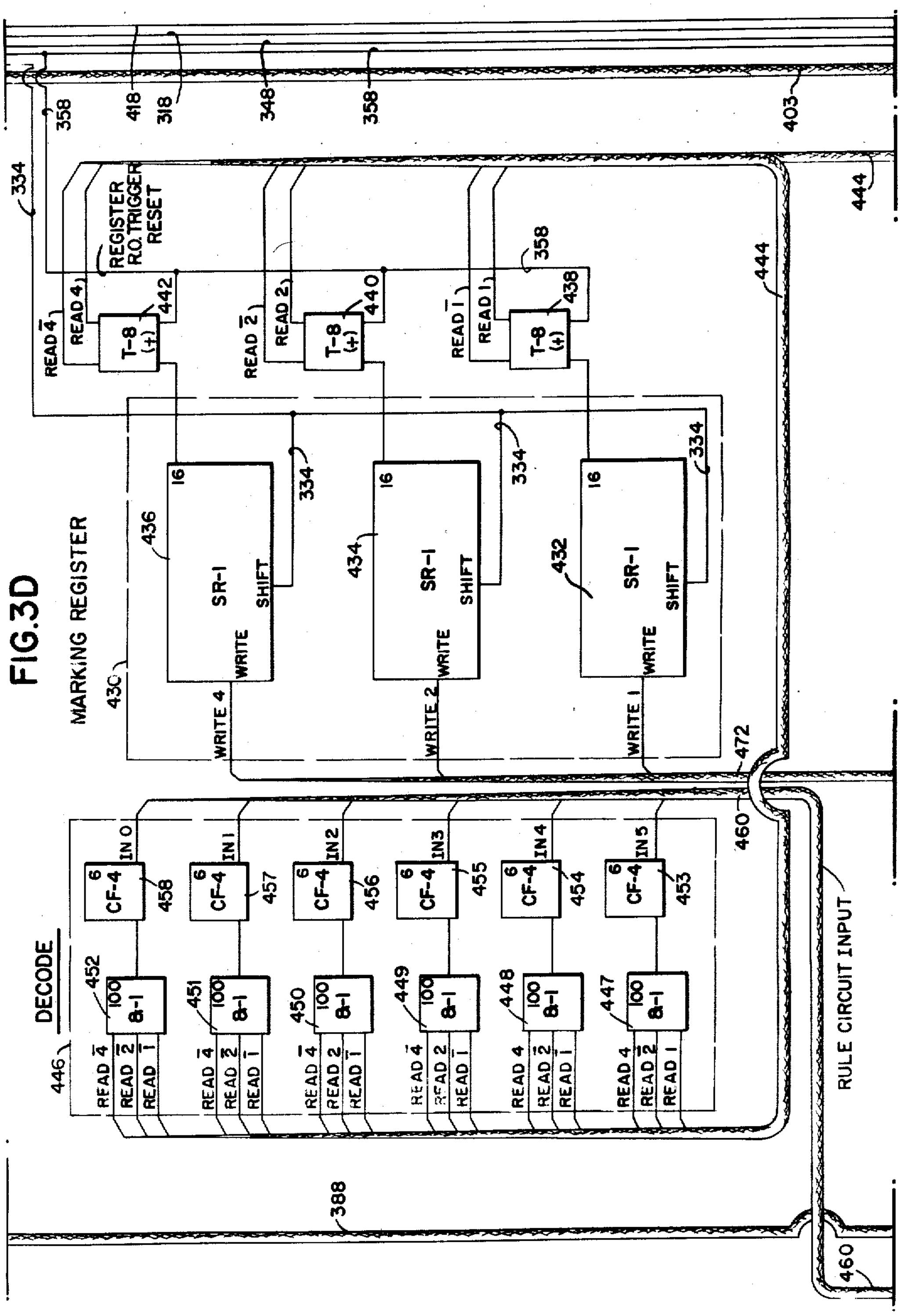
Figure 3E:
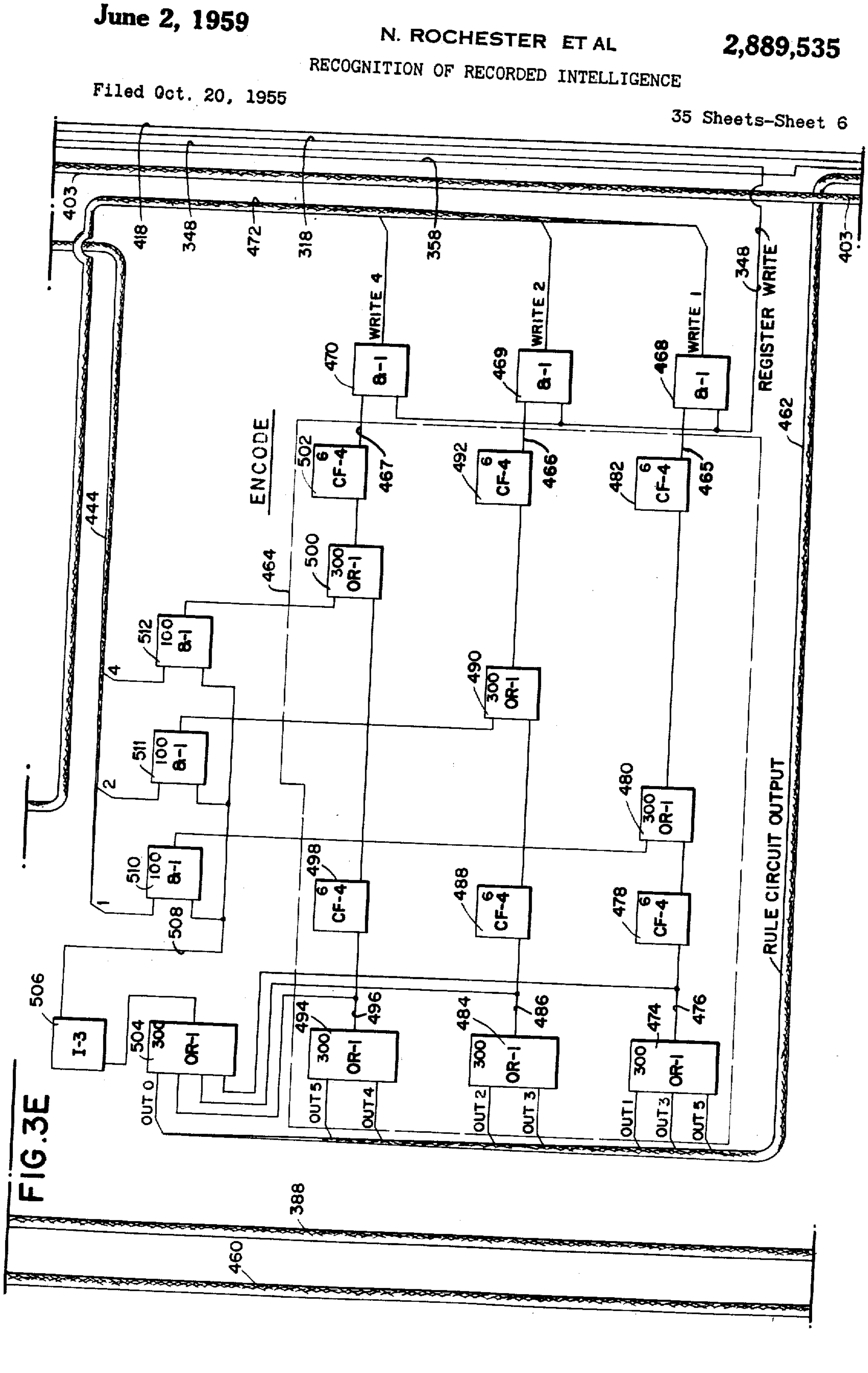

The control circuits, shown in Fig. 3C, include marking register control, reset, and black-white determination circuits. The marking register control circuits include circuits for developing a register shift signal, a register write signal, and a register readout trigger reset signal.

To develop the register shift signal, the shift 1 lead 272 (Fig. 3B) is fed to a negative And circuit 316 (Fig. 3C), the other input of which is an OK to Punch lead 318. The OK to Punch lead 318 is negative at all times except at the end of character when the result of the recognition process is fed to a punch output unit, as will be more fully described hereinafter, see waveform *q*, Figs. 18A to 18I). This negative output is fed to a "2" counter 320 which acts as a frequency divider. The output wave of terminal "1" of counter 320, which is shown in waveform *s*, is fed via a lead 322, cathode follower 324 and a lead 326 to one input of a negative And circuit 328. The other input of negative And circuit 328 is the shift 2 lead 280. Since lead 326 from the terminal "1" of the "2" counter 320 will be negative only during every other negative shift 2 pulse, a negative output will be obtained from negative And circuit 328 every 80 microseconds which is half the frequency of the shift 2 pulses. The output of the negative And circuit 328 is fed to a single shot multivibrator 330 which then feeds a 2 microsecond positive pulse via a cathode follower 332 to a register shift lead 334 (waveform *t*). Since only every other shift 2 pulse causes a pulse on the register shift lead 334, only 16 register shifts will occur for every 32 shifts of the beam in a vertical scan.

The register write signal is designed to occur between the register shift signals. The output pulse from terminal "$\bar{1}$" of the "2" counter 320 (waveform *r*), is fed via a lead 336, the cathode follower 338 and a lead 340 to a negative And circuit 342. The other input of the negative And circuit 342 is the shift 2 lead 280. A negative output will be obtained from negative And circuit 342 every 80 microseconds which is at half the frequency of the shift 2 pulses and will occur between the register shift pulses because the terminal "1" output of "2" counter 320 is negative when the terminal "$\bar{1}$" output is positive. This negative pulse is fed to a single shot multivibrator 344 which emits a two microsecond positive pulse that is fed via a cathode follower 346 to a register write lead 348 (waveform *u*).

The register write lead 348 is connected to the input of a single shot multivibrator 354. The output of single shot multivibrator 354 is a one microsecond positive pulse (waveform *v*) which is fed via a cathode follower 356 to a register read out trigger reset lead 358, and is utilized to reset the register read out triggers immediately following a write pulse.

As has been previously described, a pulse will appear on sampled video lead 308 when a white bit is sensed by the photocells. Once again, in order to utilize only every other sampled video bit, lead 326, upon which appears waveform *s* from the "2" counter 320, is fed to one input of a negative And circuit 360, the other input of which is the sampled video lead 308. A negative pulse on the sampled video lead 308 will be passed through the output of negative And circuit 360 to indicate a white area and the pulse is fed via a lead 362 to the right-hand terminal of a negative black-white trigger 364. Thus, a white bit will cause the black-white trigger 364 to turn On. This trigger is cam reset Off before the start of operation and in the Off position it indicates a black bit. The output terminal "1" of black-white trigger 364 is connected via a cathode follower 366 and a lead 368 to one input of a positive And circuit 370. The output terminal "$\bar{1}$" of trigger 364 is connected via a cathode follower 372 and a lead 374 to one input of a positive And circuit 378. The other inputs of And circuits 370 and 378 are connected to lead 326 which carries waveform *s*. When the lead 326 goes positive it will transmit a positive shift through only one of the two And circuits 370 or 378. If the black-white trigger 364 is Off, the lead 368 is positive, and a positive shift is transmitted via And circuit 370 and a cathode follower 380 to a White lead $\bar{B}$. However, if the black-white trigger 364 is On, the lead 374 is positive, and a positive shift is fed via And circuit 378 and a cathode follower 384 to a black lead B. The black lead B is fed to a black-white cable 388 which feeds the program rules circuits in a manner to be more fully described hereinafter.

It is to be noted in Fig. 18, that at 1–1*a* and 1–2*a* time waveform 1 on video lead 300 goes positive indicating a white area was sensed by the photocells. The white indication of 1–1*a* time will cause the white lead $\bar{B}$ (waveform *y*) to go positive while the white indication of 1–1*b* time is ignored. This can be more readily observed by noting that at 1–3*a* time waveform 1 on video lead 300 goes positive while at 1–3*b* time waveform 1 remains negative indicating a black area was sensed by the photocells. The white indication of 1–3*a* time causes the white lead $\bar{B}$ to go positive and the black indication at 1–3*b* time is ignored. At 1–4*a* time waveform 1 indicates a black area and at 1–4*b* time, a white area. This time the black indication of 1–4*a* time causes the black lead B to go positive and the white indication of 1–4*b* time is ignored. Black-white trigger 364 may also be turned Off by the register shift pulse on the register shift lead 334 and by a pulse on the end of vertical scan lead 314, both of which are connected to its left-hand inputs. Thus, at the beginning of each 80 microsecond bit period the register shift pulse turns Off the Black-white trigger 364. The trigger 364 will indicate black unless turned On by a white sampled video pulse on lead 308.

At the end of the vertical scan, certain triggers must be reset. To develop the reset pulses, the end of vertical scan lead 314 is connected to one input of a negative And circuit 390, the other input of which is the OK to Punch lead 318. As previously described, the OK to Punch lead 318 is negative at all times except at the end of character. The negative shift on lead 314 (waveform *p*) at the end of vertical scan is fed via negative And circuit 390 to turn on single shot multivibrator 392 for five microseconds. The output of single shot multivibrator 392 is a five microsecond positive pulse which is fed via a cathode follower 394 to a reset lead $X_s$ where it appears as waveform *aa*.

As the end of five microseconds, the lead $X_s$ goes negative and this negative pulse is fed to a single shot multivibrator 398 which is turned On for five microseconds. The resulting five microseconds positive pulse is fed from the output of single shot multivibrator 398 via a cathode follower 400 to a reset lead $X_{sd1}$ (waveform *bb*). Lead $X_{sd1}$ is connected to the input of a single shot multivibrator 401 and therefore, the negative shift of lead $X_{sd1}$ turns On the single shot multivibrator 401, the output lead of which is connected via a cathode follower 402 to a reset lead $X_{sd2}$. Both leads $X_s$ and $X_{sd2}$ are fed via a reset cable 403 which is fed to the program rules circuits.

To determine an end of character, there must be one complete vertical scan without the presence of a black area. A positive trigger 404 is reset Off at the end of every vertical scan by the $X_{sd2}$ reset pulse on reset lead $X_{sd2}$ which is connected to its right-hand input. The left-hand input is connected to black lead B, and if at any time during a vertical scan black lead B goes positive, trigger 404 will be set On. The left-hand output of trigger 404 is connected via a lead 405 to one input of a positive And circuit 406; the other input of which is reset lead $X_{sd1}$. The output of positive And circuit 406 is connected to the left-hand input of an End of Character trigger 408. In order for a positive $X_{sd1}$ pulse to pass through And circuit 406 to turn On the End of Character trigger 408, trigger 404 must be in the Off condition so that lead 405 is positive. Thus, if during a vertical scan a black bit is sensed, trigger 404 will be turned On and prevent the $X_{sd1}$ pulse from turning On the End of Character trigger 408. After an all white bit vertical scan, End of Character trigger 408 is turned On, and a positive shift is fed from its output via a cathode follower 410 to the OK to Punch lead 318. The positive OK to Punch shift on lead 318 is fed to a relay driver 412 (Fig. 3I) causing it to conduct through an OK to Punch relay R10 to +150 volts. This energizes OK to Punch relay R10 closing its contact R10–1 to complete a circuit from a punch line terminal 414 of a Punch 416, closed contacts R10–1, the selected Christmas tree shape decoder contacts to one of the terminals 0 to 9 of the Punch. This Punch may be of the type shown in the patent to Gardinor, 2,647,581, or of any well known type where the completion of the circuit to one of the terminals causes the character selected to be punched and/or printed on a card. Any other output medium may be used. When the punching operation is over, a positive Punch Done pulse is fed via a Punch Done lead 418 to the right-hand input of End of Character trigger 408 (Fig. 3C), turning it Off. The Punch Done pulse may be obtained by the closing of contacts by a cam in a well known manner. A negative shift appears on the output of End of Character trigger 408 and is transmitted via cathode follower 410, causing the OK to Punch positive pulse on lead 318 to end. The lead 318 is also connected to the input of single shot multivibrator 420 which is turned On transmitting a positive pulse via a cathode follower 422 to an End of Character reset lead $X_c$. The $X_c$ is connected to the cable 403 along with the $X_s$ and $X_{sd2}$ reset leads.

The vertical carry lead 179 (Fig. 3B) is connected to the right-hand input of a Punch negative trigger 426. Lead $X_{sd1}$ is connected to the input of an inverter 428 (Fig. 3B), the output of which is connected to the left-hand input of Punch trigger 426. At the end of each vertical scan, Punch trigger 426 is turned on by the negative shift of the vertical carry (see Figs. 18A to 18I, waveform *o*) and turned off 10 microseconds later by the reset pulse $X_{sd1}$ which causes a negative shift (waveform *bb*) at the output of inverter 428 and left-hand input of punch trigger 426 (waveform *hh*). After the first all white vertical scan, further reset pulses are blocked by the OK to Punch pulse on lead 318. This is accomplished because OK to Punch lead 318 is connected to the input of negative And circuit 390 (Fig. 3C) and remains positive to block the end of vertical scan pulse on leads 314 from creating reset pulses. The OK to Punch lead 318 is also connected to negative And circuit 316, where it prevents negative shift 1 pulse on lead 272 stepping the "2" counter 320. Counter 320 thus remains in the condition where its terminal "1" output is negative until a Punch Done pulse is received. This normal register shift pulses on lead 334 as previously described. However, the terminal "$\bar{1}$" remains negative and prevents the shift "2" pulses on lead 280 from generating register write pulses on lead 348 and register read out trigger reset pulses on lead 358. This has the effect of shifting the marking register through a complete vertical scan cycle without writing therein which effectively causes the marking register to be reset during the vertical scan following the all white bit scan.

MARKING REGISTER, CODE AND DECODE CIRCUITS

The marking register 430 (Fig. 3D) comprises three 16 position shift registers 432, 434, and 436. The shift terminal of each of the shift registers is connected to the register shift lead 334 and each shift register is thus shifted in synchronism by the register shift pulse (waveform *t*). Each of the shift registers is given a weighted value; shift registers 432, 434, and 436 having the weighted values 1, 2, and 4 respectively. The same numbered stage of each of the three shift registers, taken together, may thus represent any number from zero to seven according to a binary 1–2–4 code. In order to illustrate the binary code, numbers from zero to five are shown with their binary coded representations in Table 1 below. The binary coded representation for each number is shown in terms of the presence or absence of the three weighted digits 1, 2, and 4, an X indicating the presence, and no X indicating the absence of the weighted digit.

TABLE 1

| | Binary Coded | | |
|---|---|---|---|
| | 1 | 2 | 4 |
| zero | | | |
| one | X | | |
| two | | X | |
| three | X | X | |
| four | | | X |
| five | X | | X |

The One state of a core in each shifting register may indicate the presence of the weighted digit and the Zero state may indicate the absence thereof.

For example, in the sixteenth stage of the marking register a five may be represented by the One state in the sixteenth stage of the 1 weighted shift register 432, a Zero state in the sixteenth stage of the 2 weighted shift register 434, and a One state in the sixteenth stage of the 4 weighted shift register 436. In order to utilize the information in the sixteenth stage, the sixteenth stage outputs of shift registers 432, 434, and 436 are connected respectively to the left-hand inputs of the register read out triggers 438, 440, and 442, weighted 1, 2, and 4 in that order. The right-hand inputs of the register read out triggers are commonly connected to the register read out trigger reset lead 358. A register read out trigger reset pulse on lead 358 resets the register read out triggers 438, 440, and 442 Off. Thirty-eight microseconds later (see Fig. 18A) the register shift pulse on lead 334 causes a shift of the bits to the next stage. Assuming again that there is a five being shifted into the sixteenth stage, the sixteenth stage of the weighted 1 and the weighted 4 shift registers 432 and 436, respectively are placed in the One states turning the weighted 1 and weighted 4 register triggers 438 and 442 On, and leaving the 2 weighted trigger 440 Off.

The output of the register read out triggers 438, 440, and 442 are leads which represent the presence or absence of a weighted one, two, and four. The right-hand output lead of register read out triggers 438, 440, and 442 represent the presence of 1, 2, and 4 respectively and are labeled leads Read 1, 2, and 4 respectively. The left-hand output leads represent the absence of 1, 2, and 4 respectively and are labeled leads Read $\bar{1}$, $\bar{2}$, and $\bar{4}$ respectively. These six register trigger output leads are fed into a Read cable 444 and thence to a Decode circuit 446. The Decode circuit 446 is provided to convert the binary coded output on the Read leads into the one out of six code. The one out of six code, used in the Rule circuits, is just the use of a lead for each of the six numbers; the presence of the number being represented by a positive potential on the lead. The Decode circuit 446 comprises a plurality of And circuits 447 to 452 inclusive, each of which has three inputs, one from each of the register readout triggers 438, 440, and 442. And circuits 447 and 452 inclusive are respectively connected via cathode followers 453 to 458 inclusive respectively, to one out of six coded leads In 0 to In 5 inclusive. The one out of six coded leads In 0 to In 5 inclusive are fed into a Rule circuit input cable 460. Only one of the And circuits will have all its inputs positive at any one time and therefore, only one of the one out of six coded leads In 0 to In 5 will be positive. For example, a five in the register readout triggers causes the Read 1, $\bar{2}$, and 4 output leads to go positive. And circuit 447 is the only one which has all three inputs positive. A positive shift results at the output of And circuit 447 which is applied via cathode follower 453 to the In 5 lead in the Rule circuit input cable 460.

A rule circuit output cable 462 (Fig. 3E) coming from the Rule Circuits contains six leads Out 0 to Out 5, inclusive, which are connected to the different inputs of an Encode circuit 464. The leads Out 0 to Out 5 inclusive in the Rule Circuit Output Cable 462 contain one out of six coded information which is converted by the Encode circuit 464 into binary coded information which is to be fed into the first stage of the marking register 430. Coming out of the right-hand side of the Encode circuit 464 are three leads 465, 466, and 467, weighted 1, 2, and 4 respectively, which are respectively fed to one of the input terminals of And circuits 468, 469, and 470 respectively.

The three leads 465, 466, and 467 can contain binary coded information because the presence of a positive potential on any lead of the leads 465, 466, and 467 indicate the presence of its weighted value, while presence of a negative potential indicate the absence of the weighted value. A five would thus be represented by a positive voltage on weighted 1 lead 465, a negative voltage on weighted 2 lead 466, and a positive voltage on weighted 4 lead 467. The other inputs of And circuits 468, 469 and 470 are commonly connected to the register write lead 348. The outputs of And circuits 468, 469 and 470 are leads Write 1, 2, and 4 respectively which are connected via write cable 472 to the write inputs of shift registers 432, 434 and 436 respectively. Forty microseconds after the register shift pulse, a register write pulse is applied to register write lead 348 and if any of the leads 465 to 467 inclusive are positive, a positive pulse will appear on the respective output lead Write 1, Write 2, and Write 4 and cause the writing of a 1, 2 and 4 respectively into the first stage of the respective shift registers. Thus, in the case of the coded five, a positive on the 1 and 4 weighted leads 465 and 467 and a negative on 2 weighted lead 466 would put the first stage of shifting registers 432 and 436 in a One state, and leave the first stage of shifting register 434 in a Zero state.

In the Encode circuit 464, Out 1 lead in the Rule Circuit Output Cable 462 is connected via an Or circuit 474, a lead 476, a cathode follower 478, an Or circuit 480, and a cathode follower 482 to the 1 weighted lead 465. The Out 2 lead in the Rule Circuit Output Cable 462 is connected via an Or circuit 484, a lead 486, a cathode follower 488, an Or circuit 490, and a cathode follower 492 to the 2 weighted lead 466. The Out lead 4 in the Rule Circuit Output Cable 462 is connected via an Or circuit 494, a lead 496, a cathode follower 498, an Or circuit 500, and a cathode follower 502 to the 4 weighted lead 467. Since the Out 1 lead from the Rule Circuit Output Cable 462 is connected only to Or circuit 474 of the three Or circuits 474, 484, and 494, a positive potential on the Out 1 lead from the Rule Circuit Output Cable 462 will cause only the 1 weighted lead 465 to go positive. Similarly, the Out 2 lead from the Rule Circuit Output Cable 462 will cause only the 2 weighted lead 466 to go positive, and the Out 4 lead from the Rule Circuit Output Cable 462 will cause only the 4 weighted lead 467 to go positive. The Out 3 lead from the Rule Circuit Output Cable 462 is connected to both Or circuits 474 and 484 to cause positive outputs on both the 1 and 2 weighted leads 465 and 466 in accord with the code indicated in Table 1. The Out 5 lead from the Rule Circuit Output Cable 462 is connected to Or circuits 474 and 494 to cause positive outputs on both the 1 and 4 weighted leads.

If none of the leads in the Rule Circuit Output Cable 462 are positive, then the number in the sixteenth stage of the marking register 430 will be automatically written into the first stage. The Out 0 lead from the Rule Circuit Output and leads 476, 486 and 496 are all connected to the input of an Or circuit 504. If any of the leads Out 1 to Out 5 inclusive from the Rule Circuit Output Cable 462 go positive, then at least one of the leads 476, 486 and 496 will be positive. Thus, if any of the leads Out 0 to Out 5 inclusive from the Rule Circuit Output Cable 462 go positive, a positive shift will be applied to the inverter 506 and cause the lead 508 connected to the output of inverter 506 to go negative. Lead 508 is connected to one of the inputs of each of the And circuits 510, 511 and 512. The other input of And circuit 510 is connected to the lead Read 1 from the register readout triggers and the output is connected via Or circuit 480 and cathode follower 482 to the 1 weighted lead 465. The other inputs of And circuits 511 and 512 are connected to the leads Read 2 and Read 4 respectively from the register readout triggers and the respective outputs are connected to the 2 and 4 weighted leads 466 and 467 respectively. Thus, if any of the leads Out 0 to Out 5 from the Rule Circuit Output Cable 462 are positive, lead 508 is negative and all the And circuits 510, 511 and 512 are deconditioned. If none of the leads Out 0 to Out 5 are positive, then lead 508 is positive and positive potential on leads Read 1, Read 2 and Read 4 representative of the information in the sixteenth stage, are transmitted through the Encode circuit 464 to leads 465, 466 and 467, respectively, for application to the leads Write 1, Write 2 and Write 4 into the first stage of the marking register 430.

SHAPE RULE CIRCUITS AND MEMORY TRIGGER STORAGE

Figure 3F:
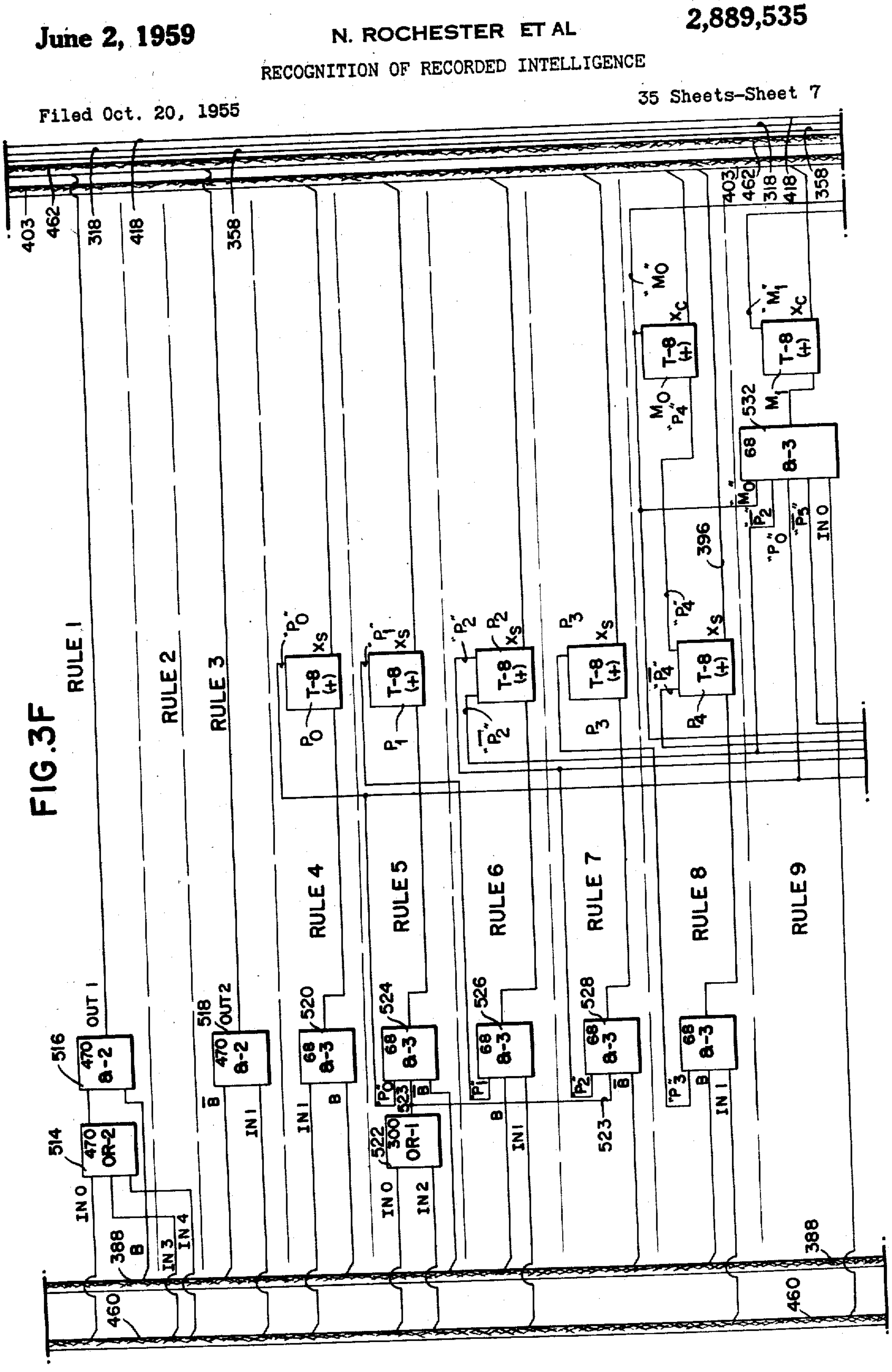
Figure 3G:
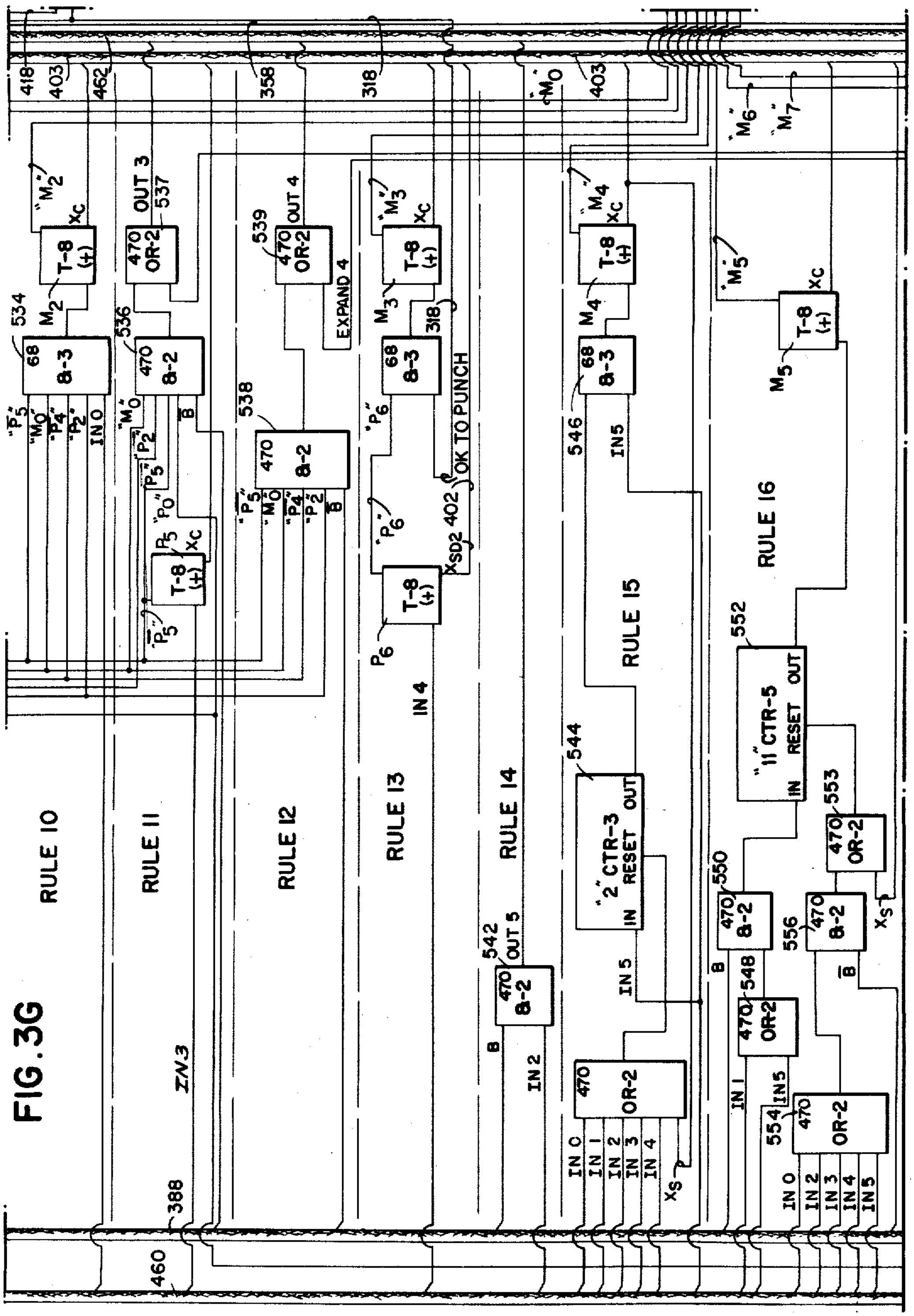
Figure 3H:
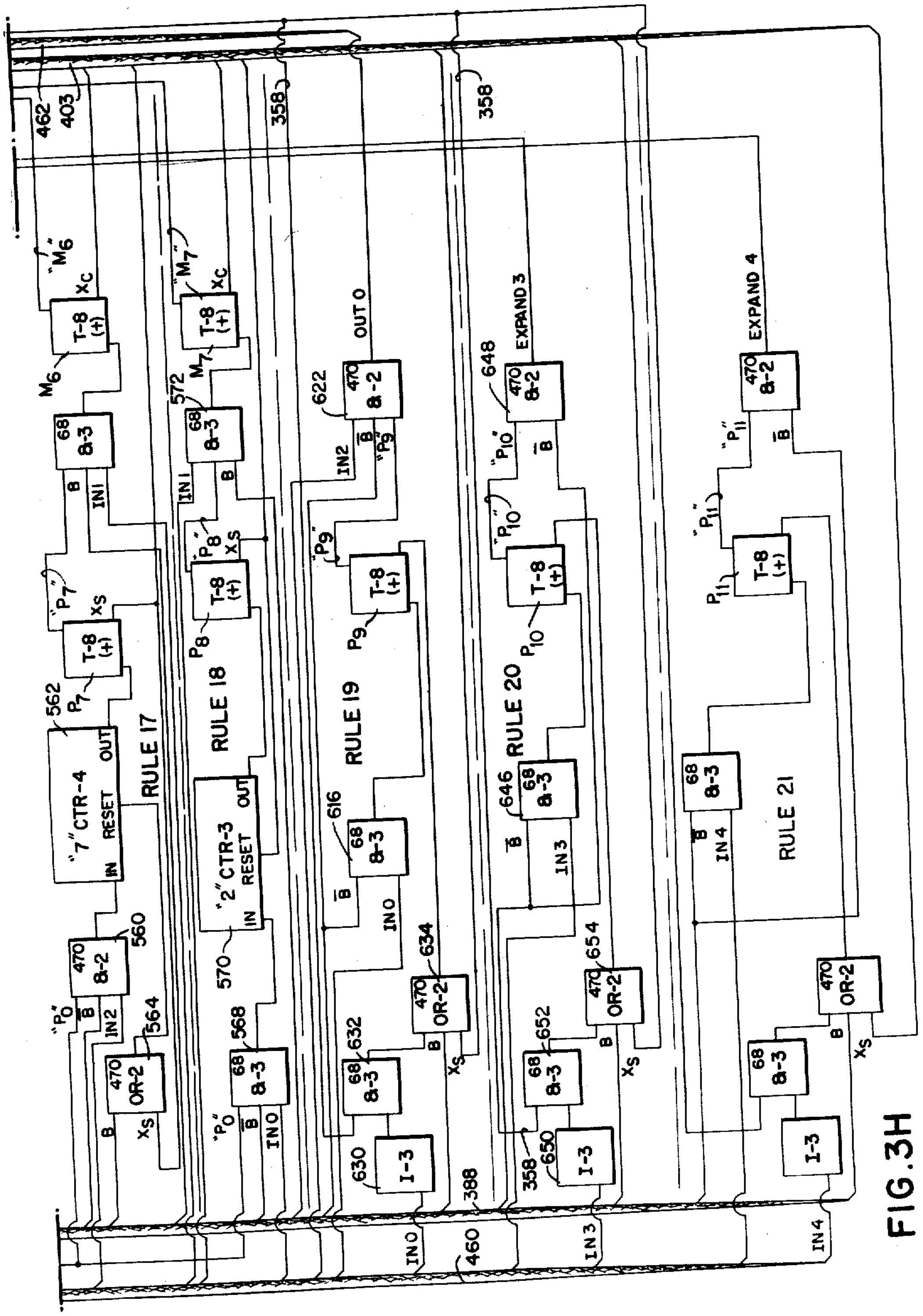

The Shape Rule Circuits are shown in Figs. 3F, 3G and 3H. The inputs to the Shape Rule Circuits are the Black-White Cable 388 and the Shape Rule Circuit Input Cable 460. The outputs from the Shape Rule Circuits are the Shape Rule Circuits Output Cable 462 and the inputs to Memory triggers labeled $M_0$ to $M_6$ inclusive. The Shape Rule Circuits recognize the black-white determination and the coded number in the sixteenth stage of the marking register, and operate to assign the arbitrary coded numbers previously described to the first stage of the marking register.

For ease of description, the Shape Rule Circuits have been divided into 21 labeled Rule Circuits, separated from each other in Figs. 3F, 3G and 3H by dashed lines.

At the beginning of operation it will be assumed that the marking register contains a coded zero at each digit position, and all the triggers in the Shape Rule Circuits are reset Off. As previously described, at the start of the scan of a character, all white bits are assigned the arbitrary coded number 0. This is accomplished automatically by simply not providing for anything to be written into the first stage of the marking register and so the coded 0 which is present therein after the register shift pulse, remains there.

If at any time a coded zero is read from the marking register and the scanned bit is black, then a coded one will be written into the register in place of the coded zero as previously described in relation to Fig. 14, columns *c* and *d*. This is accomplished by the Rule 1 circuit of Fig. 3F which shows the In 0 lead from the Rule Circuit Input Cable 460 (representative of a coded zero in the sixteenth stage of the register) connected via an Or circuit 514 to one input of an And circuit 516, the other input of which is connected to a black lead B from the Black-White cable 388. The output of And circuit 516 is the Out 1 lead connected to the Shape Rule Circuit Output Cable 462. Thus, a coded zero and black input produce a coded 1 output to be fed via the Encode circuit 464 to the first stage of the marking register. The Rule 1 circuit is continually operative as the machine progresses across a character, with the result that for each vertical bit position of a character at which black is detected with a concurrent coded zero in the marking register, a coded one will be written into the marking register.

If a black is detected and a coded one is in the sixteenth stage of the register, no output appears on any of the leads of the Shape Rule Output Cable 462. Lead 508 (Fig. 3E) is thus positive, as previously described, and the coded one from the sixteenth stage of the register is transmitted through And circuit 510 and the Encode circuits to the first stage of the marking register. This permits the machine to make note of the vertical bit position (horizontal level) in which some black was seen. This record of the vertical bit position of black areas is retained in the marking register throughout most of the character.

If a coded one is read from the sixteenth stage of the marking register, including a previous presence of black at that horizontal level, and a white bit is detected, a coded two is written into the marking register to indicate the change back to white. This is accomplished by the Rule 3 circuit which shows the In 1 lead and the white lead $\bar{B}$ connected to an And circuit 518, the output of which is connected to an Out 2 lead of the Shape Rule Circuit 462. A positive potential on the black lead B and the In 1 lead causes a positive potential on the Out 2 lead which in turn causes a coded two to be written into the marking register.

The detection of further white on a horizontal level after the coded two is assigned to the register, will cause a coded two to be rewritten in the register because no output appears on any of the Out leads of the Shape Rule Output Cable 462. The read 2 output is therefore transmitted through And circuit 511 (Fig. 3E), and the Encode circuits 464 to the first stage of the marking register.

To detect the triple intersection basic shape, rule circuits 4 to 9 inclusive (Fig. 3F) are utilized. In order to reliably detect this condition, it is necessary to recognize a triple crossing of black (in equal vertical registration), two vertical scans in succession.

Three intersections of black implies that white areas are present between the black crossings. Five primer triggers $P_0$ to $P_4$ inclusive, in Rule Circuits 5 to 9 inclusive, are provided, each of which is reset at each end of vertical scan by the reset lead $X_s$ connected to the respective right-hand inputs. The conditions to be met within the time of the vertical scan are that there is a black area followed in succession by a white area, black area, white area and black area, in that order. Furthermore, while each area may only be one bit high, there must have been in the previous vertical scan a bit of similar color in horizontal alignment with the bit being looked at. Thus, effectively, the test for triple intersection is two horizontally aligned black bits followed in succession by two horizontally aligned adjacent white bits, black bits, white bits and black bits, in that order. Primer trigger $P_0$ will go On when the first black area is sensed and primer trigger $P_1$ will go On if trigger $P_0$ is On and the first white area is sensed. Primer trigger $P_2$ will be turned On if trigger $P_1$ and the second black area is sensed. Trigger $P_3$ is turned On if trigger $P_2$ and the second white area is sensed. Then, primer trigger $P_4$ is turned On if $P_3$ is On and the third black area is sensed. The turning On of trigger $P_4$ implies that all the conditions are met and a triple intersection has been detected. Therefore, when primer trigger $P_4$ is placed in the On condition, it in turn places a Memory trigger $M_0$ (Fig. 3F) in the On condition. Since Memory trigger $M_0$ and all other Memory triggers are not reset until the end of character by the lead $X_c$ applied to their right-hand input terminals, the presence of the triple intersection basic shape is retained until the end of character.

The means for turning On the primer triggers $P_0$ to $P_4$ are shown in Rule Circuits 4 to 9. In Rule Circuit 4, the In 1 lead is "and-ed" with a black lead B at And circuit 520, the output of which is fed to the left-hand input of a primer trigger $P_0$. Thus, if the scanned bit is black, and if the digit read from the register is a coded 1 (i.e., lead In 1 goes positive, indicating that the bit was black on the previous scan) the output of And circuit 520 goes positive turning on trigger $P_0$, and causing its output lead "$P_0$" to go positive. The first white area above the first black crossing is noted by the presence of the On condition of trigger $P_0$ (indicating a previous black in that vertical scan), the presence of a zero or two in the read out triggers (indicating the previous bit at that horizontal level was white), and the presence of white. These conditions are met by Rule Circuit 5 wherein the leads In 0 and In 2 from the Rule Circuit Input Cable 460 are connected to the inputs of an Or circuit 522, the output lead 523 of which is "and-ed" with lead "$P_0$" and white lead $\bar{B}$ from the black-white cable 388. When all three input leads to And circuit 524 are positive, its output goes positive and applies a pulse to the left-hand input of primer trigger $P_1$ turning it On and making its output lead "$P_1$" positive. The turning On of trigger $P_1$ denotes the first black intersection with its following white space, and now the machine is ready to accept a second black intersection. Rule Circuit 6 contains an And circuit 526, the inputs of which are output lead "$P_1$," black lead B and lead In 1 from Rule Circuit Input lead 460. A coincidence of positive voltages on the three inputs of And circuit 526 produces a positive output which is applied to the right-hand input of primer trigger $P_2$, to turn it On and cause its lead "$P_2$" to go positive. Rule Circuit 7 indicates the second white intersection and comprises an And circuit 528, the inputs of which are connected to lead "$P_2$," white lead B, and the output lead 523 of Or circuit 522, the inputs of which were lead In 0 and In 2 from the Rule Circuit Input Cable 460. When all three inputs to And circuit 528 are positive, it goes positive turning On primer trigger $P_3$ causing output lead "$P_3$" of trigger $P_3$ to go positive. Finally, in Rule Circuit 8, output lead "$P_3$" is "and-ed" with black lead B, and lead In 1 from Rule Circuit Input Cable 460 at an And circuit 530. A coincidence of positive voltages on the three inputs produce a positive output voltage which is applied to the left-hand input of primer trigger $P_4$ to turn it On and cause its lead "$P_4$" to go positive, and lead "$\bar{P}_4$" to go negative. Lead "$P_4$" is connected to the left-hand input of Memory trigger $M_0$ and so the positive shift on lead "$P_4$" turns On Memory trigger $M_0$ which, as previously described, remains On until the end of character.

It is now possible to detect the presence of a lower and upper left inlet basic shape. The lower left inlet basic shape is recognized by Rule Circuit 9. The conditions necessary for a lower left inlet basic shape are that on the vertical scan after the triple intersection basic shape is detected, a coded zero be present in the lower of the two white areas between the three black intercepts, because if a coded two were present, it would indicate black to the left and therefore no lower left inlet.

When all the conditions for a lower left inlet set forth are met, a Memory trigger $M_1$ will be turned On and its output lead "$M_1$" will go positive. Since all Memory triggers are reset at the end of character by reset lead $X_c$, the presence of a lower left inlet is stored until then. Connected to the left-hand input of Memory trigger $M_1$, is the output lead of an And circuit 532 which has five input leads, all of which are positive when all the conditions for a lower left inlet are met. The five leads are leads "$P_0$," "$\bar{P}_2$," In 0, "$M_0$" and "$\bar{P}_5$." The On condition of Memory trigger $M_0$ signifies the presence of the triple intersection basic shape and is detected by a positive potential on lead "$M_0$." The fact that it is the lower of the two white areas that is being looked at, is detected by an indication that the first black intercept has been passed, turning On primer trigger $P_0$, but that the second black intercept has not been reached and therefore, primer trigger $P_2$ is still Off. When these two conditions are met, lead "$P_0$" is positive, indicating the On condition of primer trigger $P_0$, and lead "$\bar{P}_2$" is positive indicating the Off condition of primer trigger $P_2$. The fourth input lead to And circuit 532 is lead In 0 from Rule Circuit Input Cable 460 which is positive if a coded zero is in the register read out triggers 438, 440 and 442. The fifth input lead "$\bar{P}_5$" is positive until the second vertical scan after the detection of the triple intersection, when it goes negative in a manner to be described hereinafter to insure that the determination of the presence of the lower left inlet is made only in the first vertical scan after the detection of the triple intercept basic shape.

In the same vertical scan after the detection of the triple intercept, the upper white area is tested for the presence of coded zeros which indicates an upper left inlet. Rule Circuit 10, which detects the upper left inlet, comprises a Memory trigger $M_2$ which is turned On by an And circuit 534 when an upper left inlet is present. The operation of Rule Circuit 19 is similar to the operation of Rule Circuit 9 except that the five inputs to And circuit 534 contain leads "$P_2$" and "$\bar{P}_4$" rather than the leads "$P_0$" and "$\bar{P}_2$." Thus, a test of the upper white region is obtained because a positive potential on the lead "$P_2$" indicates the primer trigger $P_2$ is On and the second black intercept has been passed, while the positive potential on the lead "$\bar{P}_4$" indicates that primer trigger $P_4$ is Off and the third black intercept has not yet been reached.

In order to be able to detect the presence of lower and upper right inlets, the lower white area is assigned the coded number 3 and the upper white area is assigned the coded number 4 during the first scan after the detection of triple intersection. As previously indicated, the coded 3's or 4's are recirculated, until some change takes place at the respective level. Thus, afterwards, if a black is sensed when a coded 3 or 4 is in the register read out triggers, a coded 1 is written into the register. Since the coded 3's and 4's are only assigned during the one vertical scan, if at the end of character, all the coded 3's have been replaced, it means that the lower white area is not open to the right. If, at the end of character all the coded 4's have been replaced, it indicates the absence of an upper right inlet. Thus, a coded 3 in the marking register at the end of character implies the presence of a lower right inlet, and a coded 4 implies an upper right inlet.

The circuit for writing the coded 3's in the marking register is Rule Circuit 11 which comprises an And circuit 536, the output of which is connected via an Or circuit 537 to the Out 3 lead of the Rule Circuits Cable 460. The inputs of And circuit 536 are leads "$\bar{P}_5$," "$M_0$," "$P_0$," "$\bar{P}_2$," and $\bar{B}$. The triple intersection is indicated by a positive lead "$M_0$," the lower white area is indicated by a positive lead "$P_0$" and "$\bar{P}_2$," and positive on lead $\bar{B}$ indicates the sensing of a white bit. Once again lead "$\bar{P}_5$" is included to insure that there is no output after the vertical scan following the detection of the triple intercept basic shape. Lead "$\bar{P}_5$" is connected from the left-hand output of a primer trigger $P_5$ which is turned On by an In 3 input from the Rule Circuit Input Cable 460 to make lead "$\bar{P}_5$" negative. Since the coded 3's are written into the register during the vertical scan following the detection of the triple intercept, it is not possible for the coded 3's to appear on the In 3 input lead of the Rule Circuit Input Cable until the next vertical scan. The negative shift on lead "$\bar{P}_5$" is used where it is desired to prevent some occurrence in any scan after the first scan following the detection of triple intercept, as previously mentioned.

Rule Circuit 12 writes coded 4's in the register by providing an And circuit 538, the output of which is connected via an Or circuit 539 to the Out 4 lead of the shape rule circuit cable 462, and the five inputs of which are leads "$\bar{P}_5$," "$M_0$," "$P_2$," "$\bar{P}_4$," and $\bar{B}$. The input leads to And circuit 538 include leads "$P_2$" and "$\bar{P}_4$" instead of the leads "$P_0$" and "$\bar{P}_2$" which are connected to And circuit 526. This recognizes the upper white area for reasons previously described.

The writing of 1's to replace the 3's and 4's in the marking register is accomplished by Rule Circuit 2 (Fig. 3F). Rule Circuit 2 indicates leads In 3 and In 4 being fed to Rule Circuit 1 where they are connected to the inputs of Or circuit 514, the output of which is "and-ed" with black lead B at And circuit 516. The output of And circuit 516 is the Out 1 lead of the Rule Circuit Output Cable 452 which causes a coded one to be written into the marking register to replace the coded 3 and coded 4 when black bits are sensed.

A circuit to detect an upper right inlet basic shape by the presence of coded fours in the marking register is provided in the form of Rule Circuit 13. As previously stated, it is not necessary in the preferred embodiment of the invention to detect the presence of a lower right inlet in the marking register but it can be used as a check in certain characters. To more fully understand the operation of Rule Circuit 13, the timing chart of Figs. 18A to 18I should be referred to. In the example used in Figs. 18A to 18I, it has been assumed that the eighteenth vertical scan (Figs. 18E and 18F) is an all white scan. As previously described in conjunction with Fig. 3C, if there is no black bit during a vertical scan, trigger 404 remains On and permits the reset pulse $X_{sd1}$ to pass through And circuit 406 to turn On the end of character trigger 408 which provides a positive OK to Punch pulse (Fig. 18F) on lead 318. In Rule Circuit 13, a primer trigger $P_6$ is turned On by the positive pulse on lead In 4 causing output lead "$P_6$" to go positive and condition an And circuit 540. At the end of each vertical scan the primer trigger $P_6$ is turned Off by a pulse on reset lead $X_{sd2}$. At the end of the vertical scan in which no black bit is detected, the OK to Punch pulse is fed via lead 318 to the other input of And circuit 546, the output of which goes positive to turn On Memory trigger $M_3$. The Memory trigger $M_3$ is thus turned On by the same OK to Punch pulse which goes to energize relay $R_{10}$ and start the punching operation. Relay $R_{10}$ is a slow acting relay to insure that the Memory trigger $M_3$ is set On to indicate an upper right inlet before Relay $R_{10-1}$ contacts are closed to start the punch operation. The reset pulse $X_{sd2}$ which comes after the OK to Punch pulse (Fig. 18F) then resets the primer trigger $P_6$ of Rule Circuit 13.

Rule Circuits 14 and 15 operate to detect the presence of a lake basic shape. The lake is recognized by the fact that a white area has black horizontally to the left and to the right. The fact that a white area is bounded horizontally by black does not indicate a lake in the strictest sense, because there is no assurance that this white area is bounded by black at the top and bottom. From the Christmas tree network previously described, it can be recalled that the presence of lake basic shape is only important in the detection of characters without the triple intersection basic shape, i.e., 0, 1, non-serifed 4, pica 4 and 7. As for these characters, the 0 and both fours have a white area bounded to the left and right by black, while the 1 and 7 do not. Thus, the possibility that the character is a 1 or a 7 is eliminated if there is a presence of lake basic shape. The fact that the lake in the 0 is a tall true lake and that the fours do not have tall true lakes are determined by the tall true lake basic shape.

As previously described, the presence of a coded 2 in the marking register means that a white bit was sensed that had a black bit to the left of it. Now if a coded 2 is in the marking register and a black is sensed, a coded five will be written into the register. Thus, a coded five indicates a horizontal position which was black then white and then black again. Rule Circuit 14 writes the coded five by having black lead B "and-ed" with lead In 2 at an And circuit 542, the output of which is a lead Out 5 of the Rule Circuit Output Cable 462. A single coded 5 in the marking register is not a reliable indication of a lake and to be sure of a lake, Rule Circuit 15 operates to indicate a lake by turning On Memory trigger $M_4$ only when two fives exist in the marking register, one immediately after the other. In Rule Circuit 15, the lead In 5 is connected to terminal "In" of a "2" counter 544, the "Out" terminal of which is connected to the input of an And circuit 546. The other input of And circuit 546 is connected to the In 5 lead and its output is connected to the left-hand input of Memory trigger $M_4$. The first coded five on lead In 5 will turn On counter 544, the output of which will then go positive. Thus, there will be only one positive potential at the inputs of And circuit 546, and Memory trigger $M_4$ will not be turned On. If lead In 5 goes positive a second time, the counter 546 will go positive and this in conjunction with the positive potential on lead In 5 produces an output from And circuit 546 to turn On Memory trigger $M_4$. To insure that the two coded fives occur in succession, "2" counter 544 is reset if a coded number other than a coded five follows the first coded five. This is done by connecting all the leads, In 0 to In 4 inclusive, of the Rule Circuit Input Cable 460, except lead In 5, to the input of an Or circuit 548, the output of which is connected to the reset lead of "2" counter 544. Any one of the leads other than In 5 going positive will then reset "2" counter 544. To insure that a five at the end of one vertical scan and at the beginning of the next one does not show up as a lake, the "2" counter 544 is also reset at the end of each vertical scan by the lead $X_s$ fed via the Or circuit 548 to the reset lead of counter 544.

To recognize the presence of the long vertical black line basic shape which is used to distinguish a serifed 4 from a 9, and to distinguish a 1 from a 7, a Memory trigger $M_5$ in Rule Circuit 16 is turned On. To reliably detect the long vertical black line basic shape, Rule Circuit 16 is used to effectively measure the height of the vertical black line in two successive scans. This is done by counting the number of consecutive occurrences of coded 1's in the register coincident with black from the scanner. Eleven consecutive double black bits have been found to be optimum for distinguishing this basic shape when the characters are nominally twelve counts high.

To count the coded 1's in the register coincident with black from the scanner, the lead In 1 is fed via an Or circuit 548 to one input of an And circuit 550, the other input of which is the black lead B, and the output of which is connected to the lead "In" of an "11" counter 552. Each time black is sensed, black lead B goes positive, and if there is a coded one in the register, the output of And circuit 550 goes positive to step the "11" counter. The terminal "Out" of "11" counter 552 is connected to a Memory trigger $M_5$ which is turned On by the positive shift of the "11" counter 552 after eleven counts. In a serifed 4, the part of the long vertical black line to the right of the lake basic shape, will be assigned the coded number 5. Therefore, a black bit concurrent with a coded five should also step the "11" counter 552. This is done by bringing the lead In 5 to the input of the Or circuit 548 along with the lead In 1, so that a coded five input causes the same result as a coded one input. If there is no coded one input at the same time there is a white bit, the "11" counter 552 is reset to zero. The "11" counter is also reset if the end of scan is reached before the count of eleven. These two results are accomplished by bringing all the Rule Circuit Input Cable leads except lead In 1 into an Or circuit 544, the output of which is "and-ed" with the white $\bar{B}$ at an And circuit 556. The output of And circuit 552 is connected to the input of an Or circuit 558, the other input of which is the reset lead $X_s$ and the output of which is connected to the "Reset" terminal of "11" counter 552.

In order to distinguish a 0 from a non-serifed 4 and pica 4, the presence of the tall true lake basic shape must be detected. This basic shape requires that there be two horizontally adjacent white bits, seven counts high, bounded above and below, and to the left by black. The fact that the white region must be seven counts high eliminates the non-serifed 4, and the added fact that it must be bounded above by black eliminate the pica 4. Before the tall true lake basic shape is effective in the recognition process, the presence of lake basic shape must be determined. Since the presence of lake requires a white region bounded to the right and left by black, and since the tall true lake basic shape requires the white region to be bounded above and below by black and to be seven counts high, the detection of both basic shapes indicates a tall true lake as found in a 0.

Rule Circuit 17 (Fig. 3H) is provided to detect the tall true lake basic shape. Rule Circuit 17 shows an And circuit 560, the output of which is connected to the "In" terminal of a "7" counter 562. The inputs of And circuit are connected to leads "$P_0$," $\bar{B}$, and In 2. Lead "$P_0$" goes positive as soon as a black is detected in a vertical scan, and therefore a positive lead "$P_0$" indicates that there is black at the bottom of the white area being detected. The positive In 2 lead indicates a white bit having black to the left and the positive lead In 2 in conjunction with the positive white lead $\bar{B}$ indicates a pair of horizontally adjacent white bits. Each time white lead B goes positive, when the other two leads In 2 and "$P_0$" are positive, a positive shift occurs at the output of And circuit 560 to step the "7" counter 562. After seven consecutive shifts, the And circuit 560 terminal "Out" will go positive and turn On a primer trigger $P_7$, making its output lead "$P_7$" positive. To insure that the count of seven white bits is consecutive, the seven counter is reset if black is sensed or the end of vertical scan arrives by the black lead B for the reset lead $X_s$ connected via an Or circuit 564 to the "Reset" terminal of the "7" counter 562. Lead "$P_7$" is connected to the input of an And circuit 566, the other two inputs of which are connected to black lead B and lead In 1 from the Rule Circuit Input Cable. The leads B and In 1 both go positive when black is sensed at the same time as a coded one appears in the marking register output, which signifies two horizontally aligned adjacent black bits and implies black on top of the seven count white region. When all three inputs to the And circuit 566 are positive, its output, which is connected to a Memory trigger $M_6$, goes positive and turns On trigger $M_6$ thereby signifying a tall true lake basic shape.

The last of the basic shapes to be considered is the small left inlet which is used to distinguish a seven from a smudge and is detected by Rule Circuit 18. A small left inlet is defined as an inlet at least two white bits high and open to the left. Once again, for reliability, it is desirable that the white bits be horizontally aligned adjacent bits. Rule Circuit 18 shows lead "$P_0$," $\bar{B}$, and In 0 connected to the input of an And circuit 568, the output of which is connected to the "In" terminal of a "2" counter 570. Lead "$P_0$" going positive indicates a black bit below, and lead In 0 going positive indicates a white bit not bounded to the left by black. The appearance of each positive shift on white lead B, when the other two leads In 0 and "$P_0$" are positive, causes a positive shift at the output of And circuit 568 which steps the "2" counter 570. After two positive shifts, terminal "Out" of the "2" counter 570 goes positive, and this positive shift is applied to the left-hand input of a primer trigger $P_8$ to turn it On and cause the output lead "$P_8$" to go positive. To insure that the white is bounded by two horizontally adjacent black bits on top, lead "$P_8$" is connected to the input of And circuit 572, the other two inputs of which are the leads B and In 1, both of which are only positive when there are two horizontally adjacent black bits. When all three input leads are positive, the output of And circuit 572, which is connected to the left-hand input of Memory trigger $M_6$, goes positive to turn On the trigger $M_6$ and indicates a small left inlet.

The remaining Rule Circuits are used for the process of expanding, which will be more fully described presently.

CHRISTMAS TREE SHAPE DECODER

The manner in which the eight Memory triggers $M_0$ to $M_7$ are turned On to signify the eight respective basic shapes has been described. There will now be described the manner in which the states of the Memory triggers control the Christmas tree network of Fig. 3I. Each Memory trigger $M_0$ through $M_7$ has its right-hand output lead "$M_0$" through "$M_7$" respectively connected to the inputs of relay drivers 574 through 581 respectively (Fig. 3I), the outputs of which are connected via relays $R_0$ through $R_7$ respectively to a source of +150 volts. Thus the turning On of the Memory triggers $M_0$ through $M_7$ causes its respective lead "$M_0$" through "$M_7$" to go positive and cause the respective relay driver 574 through 581 to conduct through its respective relay $R_0$ through $R_7$ causing the energization thereof. The energizing of relays $R_0$ through $R_7$ causes the closing of the respective contacts to set up a path of the type discussed hereinbefore in conjunction with Fig. 4, i.e., the closing of the contacts of Relays $R_0$ through $R_7$ are same as the yes condition of the blocks of Fig. 4. At the end of character, an OK to Punch signal on lead 318 energizes relay $R_{10}$, as previously described, and causes a path to be completed from the punch line 414 through closed contacts $R_{10-1}$, through the contacts of Relay $R_0$ through $R_7$ to one of the terminals 0 to 9 of the punch 416, to cause the punch to punch and/or print the character recognized. It is obvious that devices other than a punch may be utilized as an output unit.

Incidentally, to avoid error, especially in the case of the upper right inlet relay $R_3$, the relay $R_{10}$ is made slower acting than the relays $R_0$ to $R_7$, to insure that the latter operate their contacts before the contacts $R_{10-1}$ close to complete the circuit to the punch.

EXAMPLES AND EXPANSION CIRCUITS

Figs. 8 through 12 show examples of the recognition of ten different imperfect numerical characters as performed by the machine. Fig. 8 represents the numerical character 1 followed by the numerical character 2. The character 1 is shown in a square 584, each cross making up the character 1 in the square 584 being representative of a black bit sensed by the scanner at the different locations of the scans. The absence of a cross at a particular location indicates a white bit thereat. A square 586 contains the indications of each coded number written into the marking register upon the scanning of the black-white indications of square 584. For example, on the first vertical scan of the character 1, a black bit is detected at horizontal positions 3 and 13 in square 584, and a coded 1 signifying this fact is shown in square 586 at horizontal positions 3 and 13. Since the character 1 in this particular example is seventeen vertical scans wide, i.e., no black bits appear during the eighteenth vertical scan, an end of character is indicated after the eighteenth scan. At the end of this eighteenth vertical scan, the OK to Punch signal starts the punch, but one more cycle of the marking register is permitted in order to reset it. This resetting takes place automatically during the next or nineteenth scan by shifting the marking register without writing anything into it, as previously described. After the nineteenth vertical scan, the marking register is not stepped again until the punching is over, at which time the punch will send a punch done signal which may be created in a punch of the type shown in Gardinor, 2,647,581, by the closing of contacts by a cam therein to complete a circuit to a positive potential. This punch done signal starts the twentieth vertical scan by turning Off the End of Character trigger 408 (Fig. 3C) which ends the positive OK to Punch signal on lead 318. The OK to Punch signal going negative, causes an output from And circuit 590 to turn On single shot multivibrator 392 and create the reset pulse $X_s$ which in turn creates reset pulse $X_{sd1}$ which is applied via inverter 428 to turn Off the Punch trigger 426 and allow further multivibrator pulses to pass through Punch switch 154 and start the twentieth vertical scan as illustrated in Fig. 18H.

In Fig. 8, the twentieth and twenty-first vertical scans are all white, but during the twenty-second vertical scan, black bits of a numerical character two are detected and the vertical scans continue until at the end of the thirty-second vertical scan, the typewriter must be spaced in a manner previously described. The horizontal carry on lead 224 causes single shot multivibrator 238 to go on for one half second during which time the carriage is spaced. None of the circuits are effected during the time for carriage space because the marking register is not shifted and all Memory triggers and triggers in the Rule Circuits remain in status quo. Single shot multivibrator 238 goes negative to end the half second space time and start thirty-two more vertical scans. At the end of eight more vertical scans, the numerical character 2 of Fig. 8 is recognized.

Figs. 9, 10, 11 and 12 are arranged in the same manner as Fig. 8 and show the black-white indications and marking a register coded numbers for eight other numerical characters.

As a further illustration of the operation of the Rule Circuits and the marking register, the numerical characters of Fig. 8 through Fig. 12 will be studied. The non-triple intercept character 0, 1, 7 and 4, in that order, will be described first. The character 0 of Fig. 12 is sensed as a zero because, as previously described, it has a presence of lake, a tall true lake, and no triple crossover. The tall true lake basic shape is sensed first when the presence of seven coded twos 583 and the horizontally aligned seven white bits 590 in the next vertical scan cause the Memory trigger $M_6$ to turn On. The presence of the lake basic shape is detected by the two successive coded fives 592 which are sensed in the vertical scan after the vertical scan in which they are written into the marking register. It can be observed that coded fives 594 appear in previous vertical scans but each of the coded fives 594 is followed by a coded one which acts to reset the counter 544 of Rule Circuit 15 (Fig. 3G) to temporarily end the possibility of a presence of lake indication. At the end of character, with no triple intercept indication, and the presence of lake and tall true lake indication, a 0 is punched in the punch unit.

The character 1 of Fig. 8 is sensed as a 1 because it has a long vertical black line basic shape and no triple crossover or presence of lake basic shape. The long vertical black line basic shape is sensed when the presence of eleven coded ones 596 in the eighth scan and the horizontally aligned eleven black bits 598 in the ninth vertical scan cause the Memory trigger $M_5$ to turn On. Due to the imperfection in the character, coded fives 600 are sensed but since it takes two vertically aligned adjacent fives to signify a presence of lake, the presence of lake Memory trigger $M_4$ is not turned On. At the end of character, the absence of the triple intersection and lake basic shapes, and the presence of the long vertical black line basic shape causes a 1 to be punched in the output unit.

The character 7 of Fig. 11 is recognized by the absence of all indications except a small left inlet basic shape. This basic shape is detected by the combination of the black bit 602 which turns on primer trigger $P_0$, followed by the two white bits 604 and their horizontally aligned adjacent coded zero 606, followed in turn by black bit 608 and its horizontally adjacent coded one 610. It can be observed that the character 7 of Fig. 11 has a serif 612 which is three bits high. This serif 612 could cause a lake indication because the coded twos assigned in the marking register to the right of this serif would become coded fives when the black portion 614 of the character 7 is reached. To avoid this and also to prevent other imperfections in the characters from giving wrong indications, Rule Circuits 19 through 21 are provided to perform expansion.

Rule Circuit 19 operates to expand coded zeros upward to replace coded twos in the register, i.e., if a white bit is sensed concurrently with a coded 0 in the register, immediately followed by a second white bit with a coded 2 in the marking register, the second white bit is assigned the coded number 0 instead of coded number 2. This is accomplished by an And circuit 616 (Fig. 3H) having leads $\bar{B}$ and In 0 as the inputs, and having an output lead connected to the left-hand input of a primer trigger $P_9$. When a write bit such as bit 618 (Fig. 11) is sensed concurrently with a coded zero such as coded zero 620, the leads $\bar{B}$ and In 0 are both positive and the output lead of And circuit 616 goes positive to turn On primer trigger $P_9$, and causes its output lead "$P_9$" to go positive. Lead "$P_9$" is connected to the input of an And circuit 622, the other inputs of which are lead B and In 2 and the output of which is the lead Out 0 of the Rule Circuit Output Cable 462. Thus, when primer trigger $P_9$ is On and a second white bit such as white bit 624 (Fig. 11) is sensed concurrently with a coded two such as coded two 626, a coded zero such as coded zero 628 is written into the marking register to replace coded two 626. To insure that the second white and the coded two from the register immediately follow the first white bit and the coded zero, primer trigger $P_9$ is reset each time a black bit or any coded number other than a zero appears. This is done by having lead In 0 connected via an inverter 630 to one input of an And circuit 632, the other input of which is the register read out trigger reset lead 358, and the output of which is fed through an Or circuit 634 to the right-hand input of the primer trigger $P_9$. The output of the inverter 630 is positive at all times except if there is a positive potential on lead In 0. Thus, if there is no coded zero, the register read out trigger reset pulse on lead 358 will reset the primer trigger $P_9$. The register read out trigger pulse is used to insure that the pulse on lead $\bar{B}$ is applied to And circuit 622 to cause the writing of the coded zero before trigger $P_9$ is reset (see Figs. 18A to 18I), since the positive potential on lead "$P_9$" is one of the prerequisites for writing the zero. The trigger $P_9$ is also reset at the end of vertical scan by the reset lead $X_8$ and by the presence of black on lead B, both of which are connected to Or circuit 634. In Fig. 11, the expansion circuit also operates to replace the coded twos 636 with coded zeros 638. In this manner the possibility of the coded twos caused by the serif turning into coded fives and operating the presence of lake Memory trigger is avoided.

In the non-serifed 4 of Fig. 9, the two coded fives 640 indicate the presence of a lake. At the end of character, with no triple intersection and no tall true lake indication, the presence of lake basic shape will cause a four to be punched in the Punch unit.

The description of triple intersection characters, including the sensing of the triple intersection, the testing of the left inlets for zeros, the writing of coded threes and fours, and the testing of right inlets for coded threes and fours, were hereinbefore described in conjunction with the description of Figs. 14, 15 and 16. Some of the details not covered at that time will now be described. In the numerical character 2 of Fig. 8, the triple intersection is detected in column 29 and the coded threes and fours are assigned in column 30. In column 31, a coded three 642 is assigned in the second vertical scan after the detection of triple intersection. This exception to the previously described rule is possible, because of the nature of the Rule Circuit 11, and in fact acts to assign more coded threes to the lower white region and lesses the chances of error caused by the coded threes not moving out to the right in the detection of lower right inlet. Trigger $P_5$ of Rule Circuit 11 is not turned On to cause its lead "$\bar{P}_5$" to go negative until a coded 3 is sensed, and since lead "$\bar{P}_5$" in a positive condition is one of the prerequisites for writing a coded 3, it is possible for coded threes to be assigned to white bits in the second vertical scan after the detection of the triple intersection basic shape, until the horizontal level is reached in which a coded three has been assigned in the previous vertical scan.

In the numerical character 2 of Fig. 8, it can be observed that the black line 644 would appear as having closed the lower right inlet if it were not for the fact that the coded threes are expanded upward. Rule Circuit 20 operates to expand coded threes upward by having lead $\bar{B}$ and In 3 connected to the input of an And circuit 646, the output of which is connected to the right-hand input of a primer trigger $P_{10}$. Lead "$P_{10}$" of trigger $P_{10}$ is connected to an input of And circuit 648, the other inputs of which is lead $\bar{B}$ and the output of which is a lead Expand 3 which is connected to the input of OR circuit 537 of Rule Circuit 11. Thus, if there is a three in the marking register, and a white bit is sensed, And circuit 646 is conditioned to permit the register read out trigger reset pulse on lead 358 to turn On primer trigger $P_{10}$. If the next bit is white, the positive lead "$P_{10}$" permits the positive shift of lead $\bar{B}$ to pass through the Or circuit 537 of Rule Circuit 11 to cause the wiring of a coded three in the marking register. To insure that the second white bit immediately follows the first white bit and the coded zero, primer trigger $P_{10}$ is reset each time a black bit or any coded number other than a zero appears. To accomplish this, a reset circuit consists of an inverter 650, an And circuit 652, and an Or circuit 654 is connected in exactly the same manner as the reset circuit of Rule 19 except that inverter 650 has its input connected to lead In 3. As an example of the expansion of coded threes, the concurrence of a coded three 656 (Fig. 8) and a white bit 658 followed by the white bit 660 causes the coded three 662 to be written into the marking register. Coded threes 664 have also expanded upward. There are now four coded threes in the marking register at the end of character, and so the indication of lower right inlet is preserved.

Fig. 10 indicates coded fours 666 which have expanded upward. This is accomplished by Rule Circuit 21 which operates similar to Rule Circuit 20 but has a lead In 4 input instead of a lead In 3 and the output of the lead Expand 4 which is connected to Or circuit 539 of Rule Circuit 12. Due to the similarity between Rule Circuits 20 and 21, no further description is believed necessary.

There has, therefore, been described in detail, novel means for recognizing characters printed on a document. It is to be understood that the principles of this invention may also be employed in analyzing other intelligence patterns such as, for example, sound wave characteristics where the patterns of sound might be put in memory and scanned therefrom, or even invisible magnetic electrostatic or chemical representations of characters. It is therefore apparent that the memory device for storing the coded representations may be a device other than a marking register, i.e., one in which the result of each bit is stored until the end of character. The scanning device would also not have to be a spot of light and could scan the intelligence broadside.

While there have been shown and described and pointed out the fundamental features of the invention as applied to a preferred embodiment, it will be understood that various omissions and substitutions and changes in the form and details of the device illustrated in its operation may be made by those skilled in the art without departing from the spirit of the invention. It is the intention, therefore, to be limited only as indicated by the scope of the following claims.

What is claimed is:

1. A device for interpreting an intelligence pattern consisting of individual entities where each entity contains bounded regions of different types, comprising means for recognizing the individual entities of said intelligence pattern, means for detecting the presence of the different types of bounded regions in each of said entities, means for storing indications of the different types of bounded regions detected by said detecting means in each of said entities, and means under control of the storing means for differentiating between said entities by the indications of the types of bounded regions stored in the storing means.

2. A device for interpreting an intelligence pattern consisting of individual entities where each entity contains inlets of different types, comprising means for recognizing the individual entities of said intelligence pattern, means for detecting the presence of inlets in each of said entities, means for determining the type of each inlet in each of said entities, means under control of the detecting and determining means for storing indications of the different types of inlets, and means under control of the storing means for differentiating between said entities by the indication of the types of inlets stored in storing means.

3. A device for interpreting an intelligence pattern consisting of individual entities where each entity contains varied positioned inlets, comprising means for recognizing the individual entities of said intellgence pattern, means for detectng the presence of inlets in each of said entities, means for determining the position of each inlet in each of said entities, means under control of the detecting and determining means for storing indications of the positions of the inlets, and means under control of the storing means for differentiating between said entities by the indication of the positions of the inlets stored in the storing means.

4. A device for interpreting an intelligence pattern consisting of individual entities where each entity contains inlets having varied directions, comprising means for recognzing the individual entities of said intellgence pattern, means for detecting the presence of inlets in each of said entities, means for determining the direction of each inlet in each of said entities, means under control of the detecting and determining means for storing indications of the direction of each inlet, and means under control of the storing means for differentiating between said entities by the indications of the directions of the inlets stored in the storing means.

5. A device for interpreting an intelligence pattern consisting of individual entities where each entity contains lakes of different types, comprising means for recognizing the individual entities of said intelligence pattern, means for detecting the presence of lakes in each of said entities, means for determining the type of each lake in each of said entities, means under control of the detecting and determining means for storing indications of the different types of lakes, and means under control of the storing means for differentiating between said entities by the indications of the types of lakes stored on the storing means.

6. A device for interpreting an intelligence pattern consisting of individual entities where each entity contains lakes of different sizes, comprising means for recognizing the individual entities of said intelligence pattern, means for detecting the presence of lakes in each of said entities, means for determining the size of each lake in each of said entities, means under control of the detecting and determining means for storing indications of the size of each lake, and means under control of the storing means for differentiating between said entities by the indications of the size of lakes stored in the storing means.

7. A device for identifying symbols formed by a line, each line bounding varied type regions, comprising means for recognizing individual symbols, means for detecting the presence of bounded regions in each of said symbols, means for determining the type of each bounded region in each of said symbols, means under control of the detecting and determining means for storing indications of the different types of bounded regions, means under control of the storing means for differentiating between said symbols by the indications of the types of bounded regions stored in the storing means, and means under control of the differentiating means for providing a manifestation indicative of the different symbols.

8. A device for identifying symbols formed by a line, each line bounding varied type lakes and inlets, comprising means for recognizing individual symbols, means for detecting the presence of the lakes in each of said symbols, means for determining the type of each lake in each of said symbols, means for detecting the presence of inlets in each of said symbols, means for determining the type of each inlet in each of said symbols, means under control of the detecting and determining means for storing indications of the types of lakes and inlets, means under control of the storing means for differentiating between said symbols by the indications of the types of lakes and inlets stored in the storing means, and means under control of the differentiation means for providing a manifestation indicative of the different symbols.

9. Apparatus for identifying a symbol including a line where the line forms varied positioned zones in the symbol, comprising means for scanning slices of the area containing the symbol in steps, each step of a slice comprising a bit, means to sense for the presence or absence of the line at each bit, a memory device containing a storage position corresponding to respective bits, means responsive to the sensing means for setting up and recording in the storage positions of said memory device coded signal representations of the presence or absence of the line at the individual bits, means responsive to the scanning means and operatively coupled to said memory device for recognizing the presence and positions of the zones in the symbol, means for storing indications of the positions of the zones in the symbol, means under control of the storing means to determine whether the memory device has coded signal representations of the absence of the line in the storage positions corresponding to the bits within the zones of the symbol, and means coupled to said determining means for providing a manifestation indicative of the symbol scanned based on the results thereof.

10. Apparatus for identifying a symbol including a line where the line forms varied positioned zones in the symbol, comprising means for scanning slices of the area containing the symbol in steps, each step of a slice comprising a bit, means to sense for the presence or absence of the line at each bit, a memory device containing a storage position corresponding to respective bits, means responsive to the sensing means for setting up and recording in the storage positions of said memory device coded signal representations of the presence or absence of the line at the individual bits, means responsive to the scanning means and operatively coupled to said memory device for recognizing the presence and positions of the zones in the symbol, means for storing indications of the positions of the zones in the symbol, means to detect the variations in the position of the zones caused by a curve in the line, means under control of the storing means to determine whether the memory device has coded signal representations of the absence of the line in the storage positions corresponding to the bits within the zones of the symbol, and means coupled to said determining means for providing a manifestation indicative of the symbol scanned based on the results thereof.

11. Apparatus for identifying a symbol including a line where the line forms varied positioned zones in the symbol, comprising means for scanning slices of the area containing the symbol in steps, each step of a slice comprising a bit, means to sense for the presence or absence of the line at each bit, a memory device containing a storage position corresponding to respective bits, means responsive to the sensing means for setting up and recording in the storage positions of said memory device coded signal representations of the presence or absence of the line at the individual bits, means coupled to said memory device for modifying the coded signal representations based on the particular coded signal representations of the bits in a predetermined direction, means responsive to the scanning means and operatively coupled to said memory device for recognizing the presence and positions of the zones in the symbol, means for storing indications of the positions of the zones in the symbol, means under control of the storing means to determine whether the memory device has any coded signal representations of the absence of the line in the storage positions corresponding to the bits within the zones of the symbol and in the predetermined direction, and means coupled to said determining means for providing a manifestation indicative of the symbol scanned based on the results thereof.

12. A device for identifying symbols where each symbol includes a line that forms varied positioned zones in the symbol, comprising means for recognizing an individual symbol, means for scanning slices of the area containing the symbol in steps, each step of a slice comprising a bit, means to sense for the presence or absence of the line at each bit, a memory device containing a storage position corresponding to respective bits, means responsive to the sensing means for setting up and recording in the storage positions of said memory device coded signal representations of the presence or absence of the line at the individual bits, means coupled to said memory device for modifying the coded signal representations based on the particular coded signal representation of the bits in a predetermined direction, means responsive to the scanning means and coupled to said memory device for detecting the presence and position of the zones in the symbol, means responsive to said detecting means and operatively coupled to said memory device to test the configurations of the coded signal representations for inlets of said predetermined direction into the zones, said inlets being indicated by an absence of the modified coded signal representations in the storage positions of the memory device corresponding to the bits within the zone, said testing means producing output signals indicative of the presence or absence of the varied directional inlets, means under control of the output signal from said testing means for storing indications of the inlets in the symbols, and means under control of the storing means for analyzing the stored indications to differentiate between said symbols by the indications of the direction of the inlets stored in the storing means.

13. A device for identifying symbols where each symbol includes a line that forms varied lakes, comprising means for recognizing an individual symbol, means for scanning slices of the area containing the symbol in steps, each step of the slice comprising a bit, means to sense the status of each bit for the presence or absence of the line at said bit, a memory device containing a storage position corresponding to respective bits, means responsive to the sensing means for setting up and recording in the storage positions of said memory device coded signal representation of the status of the line at the individual bits, means coupled to said memory device for modifying the coded signal representations each time there is a change in the status of bits in a predetermined direction, means responsive to the scanning means and coupled to said memory device for detecting the presence of the different coded signal representations, means responsive to said detecting means and operatively coupled to said memory device to test the configurations of the coded signal representations for lakes in the symbols, said testing means producing output signals indicative of the presence or absence of the lakes, means under control of the output signals from said testing means for storing indications of the lakes in the symbol, and means under control of the storing means for analyzing the stored indications to differentiate between said symbols by the indications of the lakes stored in the storing means.

14. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, characterized by rule means coupled to said memory device and said status signal producing means and operable for producing coded signal representations corresponding to the status of the elemental areas of the first sweep at the corresponding scan steps, means for transferring the coded signal representations to the storage position of said memory device corresponding to the scan steps, said coded signal representation producing means including means operative at each scan step for comparing the status of an elemental area with the stored coded signal representation of the preceding sweep, said coded signal representation producing means operative to produce a changed coded signal representation for transfer to the memory device storage position corresponding to the scan steps where the comparing means indicates a change of status of the elemental areas of the sweeps compared at that step, and means for analyzing the stored coded signal representations in the memory device in order to provide a manifestation indicative of the symbols scanned.

15. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said marking register, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation, said rule means also operative to produce a first coded signal representation upon perceiving a first coded signal representation, and means for analyzing the stored coded signal representations in the memory device in order to provide a manifestation indicative of the symbols scanned.

16. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said marking register, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation and also operative to produce a first coded signal representation upon perceiving a first coded signal representation, said rule means operative to produce a second coded signal representation upon simultaneously perceiving a no line status and said first coded signal representation and also operative to produce a second coded signal representation upon perceiving a second coded signal representation and means for analyzing the stored coded signal representations in the memory device in order to provide a manifestation indicative of the symbols scanned.

17. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said memory device, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation, said rule means operative to produce a second coded signal representation upon simultaneously perceiving a no line status and a first coded signal representation, said transfer means transferring the coded signal representation in the preceding sweep and same scan step where there is no coded signal representation produced by said rule means, said rule means including means operative to count the number of intercepts of lines in each sweep and produce an intercept output signal indicative of the presence of a predetermined number of intercepts sweeps, memory means operatively coupled to said rule means for storing output signals, said rule means including further means coupled to said counting means and operative upon the presence of an intercept output signal for producing an output signal indicative of the presence in said predetermined number of intercepts sweeps of any no coded signal representation between the first coded signal representations of said intercepts, and means for providing a manifestation indicative of the symbols scanned based upon the output signals stored in the memory means.

18. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said memory device, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation, said rule means operative to produce a second coded signal representation upon simultaneously perceiving a no line status and said first coded signal representation, said transfer means transferring the coded signal representation in the preceding sweep and same scan step where there is no coded signal representation produced by said rule means, said rule means operative to produce a third coded signal representation upon simultaneously perceiving a line status and said second coded signal representation, said rule means producing an output signal indicative of the presence of any third coded signal representations, memory means operatively coupled to said rule means for storing output signals, and means for providing a manifestation indicative of the symbols scanned based upon the output signals stored in the memory means.

19. In an analyzing device for reading symbols from a document where each symbol is formed by a line, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said memory device, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation, said rule means operative to produce a second coded signal representation upon simultaneously perceiving a no line status and said first coded signal representation, said transfer means transferring the coded signal representation in the preceding sweep and same scan step where there is no coded signal representation produced by said rule means, said rule means including means operative to count the number of consecutive second coded signal representations during each first direction scan and produce an output signal indicative of the presence of a scan having a predetermined number of consecutive second coded signal representations, said rule means operative to produce a third coded signal representation upon simultaneously perceiving a line status and said second coded signal representation, said rule means producing an output signal indicative of the presence of any third coded signal representation, memory means operatively coupled to said rule means for storing output signals, and means for providing a manifestation indicative of the symbols scanned based upon the output signals stored in the memory means.

20. In an analyzing device for reading symbols from a document where each symbol is formed by a line, said line forming varied positioned zones in the symbol, means for scanning the area encompassing each character symbol with a plurality of sweeps, each scan consisting of a predetermined number of steps, means for sensing the status of an elemental area to determine the presence or absence of a line at each scan step, means responsive to the sensing means for producing signals representative of the status of an elemental area at each scan step, a memory device containing a storage position corresponding to each scan step, rule means coupled to said memory device and said status signal producing means and operable for producing a plurality of coded signal representations, means for transferring each coded signal representation produced by said rule means to the corresponding storage position of said marking register, means for giving all of said storage positions of said memory device a no coded signal representation before said scanning begins, said rule means including means coupled to said status signal producing means and operative at each scan step for perceiving the status of an elemental area and the stored coded signal representation of the preceding sweep, said rule means operative to produce a first coded signal representation upon simultaneously perceiving a line status and no coded signal representation, said rule means operative to produce a second coded signal representation upon simultaneously perceiving a no line status and a first coded signal representation, said transfer means transferring the coded signal representation in the preceding sweep and same scan step where there is no coded signal representation produced by said rule means, said rule means including means operative to detect the location of predetermined elemental area zones of the symbol and produce an elemental area zone output signal indicative of the presence of elemental area zones, memory means operatively coupled to said rule means for storing output signals, said rule means including further means coupled to said elemental area zone detection means and operative upon the presence of an elemental area zone signal for producing an output signal indicative of the presence in said elemental area zones of any no coded signal representation in said elemental area zones, and means for providing a manifestation indicative of the symbols scanned based upon the output signals stored in the memory means.

21. Apparatus for identifying symbols on a document where each symbol is formed by a line, comprising means for scanning in a first direction the area encompassing each symbol in a predetermined number of steps, means for sensing the status of an elemental area to determine the presence or absence of a line at each scan step, means responsive to the sensing means for producing signals representative of the status of an elemental area at each scan step, a marking register containing a storage position corresponding to each scan step, means producing advancing movement in a second direction between said document and said scanning means whereby said symbol is scanned in a plurality of first direction scans, rule means coupled to said status signal producing means and operable for producing a plurality of coded signal representations, means for transferring each coded signal representation produced by said rule means to the first storage position of said marking register, means responsive to said scan means for shifting all the coded signal representations one marking register storage position with each scan step, said shifting means causing said first storage position to have no coded signal representation, a temporary store means coupled to said last storage position of the memory device, said shifting means operative to shift the coded signals representations in said last storage position into said temporary store means, said transfer means coupled to said temporary store means and operable to transfer the coded signal representation in said temporary store means to said first storage position when said rule means produces no coded signal representation, said rule means including means operatively coupled to said status signal producing means and said temporary store means and operative at each scan step for perceiving the status signal and the stored coded signal representation in said temporary store means, said rule means operative to produce a first coded signal representation upon simultaneously perceiving a line status and no coded signal representation, said rule means operative to produce a second coded signal representation upon simultaneously perceiving a no line status and said first coded signal representation, said rule means including means operative to count the number of intercepts of lines during each first direction scan and produce an intercept output signal indicative of the presence of a predetermined number of intercepts scan, memory means operatively coupled to said rule means for storing output signals, said rule means including further means coupled to said counting means and operative upon the presence of an intercept output signal for producing an output signal indicative of the presence during said predetermined number of intercept scan of any no coded signal representation between the first coded signal representations of said intercepts, means operatively coupled to said sensing means for detecting an end of symbol scan consisting of a complete first direction scan without the sensing of a line, and means responsive to said last mentioned means for providing a manifestation indicative of the symbol scanned based upon the output signals stored in the memory means.

22. Apparatus for identifying symbols on a document where each symbol is formed by a line, comprising means for scanning in a first direction the area encompassing each symbol in a predetermined number of steps, means for sensing the status of an elemental area to determine the presence or absence of a line at each scan step, means responsive to the sensing means for producing signals representative of the status of an elemental area at each scan step, a marking register containing a storage position corresponding to each scan step, means producing advancing movement in a second direction between said document and said scanning means whereby said symbol is scanned in a plurality of first direction scans, rule means coupled to said status signal producing means operable for producing a plurality of coded signal representations, means for transferring each coded signal representation produced by said rule means to the first storage position of said marking register, means responsive to said scan means for shifting all the coded signal representations one marking register storage position with each scan step, said shifting means causing said first storage position to have no coded signal representation, a temporary store means coupled to said last storage position of the memory device, said shifting means operative to shift the coded signal representations in said last storage position into said temporary store means, said transfer means coupled to said temporary store means and operable to transfer the coded signal representation in said temporary store means to said first storage position when said rule means produces no coded signal representation, said rule means including means operatively coupled to said status signal producing means and said temporary store means and operative at each scan step for perceiving the status signal and the stored coded signal representation in said temporary store means, said rule means operative to produce a first coded signal representation upon simultaneously perceiving a line status and no coded signal representation, said rule means operative to produce a second coded signal representation upon simultaneously perceiving a no line status and said first coded signal representation, said rule means including means operative to count the number of intercepts of lines during each first direction scan and produce an intercept output signal indicative of the presence of a predetermined number of intercepts scan, memory means operatively coupled to said rule means for storing output signals, said rule means including further means coupled to said counting means and operative upon the presence of an intercept output signal for producing an output signal indicative of the presence during said predetermined number of intercepts scan of any no coded signal representation between the first coded signal representation of said intercepts, said last mentioned means operative only during the scan following the predetermined number of intercepts scan to produce third coded signal representations at the scan steps between the first coded signal representations of said intercepts upon perceiving a no line status, said rule means also operative to produce said first coded signal representation upon simultaneously perceiving a line status and said third coded signal representation, means operatively coupled to said sensing means for detecting an end of symbol scan consisting of a complete first direction scan without the sensing of a line, said rule means producing an output signal indicative of the presence during the scan preceding the end of symbol scan of any third coded signal representations, and means responsive to said end of symbol detecting means for providing a manifestation indicative of the symbol scanned based upon the output signals stored in the memory means.

23. Apparatus for identifying symbols on a document where each symbol is formed by a line, comprising means for scanning in a first direction the area encompassing each symbol in a predetermined number of steps, means for sensing the status of an elemental area to determine the presence or absence of a line at each scan step, means responsive to the sensing means for producing signals representative of the status of an elemental area at each scan step, a marking register containing a storage position corresponding to each scan step, means producing advancing movement in a second direction between said document and said scanning means whereby said symbol is scanned in a plurality of first direction scans, rule means coupled to said status signal producing means operable for producing a plurality of coded signal representations, means for transferring each coded signal representation produced by said rule means to the first storage position of said marking register, means responsive to said scan means for shifting all the coded signal representations one marking register position with each scan step, said shifting means causing said first storage position to have no coded signal representation, a temporary store means coupled to said last storage position of the memory device, said shifting means operative to shift the coded signal representations in said last storage position into said temporary store means, said transfer means coupled to said temporary store means and operable to transfer the coded signal representation in said temporary store means to said first storage position when said rule means produces no coded signal representation, said rule means including means operatively coupled to said status signal producing means and said temporary store means and operative at each scan step for perceiving the status signal and the stored coded signal representation in said temporary store means, said rule means operative to produce a first coded signal representation upon simultaneously perceiving a line status and no coded signal representation, said rule means operative to produce a second coded signal representation upon simultaneously perceiving a no line status and said first coded signal representation, said rule means operative to produce a third coded signal representation upon simultaneously perceiving a line status and said second coded signal representation, means operatively coupled to said sensing means for detecting an end of symbol scan consisting of a complete first direction scan without the sensing of a line, said rule means producing an output signal indicative of the presence during the scan preceding the end of symbol scan of any third coded signal representations, memory means operatively coupled to said rule means for storing output signals, means operatively coupled to said sensing means for detecting an end of symbol scan consisting of a complete first direction scan without the sensing of a line, and means responsive to each last mentioned means for providing a manifestation indicative of the symbol scanned based upon the output signals stored in the memory means.

24. Apparatus for identifying symbols on a document where each symbol is formed by a line, comprising means for scanning in a first direction the area encompassing each symbol in a predetermined number of steps, means for sensing the status of an elemental area to determine the presence or absence of a line at each scan step, means responsive to the sensing means for producing signals representative of the status of an elemental area at each scan step, a marking register containing a storage position corresponding to each scan step, means producing advancing movement in a second direction between said document and said scanning means whereby said symbol is scanned in a plurality of first direction scans, rule means coupled to said status signal producing means operable for producing a plurality of coded signal representations, means for transferring each coded signal representation produced by said rule means to the first storage position of said marking register, means responsive to said scan means for shifting all the coded signal representations one marking register position with each scan step, said shifting means causing said first storage position to have no coded signal representation, a temporary store means coupled to said last storage position of the memory device, said shifting means operative to shift the coded signal representations in said last storage position into said temporary store means, said transfer means coupled to said temporary store means and operable to transfer the coded signal representation in said temporary store means to said first storage position when said rule means produces no coded signal representation, said rule means including means operatively coupled to said status signal producing means and said temporary store means and operative at each scan step for perceiving the status signal and the store coded signal representation in said temporary store means, said rule means operative to produce a first coded signal representation upon simultaneously perceiving a line status and no coded signal representation, said rule means operative to produce a second coded signal representation upon simultaneously perceiving a no line status and said first coded signal representation, said rule means including means operative to count the number of consecutive second coded signal representations during each first direction scan and produce an output signal indicative of the presence of a scan having a predetermined number of consecutive second coded signal representations, said rule means operative to produce a third coded signal representation upon simultaneously perceiving a line status and said second coded signal representation, means operatively coupled to said sensing means for detecting an end of symbol scan consisting of a complete first direction scan without the sensing of a line, said rule means producing an output signal indicative of the presence during the scan preceding the end of symbol scan of any third coded signal representations, memory means operatively coupled to said rule means for storing output signals, means operatively coupled to said sensing means for detecting an end of symbol scan consisting of a complete first direction scan without the sensing of a line and means responsive to each last mentioned means for providing a manifestation indicative of the symbol scanned based upon the output signals stored in the memory means.

25. Apparatus for identifying symbols on a document where each symbol is formed by a line, comprising means for scanning in a first direction the area encompassing each symbol in a predetermined number of steps, means for sensing the status of an elemental area to determine the presence or absence of a line at each scan step, means responsive to the sensing means for producing signals representative of the status of an elemental area at each scan step, a marking register containing a storage position corresponding to each scan step, means producing advancing movement in a second direction between said document and said scanning means whereby said symbol is scanned in a plurality of first direction scans, rule means coupled to said status signal producing means operable for producing a plurality of coded signal representations, means for transferring each coded signal representation produced by said rule means to the first storage position of said marking register, means responsive to said scan means for shifting all the coded signal representations one marking register position with each scan step, said shifting means causing said first storage position to have no coded signal representation, a temporary store means coupled to said last storage position of the memory device, said shifting means operative to shift the coded signal representation in said last storage position into said temporary store means, said transfer means coupled to said temporary store means and operable to transfer the coded signal representation in said temporary store means to said first storage position when said rule means produces no coded signal representation, said rule means including means operatively coupled to said status signal producing means and said temporary store means and operative to each scan step for perceiving the status signal and the stored coded signal representation in said temporary store means, said rule means operative to produce a first coded signal representation upon simultaneously perceiving a line status and no coded signal representation, said rule means operative to produce a second coded signal representation upon simultaneously perceiving a no line status and said first coded signal representation, said rule means including means operative to count the number of intercepts of lines during each first direction scan and produce an intercept output signal indicative of the presence of a predetermined number of intercepts scan, memory means operatively coupled to said rule means for storing output signals, said rule means including further means coupled to said counting means and operative upon the presence of an intercept output signal for producing an output signal indicative of the presence during said predetermined number of intercepts scan of any no coded signal representation between the first coded signal representation of said intercept, said last mentioned means operative only during the scan following the predetermined number of intercepts scan to produce a third coded signal representation at the scan steps between the first coded signal representations of said intercepts upon perceiving a no line status, said rule means also operative to produce said first coded signal representation upon simultaneously perceiving a line status and said third coded signal representation, said rule means including means to store a signal for one scan step of the presence of a third coded signal representation in the temporary store means during the previous scan step, said rule means including modifying means for producing a third coded signal representation instead of a second coded signal representation upon simultaneously perceiving a no line status signal, a first coded signal representation and a signal of the third coded representation in the temporary store means during the previous scan step, means operatively coupled to said sensing means for detecting an end of symbol scan consisting of a complete first direction scan without the sensing of a line, said rule means producing an output signal indicative of the presence during the scan preceding the end of symbol scan of any third coded signal representations, and means responsive to said end of symbol detecting means for providing a manifestation indicative of the symbol scanned based upon the output signals stored in the memory means.

26. Apparatus for identifying characters, where each character includes a line on a background material, means for detecting a minimum sized background region bounded in two directions by the line of the character to form a possible inlet, means for storing the possible inlet indications, and means responsive to the detecting means and storing means for ascertaining the presence of an inlet by determining whether the line is connected to bound the background region in a third direction.

27. Apparatus for identifying a character, where each character includes a line on a background material, means for detecting the presence of inlets in each of said characters, including means for detecting a minimum sized background region bounded on two sides by the line of the character, means under control of the last mentioned means for storing an indication of the minimum sized background region bounded on two sides by the line of the character, and means under control of the storing means for determining whether the line is connected to bound the background region on a third side.

28. Apparatus for identifying characters, where each character includes a line on a background material, means for detecting a minimum sized background region bounded on two sides by the line of the character, means under control of the detecting means for storing an indication of a minimum sized background region bounded on two sides by the lines of the character, means under control of the storing means for determining whether the line is connected to bound the background region on a third side, and analyzing means under control of the determining means for producing an inlet indication when said minimum sized background region is detected bound on two sides by the line unconnected on a third side.

29. Apparatus for identifying characters, where each character includes a line printed on a background material, means for successively scanning adjacent slices of the background material in steps, each step of a slice comprising a bit, means to sense for the presence of the line at each bit, means for indicating zones of background at different levels of the character in the slice, means under control of said sense means and said indicating means for discerning the directions in which the line bounds the different level zones, means for determining the presence of different predetermined character recognition criteria under control of said indicating means and discerning means dependent upon the direction of the line bounding the different level zones, means under control of the determining means for storing indications of the different character recognition criteria, and analyzing means under control of the storing means for recognizing characters by the different recognition criteria stored during the scanning of the characters.

30. Apparatus for identifying characters, where each character includes a line printed on a background material, means for successively scanning adjacent slices of the background material in steps, each step of a slice comprising a bit, means to sense for the presence or absence of the line at each bit, means for indicating zones of background region at different levels of the character in the slice, each zone being separated from its adjacent zone by a line in the slice, means for sensing for the presence of a predetermined number of zones present in a predetermined number of scans, means under control of said first and second sense means for ascertaining whether each of the predetermined number of zones are bounded by a line in the previously scanned slices, means for determining the presence of different predetermined character recognition criteria during said scanning under control of said indicating and ascertaining means dependent upon the level of the zone and the ascertainment of the presence of a line bounding said zones, means under control of the determining means for storing indications of the different character recognition criteria, and analyzing means under control of the storing means for recognizing characters by the different recognition criteria stored.

31. Apparatus for identifying characters, where each character includes a line printed on a background material, means for successively scanning adjacent slices of the background material in steps, each step of a slice comprising a bit, first means to sense for the presence or absence of the line at each bit, means for indicating zones of background region at different levels of the character in the slice, each zone being separated from its adjacent zone by a line in the slice, second means for sensing a predetermined number of zones present in a predetermined number of scans, means under control of said first and second sense means for ascertaining whether the predetermined number of zones are bounded by a line in the previously scanned slices, means for determining the presence of different predetermined character recognition criteria in the period during the scan following the scan in which the predetermined number of zones is sensed under control of said indicating and ascertaining means and dependent upon the level of the zone and the ascertainment of the presence of a line bounding said zones, means for noting the end of the scanning of the printed character as indicated by the scanning of the slice during which no line is sensed, means under control of said first and second sense means and said noting means and operative in the period during the scan following the scan in which no line is sensed for discerning whether the predetermined number of zones are bounded by a line in scans after the first determining period scan, said determining means determining the presence of other predetermined character recognition criteria dependent upon the level of the zone indicated and the ascertainment as to whether said zones are bounded by a line in the later scanned slices, means under control of the determining means for storing indications of the character recognition criteria, and analyzing means under control of the storing means for recognizing characters by the different recognition criteria stored in the storing means during said determining period scans.

32. Apparatus for identifying characters, where each character includes a line on a background material, means for successively scanning adjacent slices of the background material in steps, each step of a slice comprising a bit, first means to sense for the presence or absence of the line at each bit, memory means, means responsive to the scanning means and operatively coupled to said memory means for recognizing the presence of a predetermined number of levels of different zones of background in the symbol, each zone being separated from its adjacent zone by a line in the slice, means responsive to the scanning means for setting up and recording in said memory means coded signal representations of the presence or absence of the line for each of the bit positions in the slice, where said coded signal representations include a first signal representative of the presence of a line at a bit position and another group of signals representing the absence of a line at a bit position, a different signal of said group being recorded for the different zones of the character, means under control of the sensing means for maintaining the signals from the group recorded in the memory means as long as no line is sensed at the bit position in later scanned slices, said recording means operative for replacing the first group signals by said first signal when a line is sensed at the bit position, means for sensing the end of a scan of the printed character as indicated by the scanning of a slice during which no line is sensed, second means for sensing for the presence of said first group of signals, means for determining the presence of different predetermined character recognition criteria under control of said second sensing means and dependent upon the first group of signals present at the end of the scanning of the character, means under control of the determining means for storing indications of the different character recognition criteria, and analyzing means under control of the storing means for recognizing characters by the different recognition criteria stored at the end of the scanning of the characters.

33. Apparatus for identifying characters, where each character includes a line on a background material, means for successively scanning adjacent slices of the background material in steps, each step of a slice comprising a bit, means to sense for the presence or absence of the line at each bit, memory means, means responsive to the scanning means and operatively coupled to said memory means for recognizing the presence and level of different zones of background in the symbol, each zone being separated from its adjacent zone by a line in the slice, means responsive to the scanning means for setting up and recording in said memory means coded signal representations dependent upon the presence or absence of the line for each of the bit positions in the slice and upon the level of the zone, means for interpreting the coded signal representations in the memory means for determining the shape of the different background regions bounded by the line of the character, means under control of the determining means for storing indications of the shape of the different background regions, and means under control of the storing means for differentiating between said characters by the indications of the different bounded background region shapes stored therein.

34. Apparatus for identifying characters, where each character includes a line on a background material, means for successively scanning adjacent slices of the background material in steps, each step of a slice comprising a bit, means to sense for the presence or absence of the line at each bit, memory means, means responsive to the scanning means and operatively coupled to said memory means for recognizing the presence and level of different zones of background in the symbol, each zone being separated from its adjacent zone by a line in the slice, means responsive to the scanning means for setting up and recording in said memory means coded signal representations dependent upon the presence or absence of the line for each of the bit positions in the slice, upon the level of the zone and upon the coded signal representations recorded in the previous scan, means for interpreting the coded signal representations in the memory means for determining the shape of the different background regions bounded by the line of the character, means under control of the determining means for storing indications of the different shape background regions, and means under control of the storing means for differentiating between said characters by the indications of the different bounded background region shapes stored therein.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |
| 2,754,360 | Dersch | July 10, 1956 |
| 2,762,862 | Bliss | Sept. 11, 1956 |

UNITED STATES PATENT OFFICE

CERTIFICATE OF CORRECTION

Patent No. 2,889,535 June 2, 1959

Nathaniel Rochester et al.

It is hereby certified that error appears in the printed specification of the above numbered patent requiring correction and that the said Letters Patent should read as corrected below.

Column 8, line 1, for "B and B," read -- B and $\bar{\bar{B}}$, --; column 10, line 28, for "trip" read -- triple --; column 19, line 2, for "--2CCL-1" read -- --2CL-1 --; column 33, line 29, for "presents" read -- prevents --; line 64, for 'terminal "$\bar{2}$"' read -- terminal "2" --; column 51, line 70, for "differentiation" read -- differentiating --.

Signed and sealed this 23rd day of February 1960.

(SEAL)

Attest:

KARL H. AXLINE
Attesting Officer

ROBERT C. WATSON
Commissioner of Patents